United States Patent
Yamashita et al.

(10) Patent No.: US 7,783,126 B2
(45) Date of Patent: Aug. 24, 2010

(54) VISUAL PROCESSING DEVICE, VISUAL PROCESSING METHOD, VISUAL PROCESSING PROGRAM, AND SEMICONDUCTOR DEVICE

(75) Inventors: Haruo Yamashita, Osaka (JP); Tatsumi Watanabe, Osaka (JP); Yusuke Monobe, Kyoto (JP); Takeshi Ito, Osaka (JP); Akio Kojima, Osaka (JP); Yasuhiro Kuwahara, Osaka (JP); Toshiharu Kurosawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 936 days.

(21) Appl. No.: 10/571,120

(22) PCT Filed: Sep. 10, 2004

(86) PCT No.: PCT/JP2004/013601
§ 371 (c)(1),
(2), (4) Date: Nov. 2, 2006

(87) PCT Pub. No.: WO2005/027041
PCT Pub. Date: Mar. 24, 2005

(65) Prior Publication Data
US 2007/0071318 A1    Mar. 29, 2007

(30) Foreign Application Priority Data
Sep. 11, 2003 (JP) .............................. 2003-320059
Apr. 9, 2004 (JP) .............................. 2004-115166

(51) Int. Cl.
*G06K 9/40* (2006.01)
*G06K 9/00* (2006.01)

(52) U.S. Cl. ...................................... 382/274; 382/169

(58) Field of Classification Search ................ 382/168, 382/169, 272, 274, 276, 300
See application file for complete search history.

(56) References Cited

U.S. PATENT DOCUMENTS

| 4,334,240 A | 6/1982 | Franklin |
| 4,837,722 A | 6/1989 | Sara |
| 5,454,044 A | 9/1995 | Nakajima |

(Continued)

FOREIGN PATENT DOCUMENTS

EP    0 732 669    9/1996

(Continued)

OTHER PUBLICATIONS

Supplementary European Search Report issued May 8, 2009 in the Application No. EP 04 77 3246.

(Continued)

*Primary Examiner*—Yon Couso
(74) *Attorney, Agent, or Firm*—Wenderoth, Lind & Ponack, L.L.P.

(57) ABSTRACT

A visual processing device that achieves gradation processing and further enhances a visual effect. The visual processing device 1 performs gradation processing for each image region of an input signal IS, and includes an image partitioning portion 2, a gradation transformation curve derivation portion 10, and a gradation processing portion 5. The image partitioning portion 2 and the gradation transformation curve derivation portion 10 use a brightness histogram Hm of a wide area image region Em to create a gradation transformation curve Cm of an image region Pm. The gradation processing portion 5 performs gradation processing of the image region Pm based on the derived gradation transformation curve Cm.

24 Claims, 36 Drawing Sheets

U.S. PATENT DOCUMENTS

| | | | |
|---|---|---|---|
| 5,454,053 | A | 9/1995 | Okubo et al. |
| 5,479,926 | A | 1/1996 | Ustuner et al. |
| 5,483,360 | A | 1/1996 | Rolleston et al. |
| 5,524,070 | A | 6/1996 | Shin et al. |
| 5,608,813 | A | 3/1997 | Nakajima |
| 5,774,599 | A | 6/1998 | Muka et al. |
| 5,991,457 | A | 11/1999 | Ito et al. |
| 6,023,533 | A | 2/2000 | Sano et al. |
| 6,069,597 | A | 5/2000 | Hansen |
| 6,094,185 | A | 7/2000 | Shirriff |
| 6,147,664 | A | 11/2000 | Hansen |
| 6,163,621 | A | 12/2000 | Paik et al. |
| 6,266,102 | B1 | 7/2001 | Azuma et al. |
| 6,275,605 | B1 | 8/2001 | Gallagher et al. |
| 6,323,869 | B1 | 11/2001 | Kohm et al. |
| 6,324,309 | B1 | 11/2001 | Tokuyama et al. |
| 6,411,306 | B1 | 6/2002 | Miller et al. |
| 6,480,202 | B1 | 11/2002 | Deguchi et al. |
| 6,580,835 | B1 | 6/2003 | Gallagher et al. |
| 6,618,045 | B1 | 9/2003 | Lin |
| 6,624,828 | B1 | 9/2003 | Dresevic et al. |
| 6,650,774 | B1 | 11/2003 | Szeliski |
| 6,674,436 | B1 | 1/2004 | Dresevic et al. |
| 6,766,055 | B2 * | 7/2004 | Matsugu et al. ............ 382/173 |
| 6,813,041 | B1 | 11/2004 | Moroney et al. |
| 6,822,762 | B2 | 11/2004 | Moroney et al. |
| 6,853,747 | B1 | 2/2005 | Matsuura et al. |
| 6,856,704 | B1 | 2/2005 | Gallagher et al. |
| 6,915,024 | B1 | 7/2005 | Maurer |
| 6,927,784 | B2 | 8/2005 | Matsuda et al. |
| 7,046,843 | B2 | 5/2006 | Kanai |
| 7,072,507 | B2 | 7/2006 | Ohga |
| 7,113,307 | B1 | 9/2006 | Ohkubo |
| 7,113,648 | B1 | 9/2006 | Aihara |
| 2001/0007599 | A1 | 7/2001 | Iguchi et al. |
| 2002/0006230 | A1 | 1/2002 | Enomoto |
| 2002/0024529 | A1 | 2/2002 | Miller et al. |
| 2002/0051001 | A1 | 5/2002 | Kanai |
| 2002/0085752 | A1 | 7/2002 | Ohga |
| 2002/0154138 | A1 | 10/2002 | Wada et al. |
| 2002/0171852 | A1 | 11/2002 | Zhang et al. |
| 2003/0053690 | A1 | 3/2003 | Trifonov et al. |
| 2003/0058252 | A1 | 3/2003 | Matsuda et al. |
| 2003/0095706 | A1 * | 5/2003 | Kuwata ............ 382/167 |
| 2003/0103162 | A1 | 6/2003 | Sano et al. |
| 2003/0152283 | A1 | 8/2003 | Moriwaki |
| 2005/0100242 | A1 | 5/2005 | Trifonov et al. |
| 2005/0169553 | A1 | 8/2005 | Maurer |

FOREIGN PATENT DOCUMENTS

| | | |
|---|---|---|
| EP | 0 440 166 | 7/1999 |
| EP | 0 961 487 | 12/1999 |
| EP | 1 058 209 | 12/2000 |
| EP | 1 130 896 | 9/2001 |
| EP | 1 189 457 | 3/2002 |
| EP | 1 209 621 | 5/2002 |
| EP | 1 302 898 | 4/2003 |
| JP | 58-27145 | 2/1983 |
| JP | 1-106578 | 4/1989 |
| JP | 1-120682 | 5/1989 |
| JP | 2-73783 | 3/1990 |
| JP | 3-48980 | 3/1991 |
| JP | 3-222577 | 10/1991 |
| JP | 4-367162 | 12/1992 |
| JP | 06-070168 | 3/1994 |
| JP | 6-259543 | 9/1994 |
| JP | 7-220066 | 8/1995 |
| JP | 8-2012 | 1/1996 |
| JP | 8-181863 | 7/1996 |
| JP | 9-153132 | 6/1997 |
| JP | 9-168097 | 6/1997 |
| JP | 9-231353 | 9/1997 |
| JP | 09-275496 | 10/1997 |
| JP | 10-13667 | 1/1998 |
| JP | 10-65930 | 3/1998 |
| JP | 10-75395 | 3/1998 |
| JP | 10-154223 | 6/1998 |
| JP | 10-261077 | 9/1998 |
| JP | 2832954 | 10/1998 |
| JP | 10-334218 | 12/1998 |
| JP | 11-27517 | 1/1999 |
| JP | 11-501841 | 2/1999 |
| JP | 11-69181 | 3/1999 |
| JP | 11-122488 | 4/1999 |
| JP | 11-205620 | 7/1999 |
| JP | 2000-4379 | 1/2000 |
| JP | 2000-32281 | 1/2000 |
| JP | 2000-50097 | 2/2000 |
| JP | 2000-57335 | 2/2000 |
| JP | 2000-207548 | 7/2000 |
| JP | 2000-278522 | 10/2000 |
| JP | 2001-69352 | 3/2001 |
| JP | 2001-78047 | 3/2001 |
| JP | 2001-111858 | 4/2001 |
| JP | 2001-243463 | 9/2001 |
| JP | 2001-515229 | 9/2001 |
| JP | 2001-298619 | 10/2001 |
| JP | 2002-44451 | 2/2002 |
| JP | 2002-95021 | 3/2002 |
| JP | 2002-133409 | 5/2002 |
| JP | 2002-204372 | 7/2002 |
| JP | 2002-281333 | 9/2002 |
| JP | 2002-536677 | 10/2002 |
| JP | 2003-46778 | 2/2003 |
| JP | 2003-108109 | 4/2003 |
| JP | 2003-174602 | 6/2003 |
| JP | 2003-242498 | 8/2003 |
| WO | 96/28095 | 9/1996 |
| WO | 99/23637 | 5/1999 |
| WO | 00/45365 | 8/2000 |
| WO | 01/26054 | 4/2001 |
| WO | 02/19307 | 3/2002 |
| WO | 02/27657 | 4/2002 |

OTHER PUBLICATIONS

Supplementary European Search Report issued May 11, 2009 in the Application No. EP 04 77 3245.

Albert M. Vossepoel et al., "Adaptive Histogram Equalization Using Variable Regions", Proceedings of the International Conference on Pattern Recognition (ICPR), Rome, Nov. 14-17, 1988; [Proceedings of the International Conference on Pattern Recognition (ICPR)], Washington, IEEE Comp. Soc. Press, US, vol. 1, Nov. 14, 1988, pp. 351-353.

Frédo Durand et al., "Fast Bilateral Filtering for the Display of High-Dynamic-Range Images", ACM Transactions on Graphics, ACM, US, vol. 21, No. 3, Jul. 1, 2002, pp. 257-266.

Jack Tumblin et al., "Tone Reproduction for Realistic Images", IEEE Computer Graphics and Applications, Nov. 1993, vol. 13, No. 6, pp. 42-48.

Chinese Office Action (along with English language translation) issued Sep. 28, 2007 in Chinese Application No. 200480026191.3.

Chinese Office Action (along with English language translation) issued Sep. 28, 2007 in Chinese Application No. 200480026253.0.

Office Action dated Apr. 13, 2010 issued in U.S. Appl. No. 10/571,124, filed Jan. 16, 2007.

* cited by examiner original image selection signal Sm

Fig.24

|  | | small ← absolute value of difference → large | |
|---|---|---|---|
|  |  | less than $\delta$ | at least $\delta$ |
| small ↑ distance large ↓ | target pixel | Wij=1 |  |
|  | first surrounding pixel | Wij=1 | Wij=1/2 |
|  | second surrounding pixel | Wij=1/2 | Wij=1/4 |

$\delta$ : threshold value [20/256 to 60/256]

(a)

(b)

VISUAL PROCESSING DEVICE, VISUAL PROCESSING METHOD, VISUAL PROCESSING PROGRAM, AND SEMICONDUCTOR DEVICE

BACKGROUND OF THE INVENTION

1. Field of Invention

The present invention relates to visual processing devices, in particular to visual processing devices that perform gradation processing of an image signal. Separate aspects of the invention relate to visual processing methods, visual processing programs, and semiconductor devices.

2. Description of the Related Art

Spatial processing and gradation processing are known as techniques for visually processing image signals of an original image.

Spatial processing is the processing of a target pixel to be processed using the pixels surrounding that target pixel. Further, the technique of using an image signal that has been subjected to spatial processing to perform contrast enhancement or dynamic range (DR) compression, for example, of an original image is known. With contrast enhancement, the difference between the original image and the blur signal (the sharp component of the image) is added to the original image, sharpening the image. With DR compression, a portion of the blur signal is subtracted from the original image, compressing the dynamic range.

Gradation processing is processing in which a lookup table (LUT) is used to transform a pixel value for each target pixel without regard for the pixels around the target pixel, and is also referred to as "gamma correction." For example, in the case of contrast enhancement, transformation of the pixel value is performed using a LUT that produces a gradation of gray levels that appear frequently (whose area is large) in the original image. Well-known examples of gradation processing using a LUT include gradation processing in which a single LUT is chosen and used for the entire original image (histogram equalization) and gradation processing in which the original image is partitioned into a plurality of image regions and a LUT is chosen and used for each image region (local histogram equalization) (for example, see JP 2000-57335A (pg. 3, FIGS. 13 to 16)).

An example of gradation processing in which an original image is partitioned into a plurality of image regions and a LUT is chosen and used for each image region is described using FIGS. 33 to 36.

FIG. 33 shows a visual processing device 300 that partitions an original image into a plurality of image regions and chooses a LUT to use for each image region. The visual processing device 300 is provided with an image partitioning portion 301 that partitions an original image that has been input as an input signal IS into a plurality of image regions Sm ($1 \leq m \leq n$; where n is the number of partitions of the original image), a gradation transformation curve derivation portion 310 that derives a gradation transformation curve Cm for each image region Sm, and a gradation processing portion 304 that obtains the gradation transformation curves Cm and subjects each image region Sm to gradation processing and outputs the result as an output signal OS. The gradation transformation curve derivation portion 310 comprises a histogram creation portion 302 that creates a brightness histogram Hm for each image region Sm, and a gradation curve creation portion 303 that creates a gradation transformation curve Cm for each image region Sm from the brightness histogram Hm that has been created.

The operations of these portions are described using FIGS. 34 to 36. The image partitioning portion 301 partitions an original image that has been received as an input signal IS into a plurality (n) of image regions (see FIG. 34(a)). The histogram creation portion 302 creates a brightness histogram Hm for each image region Sm (see FIG. 35). Each brightness histogram Hm shows the distribution of the brightness values of all pixels in an image region Sm. That is, the horizontal axes in the brightness histograms Hm shown in FIG. 35(a) to (d) show the brightness level of the input signal IS and the vertical axes show the pixel number. The gradation curve creation portion 303 cumulates the "pixel number" of the brightness histogram Hm in the order of their brightness and this cumulative curve is taken as a gradation transformation curve Cm (see FIG. 36). In the gradation transformation curve Cm shown in FIG. 36, the horizontal axis shows the brightness value of the pixels of the image region Sm in the input signal IS, and the vertical axis shows the brightness value of the pixels of the image region Sm in the output signal OS. The gradation processing portion 304 obtains the gradation transformation curve Cm and transforms the brightness value of the pixels in the image region Sm in the input signal IS based on the gradation transformation curve Cm. By doing this, a gradient is established between the most frequent gradations in each block, and this increases the sense of contrast for each block.

BRIEF SUMMARY OF THE INVENTION

With the histogram creation portion 302, a gradation transformation curve Cm is created from a brightness histogram Hm of the pixels in the image region Sm. To more properly create a gradation transformation curve Cm to adopt for the image region Sm, it is necessary to include the entire range from the dark portions (shadows) to the light portions (highlights) of the image, thus requiring a larger number of pixels to be referenced. For this reason, it is not possible to make the individual image regions Sm particularly small, that is, the n partitions of the original image cannot be made particularly large. Although the number of partitions n differs depending on the image content, from experience the partition number tends to be in the range of four to sixteen partitions.

In this way, the individual image regions Sm cannot be made particularly small, and therefore the following problems occur in the output signal OS after gradation processing. That is, gradation processing is executed using a single gradation transformation curve Cm for each image region Sm, and thus there are instances in which the junction at the border between image regions Sm is noticeably unnatural or a pseudo-border results within the image region Sm. Further, at a partition number of at most four to sixteen partitions the image region Sm is large, and therefore significant changes in the gray concentration between image regions occurs in images in which there are extreme differences between the image regions, and this makes it difficult to prevent pseudo-borders from occurring. For example, as in FIG. 34(b) and FIG. 34(c), there is an extreme change in darkness due to the positional relationship between the image (for example, an object e.g. in the image) and the image regions Sm.

Accordingly, it is an object of the present invention to provide a visual processing device that achieves gradation processing that further increases the visual effect.

The visual processing device according to a first aspect of the invention is a visual processing device that performs gradation processing with respect to each image region of an image signal that has been received as input, and comprises gradation transformation property derivation means and gradation processing means. The gradation transformation property derivation means uses surrounding image data of at least one surrounding image region, which is an image region that is positioned proximal to a target image region that is to be subjected to the gradation processing and which includes a plurality of pixels, to derive the gradation transformation property of the target image region. The gradation processing means performs gradation processing of the image signal of the target image region based on the gradation transformation property that has been derived.

The target image region is for example a region comprising the pixels included in the image signal, or an image block obtained by partitioning the image signal into predetermined units and a plurality of other pixels. The surrounding image region is for example an image block obtained by partitioning the image signal into predetermined units and a plurality of other pixels. The surrounding image data are for example the image data of the surrounding image region or data that have been derived from the image data, and for example are the pixel values of the surrounding image region, a gradation property (luminance or brightness of each pixel), or thumbnails (reduced images or decimated images whose resolution has been reduced). It is sufficient for the surrounding image region to be positioned proximal to the target image region, and it is not necessary for it to surround the target image region.

With this visual processing device of the invention, the surrounding image data of the surrounding image region are used to determine the gradation transformation property of the target image region. As a result, it is possible to add a spatial processing effect to the gradation processing with respect to each target image region, allowing gradation processing that further enhances the visual effect to be achieved.

The visual processing device according to a second aspect of the invention is the visual processing device according to the first aspect of the invention in which the surrounding image region is an image block that has been obtained by partitioning the image signal into predetermined units.

Here, the image blocks are the respective regions obtained by partitioning the image signal into rectangular units.

With this visual processing device of the invention, it is possible to process the surrounding image region in image block units. Thus, the processing load required to determine the surrounding image region or to derive the gradation transformation property can be reduced.

The visual processing device according to a third aspect of the invention is the visual processing device according to the first or second aspect of the invention in which the gradation transformation property derivation means further uses target image data of the target image region to derive the gradation transformation property of the target image region.

The target image data are for example the image data of the target image region or data that have been derived from the image data, and for example are the pixel values of the surrounding image region, a gradation property (luminance or brightness of each pixel), or thumbnails (reduced images or decimated images whose resolution has been reduced).

With this visual processing device of the invention, when determining a gradation transformation property of the target image region, the determination is performed using not only the target image data of the target image region but also the surrounding image data of the surrounding image region. Thus, it is possible to add a spatial processing effect to the gradation processing of the target image region, allowing gradation processing that further enhances the visual effect to be achieved.

The visual processing device according to a fourth aspect of the invention is the visual processing device according to the third aspect of the invention in which the gradation transformation property derivation means has characteristic parameter derivation means that uses the target image data and the surrounding image data to derive a characteristic parameter, which is a parameter that indicates a characteristic of the target image region, and gradation transformation property determination means that determines the gradation transformation property based on the characteristic parameter of the target region that has been derived by the characteristic parameter derivation means.

The characteristic parameter is for example a mean value (simple mean value, weighted mean value, etc.), a representative value (maximum value, minimum value, or median value), or a histogram, of the target image data and the surrounding image data, for example. Here, the histogram is the distribution of the gradation property of the target image data and the surrounding image data.

With this visual processing device of the invention, the characteristic parameter is derived using not only the target image data but also surrounding image data. Thus, it is possible to add a spatial processing effect to the gradation processing of the target image region, allowing gradation processing that further enhances the visual effect to be achieved. As more specific examples of this effect, it is possible to keep pseudo-borders from occurring due to the gradation processing. Further, the boundary of the target image region can be prevented from standing out unnaturally.

The visual processing device according to a fifth aspect of the invention is the visual processing device according to the fourth aspect of the invention in which the characteristic parameter is a histogram.

The gradation transformation property determination means determines as the gradation transformation property a cumulative curve obtained by cumulating the values of the histogram, or selects a gradation transformation property that corresponds to the histogram.

With this visual processing device of the invention, the histogram is created using not only the target image data but also surrounding image data. Thus, it is possible to keep pseudo-borders from occurring due to the gradation processing. Further, the boundary of the target image region can be prevented from standing out unnaturally.

The visual processing device according to a sixth aspect of the invention is the visual processing device according to the fourth aspect of the invention in which the gradation transformation property determination means uses the characteristic parameter to select the gradation transformation property, which has been tabulated in advance.

Here, the gradation transformation property is data that have been tabulated, in which the properties of the target image data after gradation processing with respect to the target image data are stored in a table.

The gradation transformation property determination means selects a table that corresponds to the respective values of the characteristic parameter.

With this visual processing device of the invention, gradation processing is performed using the tabulated gradation transformation properties. Thus, it is possible to increase the speed at which gradation processing is performed. Also, since gradation processing is performed selecting a single table from among a plurality of tables, it is possible to perform gradation processing that is more suitable.

The visual processing device according to a seventh aspect of the invention is the visual processing device according to the sixth aspect of the invention in which the gradation transformation properties, which are tabulated in advance, can be changed.

With this visual processing device of the invention, by changing the gradation transformation property it is possible to variously modify the characteristics of the gradation processing without altering the hardware configuration.

The visual processing device according to an eighth aspect of the invention is the visual processing device according to the fourth aspect of the invention in which changing the gradation transformation property is achieved by correcting at least some of the gradation transformation property.

With this visual processing device of the invention, changing the gradation transformation property is achieved by correcting at least some of the gradation transformation property. Thus, it is possible to reduce the amount of storage necessary for the gradation transformation property and at the same time achieve various types of gradation processing.

The visual processing device according to a ninth aspect of the invention is the visual processing device according to the fourth aspect of the invention in which the gradation transformation property determination means uses the characteristic parameter to create the gradation transformation property through a computation that has been determined in advance.

Here, the gradation transformation property gives target image data after gradation processing for the target image data. Also, the computation for creating the gradation transformation property is determined in advance using the characteristic parameter. More specifically, a computation that corresponds to one of the values of the characteristic parameter is selected, or a computation is created corresponding to the value of the characteristic parameter.

With this visual processing device of the invention, it is not necessary to store the gradation transformation properties in advance, and this allows the storage capacity for storing the gradation transformation properties to be reduced.

The visual processing device according to a tenth aspect of the invention is the visual processing device according to the ninth aspect of the invention in which the computation that has been determined in advance can be changed.

With this visual processing device of the invention, it is possible to variously change the characteristics of the gradation processing by changing the computation.

The visual processing device according to an eleventh aspect of the invention is the visual processing device according to the tenth aspect of the invention in which changing of the computation is achieved by correcting at least a portion of the computation.

With this visual processing device of the invention, the gradation transformation property is changed by correcting at least a portion of the computation. Thus, with the same amount of storage capacity for storing a computation it is possible to achieve an even wider array of gradation processing.

The visual processing device according to a twelfth aspect of the invention is the visual processing device according to the fourth aspect of the invention in which the gradation transformation property is obtained by interpolation or extrapolation of a plurality of gradation transformation properties.

Here, the gradation transformation property is a property of the target image data after gradation processing with respect to the target image data. The gradation transformation property is given in the form of a table or a computation.

With this visual processing device of the invention, it is possible to perform gradation processing using a new gradation transformation property that has been obtained by interpolating or extrapolating a plurality of gradation transformation properties. Thus, even after reducing the storage capacity for storing a gradation transformation property it is possible to achieve a wider array of gradation processing.

The visual processing method according to a thirteenth aspect of the invention is a visual processing method of gradation processing each image region of an image signal that has been received as input, and comprises a gradation transformation property derivation step and a gradation processing step. The gradation transformation property derivation step is a step of using surrounding image data of at least one surrounding image region, which is an image region that is positioned proximal to a target image region that is to be subjected to the gradation processing and which includes a plurality of pixels, to derive a gradation transformation property of the target image region. The gradation processing step is a step of performing gradation processing of the image signal of the target image region based on the gradation transformation property that has been derived.

With this visual processing method of the invention, the surrounding image data of the surrounding image region are used to determine the gradation transformation property of the target image region. As a result, it is possible to add a spatial processing effect to the gradation processing with respect to each target image region, allowing gradation processing that further enhances the visual effect to be achieved.

The visual processing method according to a fourteenth aspect of the invention is the visual processing method according to the thirteenth aspect of the invention in which the surrounding image region is an image block that has been obtained by partitioning the image signal into predetermined units.

With this visual processing method of the invention, it is possible to process the surrounding image region in image block units. Thus, the processing load required to determine the surrounding image region or to derive the gradation transformation property can be reduced.

The visual processing method according to a fifteenth aspect of the invention is the visual processing method according to the thirteenth or fourteenth aspect of the invention in which the gradation transformation property derivation step further includes using target image data of the target image region to derive the gradation transformation property of the target image region.

With this visual processing method of the invention, when determining the gradation transformation property of the target image region, the determination is performing using not only the target image data of the target image region but also the surrounding image data of the surrounding image region. Thus, it is possible to add a spatial processing effect to the gradation processing of the target image region, allowing gradation processing that further enhances the visual effect to be achieved.

The visual processing method according to a sixteenth aspect of the invention is the visual processing method according to the fifteenth aspect of the invention in which the gradation transformation property derivation step includes a characteristic parameter derivation step of using the target image data and the surrounding image data to derive a characteristic parameter, which is a parameter that indicates a characteristic of the target image region, and a gradation transformation property determination step of determining the gradation transformation property based on the characteristic parameter of the target region that is derived in the characteristic parameter derivation step.

With this visual processing method of the invention, the characteristic parameter is derived using not only the target image data but also surrounding image data. Thus, it is possible to add a spatial processing effect to the gradation processing of the target image region, allowing gradation processing that further enhances the visual effect to be achieved. As more specific examples of this effect, it is possible to keep pseudo-borders from occurring due to the gradation processing. Further, the boundary of the target image region can be prevented from standing out unnaturally.

The visual processing program according to a seventeenth aspect of the invention is a visual processing program for using a computer to perform a visual processing method of gradation processing each image region of an image signal that has been received as input. The visual processing method comprises a gradation transformation property derivation step and a gradation processing step. The gradation transformation property derivation step is a step of using surrounding image data of at least one surrounding image region, which is an image region that is positioned proximal to a target image region that is to be subjected to the gradation processing and which includes a plurality of pixels, to derive a gradation transformation property of the target image region. The gradation processing step is a step of performing gradation processing of the image signal of the target image region based on the gradation transformation property that has been derived.

With the visual processing program of the invention, the surrounding image data of the surrounding image region are used to determine the gradation transformation properties of the target image region. As a result, it is possible to add a spatial processing effect to the gradation processing with respect to each target image region, allowing gradation processing that further enhances the visual effect to be achieved.

The visual processing program according to an eighteenth aspect of the invention is the visual processing method according to the seventeenth aspect of the invention in which the surrounding image region is an image block that has been obtained by partitioning the image signal into predetermined units.

With this visual processing program of the invention, it is possible to process the surrounding image region in image block units. Thus, the processing load required to determine the surrounding image region or to derive the gradation transformation property can be reduced.

The visual processing program according to a nineteenth aspect of the invention is the visual processing program according to the seventeenth or eighteenth aspect of the invention in which the gradation transformation property derivation step further includes using target image data of the target image region to derive the gradation transformation property of the target image region.

With this visual processing program of the invention, when determining the gradation transformation property of the target image region, the determination is performing using not only the target image data of the target image region but also the surrounding image data of the surrounding image region. Thus, it is possible to add a spatial processing effect to the gradation processing of the target image region, allowing gradation processing that further enhances the visual effect to be achieved.

The visual processing program according to a twentieth aspect of the invention is the visual processing program according to the nineteenth aspect of the invention in which the gradation transformation property derivation step includes a characteristic parameter derivation step of using the target image data and the surrounding image data to derive a characteristic parameter, which is a parameter that indicates a characteristic of the target image region, and a gradation transformation property determination step of determining the gradation transformation property based on the characteristic parameter of the target region that is derived in the characteristic parameter derivation step.

With this visual processing program of the invention, the characteristic parameter is derived using not only the target image data but also surrounding image data. Thus, it is possible to add a spatial processing effect to the gradation processing of the target image region, allowing gradation processing that further enhances the visual effect to be achieved. As more specific examples of this effect, it is possible to keep pseudo-borders from occurring due to the gradation processing. Further, the boundary of the target image region can be prevented from standing out unnaturally.

The semiconductor device according to a twenty-first aspect of the invention is a semiconductor device that performs gradation processing with respect to each image region of an image signal that has been received as input, and comprises a gradation transformation property derivation portion and a gradation processing portion. The gradation transformation property derivation portion uses surrounding image data of at least one surrounding image region, which is an image region that is positioned proximal to a target image region that is to be subjected to the gradation processing and which includes a plurality of pixels, to derive the gradation transformation property of the target image region. The gradation processing portion performs gradation processing of the image signal of the target image region based on the gradation transformation property that has been derived.

With the semiconductor device of the invention, the surrounding image data of the surrounding image region are used to determine the gradation transformation properties of the target image region. As a result, it is possible to add a spatial processing effect to the gradation processing with respect to each target image region, allowing gradation processing that further enhances the visual effect to be achieved.

The semiconductor device according to a twenty-second aspect of the invention is the semiconductor device according to the twenty-first aspect of the invention in which the surrounding image region is an image block that has been obtained by partitioning the image signal into predetermined units.

With this semiconductor device of the invention, it is possible to process the surrounding image region in image block units. Thus, the processing load required to determine the surrounding image region or to derive the gradation transformation property can be reduced.

The semiconductor device according to a twenty-third aspect of the invention is the semiconductor device according to the twenty-first or twenty-second aspect of the invention in which the gradation transformation property derivation portion further uses the target image data of the target image region to derive the gradation transformation property of the target image region.

With this semiconductor device of the invention, when determining the gradation transformation property of the target image region, the determination is performing using not only the target image data of the target image region but also the surrounding image data of the surrounding image region. Thus, it is possible to add a spatial processing effect to the gradation processing of the target image region, allowing gradation processing that further enhances the visual effect to be achieved.

The semiconductor device according to a twenty-fourth aspect of the invention is the semiconductor device to the twenty-third aspect of the invention in which the gradation transformation property derivation portion has a characteristic parameter derivation portion that uses the target image data and the surrounding image data to derive a characteristic parameter, which is a parameter that indicates a characteristic of the target image region, and a gradation transformation property determination portion that determines the gradation transformation property based on the characteristic parameter of the target region that has been derived by the characteristic parameter derivation portion.

With this semiconductor device of the invention, the characteristic parameter is derived using not only the target image data but also surrounding image data. Thus, it is possible to add a spatial processing effect to the gradation processing of the target image region, allowing gradation processing that further enhances the visual effect to be achieved. As more specific examples of this effect, it is possible to keep pseudo-borders from occurring due to the gradation processing. Further, the boundary of the target image region can be prevented from standing out unnaturally.

With the visual processing device of the present invention, it is possible to achieve gradation processing that further enhances the visual effect.

BRIEF DESCRIPTION OF DRAWINGS

FIG. 24 is a chart describing the weight coefficient [Wij] (fourth embodiment).

DETAILED DESCRIPTION OF THE INVENTION

First Embodiment

A visual processing device 1 serving as a first embodiment of the present invention is described below using FIGS. 1 to 5. The visual processing device 1 is a device that performs gradation processing of an image, and is provided in or connected to a device that handles images, such as a computer, a television, a digital camera, a portable telephone, or a PDA. The visual processing device 1 is characterized in that it performs gradation processing with respect to each image region that is obtained by partitioning an image more finely than has been the case conventionally.

<Configuration>

Figure 1:
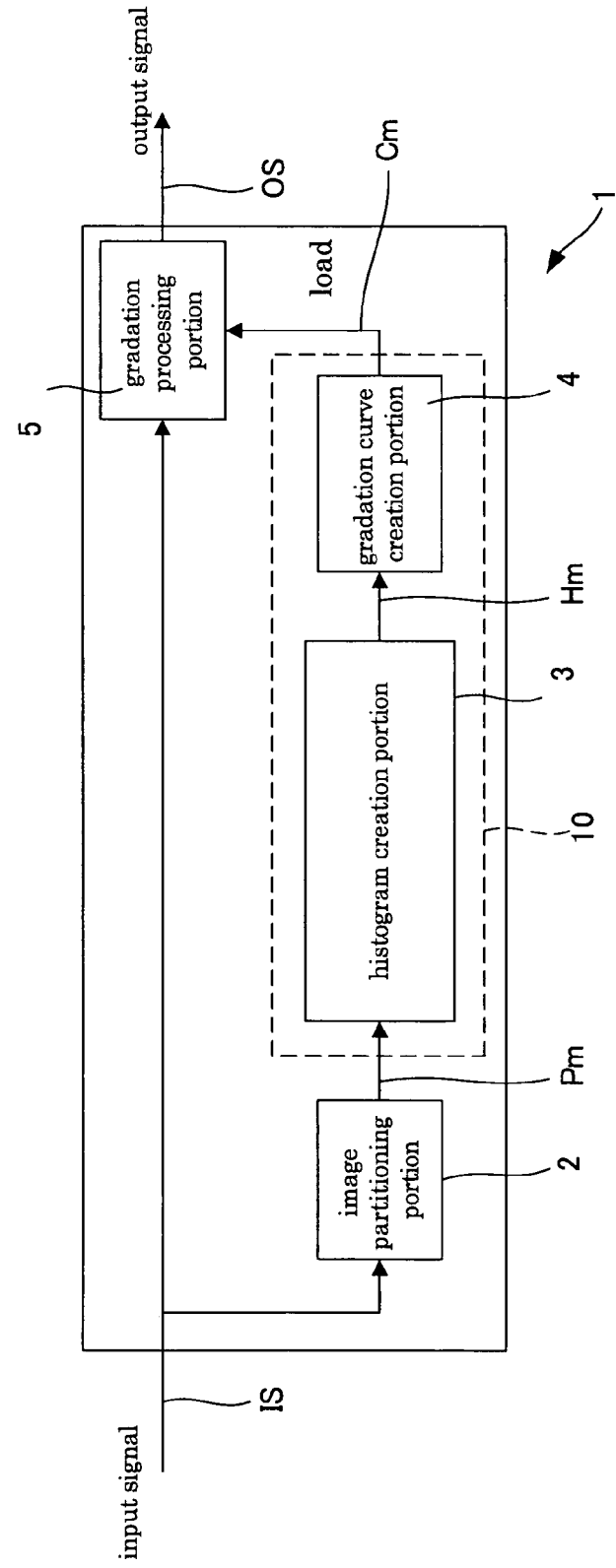
FIG. 1 is a block diagram describing the structure of the visual processing device 1 (first embodiment).

FIG. 1 shows a block diagram for describing the structure of the visual processing device 1. The visual processing device 1 has an image partitioning portion 2 that partitions an original image that has been input as an input signal IS into a plurality of image regions Pm ($1 \leq m - n$; where n is the number of partitions of the original image), a gradation transformation curve derivation portion 10 that derives a gradation transformation curve Cm for each image region Pm, and a gradation processing portion 5 that loads the gradation transformation curves Cm and outputs an output signal OS that is obtained by performing gradation processing with respect to each image region Pm. The gradation transformation curve derivation portion 10 comprises a histogram creation portion 3 that creates a brightness histogram Hm for the pixels of a wide area image region Em, which includes an image region Pm and the image regions surrounding the image region Pm, and a gradation curve creation portion 4 that creates a gradation transformation curve Cm for each image region Pm from the brightness histogram Hm that has been created.

<Action>

Figure 2:
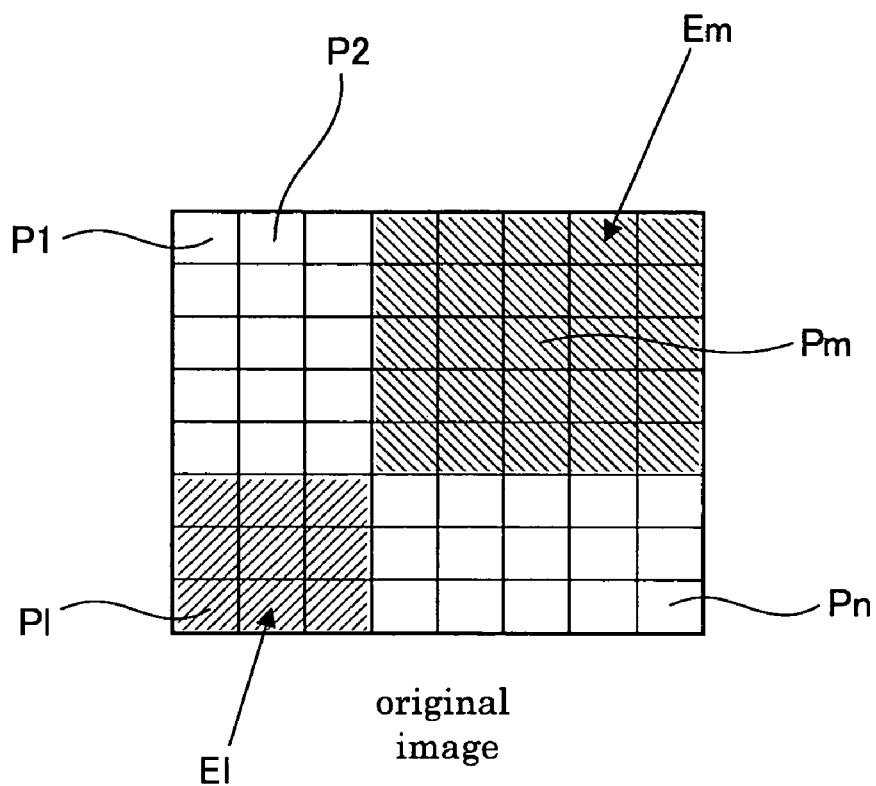
FIG. 2 is an explanatory diagram describing the image region Pm (first embodiment).
Figure 3:
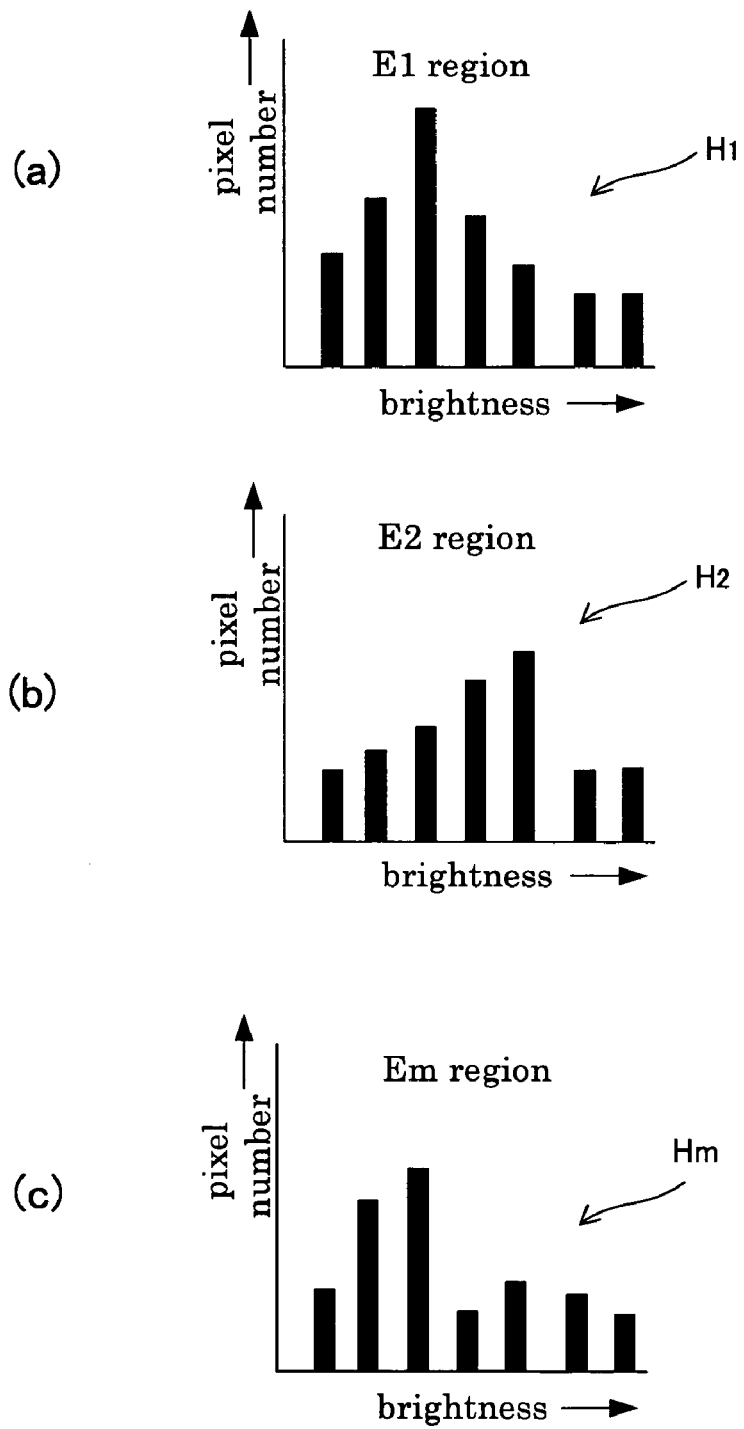
FIG. 3 is an explanatory diagram describing the brightness histogram Hm (first embodiment).
Figure 4:
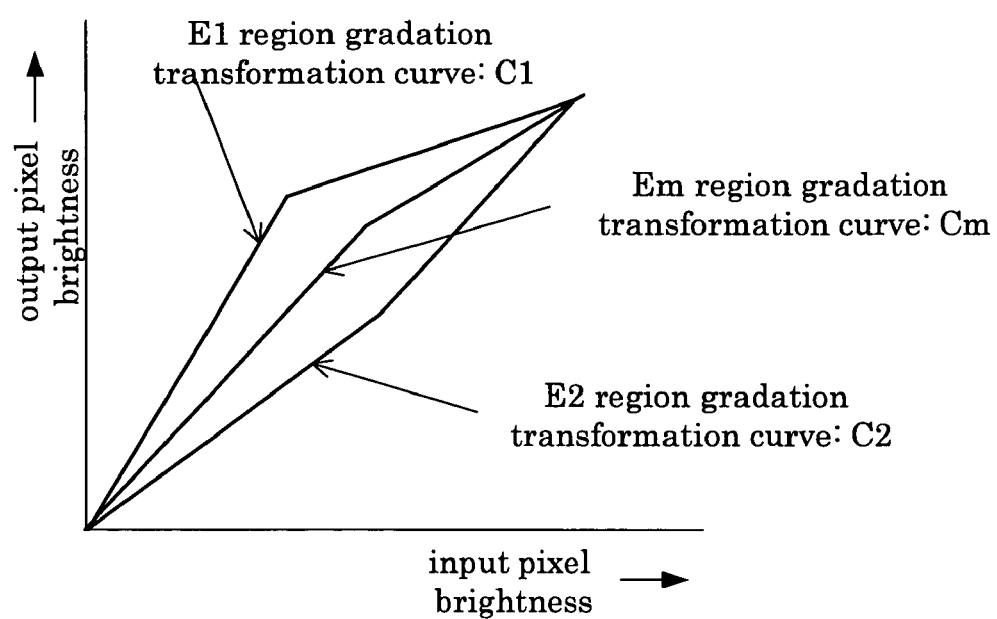
FIG. 4 is an explanatory diagram describing the gradation transformation curves Cm (first embodiment).
Figure 33:
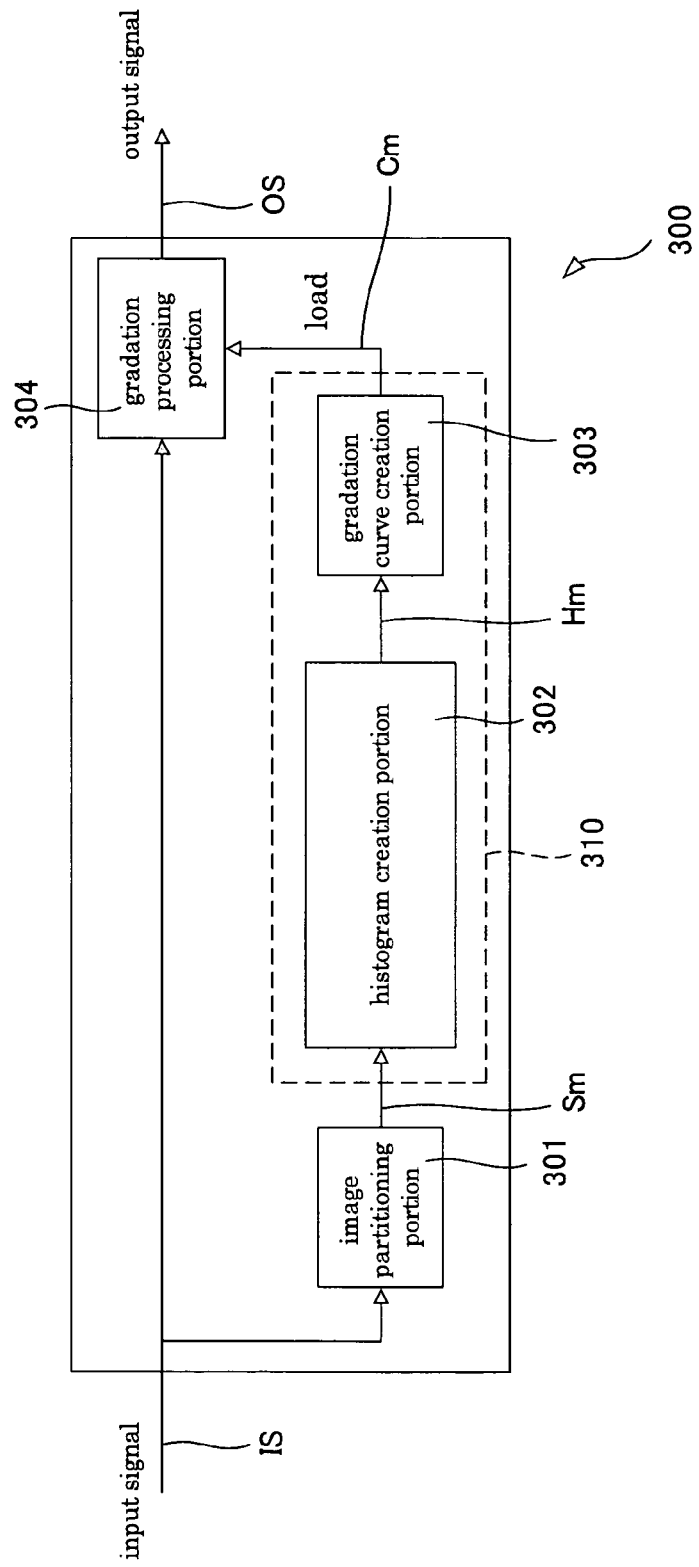
FIG. 33 is a block diagram describing the structure of the visual processing device 300 (background art).
Figure 34:
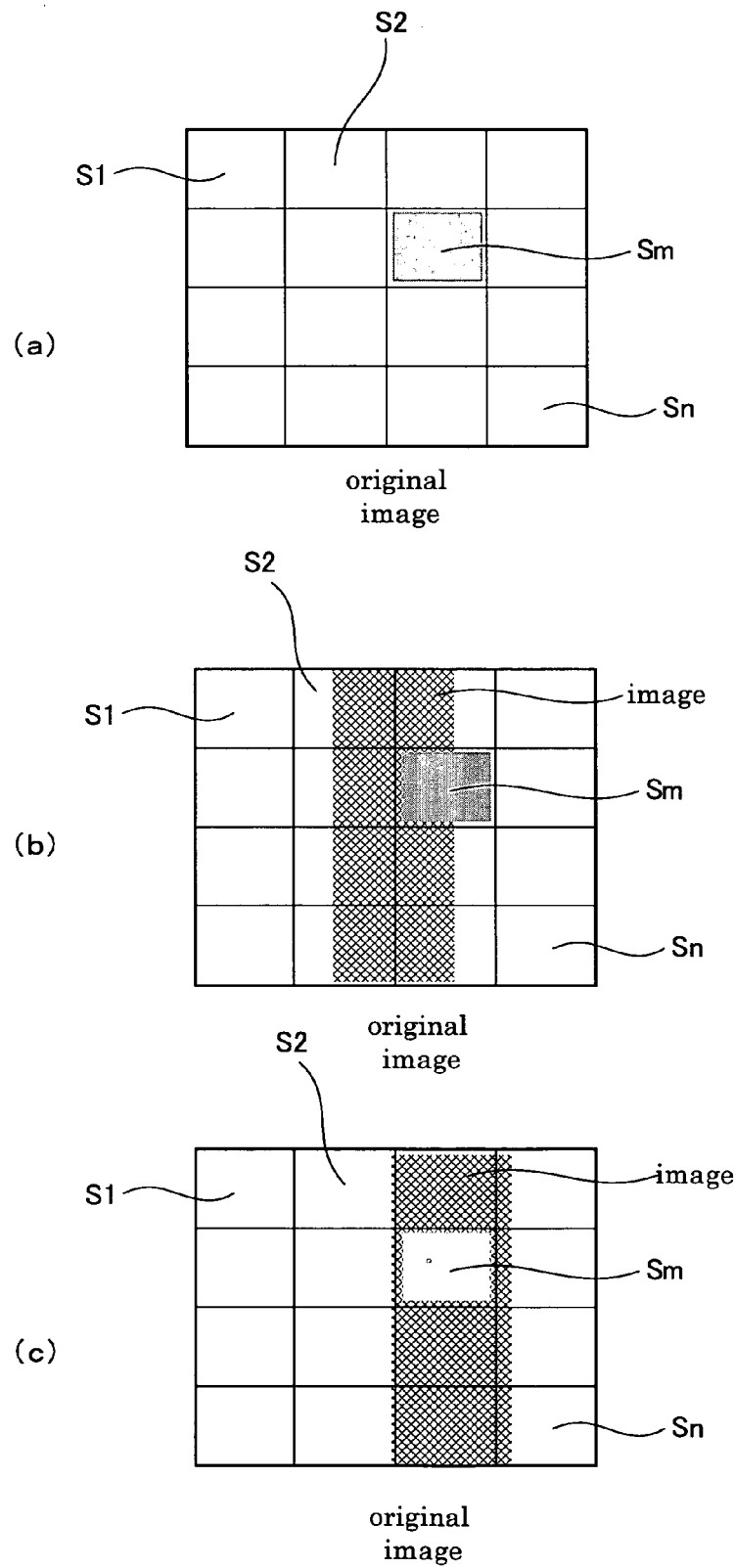
FIG. 34 is an explanatory diagram describing the image region Sm (background art).
Figure 35:
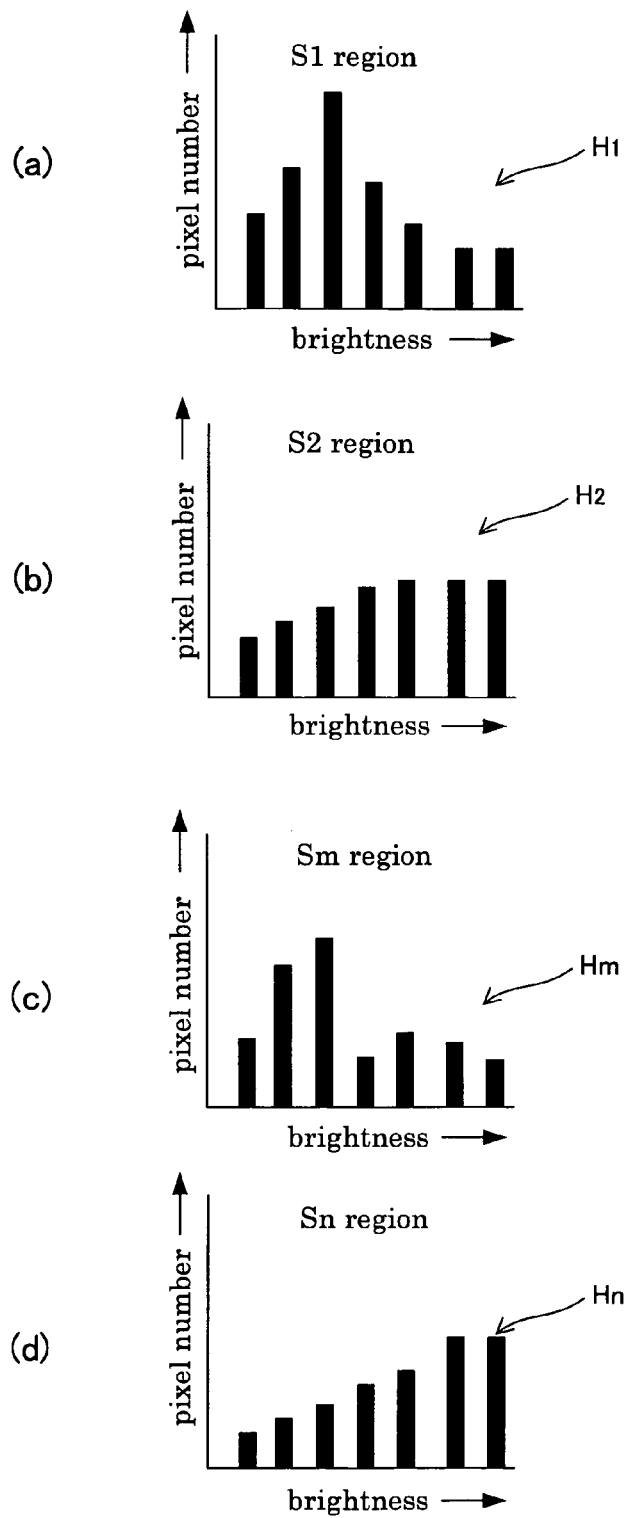
FIG. 35 is an explanatory diagram describing the brightness histogram Hm (background art).
Figure 36:
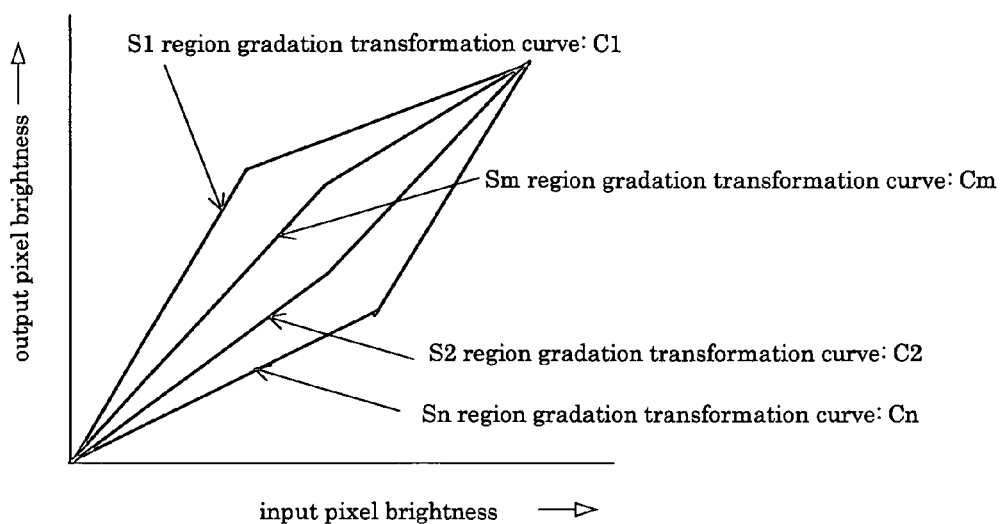
FIG. 36 is an explanatory diagram describing the gradation transformation curves Cm (background art).

The operations of the various portions are described using FIGS. 2 to 4. The image partitioning portion 2 partitions an original image that has been input as an input signal IS into a plurality (n) of image regions Pm (see FIG. 2). Here, the number of partitions of the original image is greater than the partition number (e.g. 4 to 16 partitions) of the conventional visual processing device 300 shown in FIG. 33, and for example is 4800 partitions of 80 partitions in the horizontal direction by 60 partitions in the vertical direction.

The histogram creation portion 3 creates a brightness histogram Hm of the wide area image region Em for each image region Pm. Here, the wide area image region Em is a collection of a plurality of image regions including the respective image region Pm, and for example is a collection of 25 image regions of five blocks in the vertical direction by five blocks in the horizontal direction with the image region Pm at the center. It should be noted that depending on the position of the image region Pm, it may not be possible to take a wide area image region Em having five blocks in the vertical direction by five blocks in the horizontal direction about the image region Pm. For example, in the case of the image region Pl positioned near the original image, it is not possible to obtain a wide area image region El having five blocks in the vertical direction by five blocks in the horizontal direction around the image region Pl. In this case, a region in which five blocks in the vertical direction by five blocks in the horizontal direction about the image region Pl at the center that overlaps the original image is adopted as the wide area image region El. The brightness histogram Hm that is created by the histogram creation portion 3 shows the distribution of the brightness values of all of the pixels in the wide area image region Em. That is, in the brightness histograms Hm shown in FIGS. 3(*a*) to (*c*), the horizontal axis shows the brightness level of the input signal IS and the vertical axis shows the pixel number.

The gradation curve creation portion 4 cumulates the "pixel number" of the brightness histogram Hm of the wide area image region Em in the order of brightness and adopts this cumulative curve as the gradation transformation curve Cm of the image region Pm (see FIG. 4). In the gradation transformation curves Cm shown in FIG. 4, the horizontal axis shows the brightness value of the pixels of the image region Pm in the input signal IS, and the vertical axis shows the brightness value of the pixels of the image region Pm in the output signal OS. The gradation processing portion 5 loads the gradation transformation curve Cm, and based on that gradation transformation curve Cm, transforms the brightness value of the pixels of the image region Pm in the input signal IS.

<Visual Processing Method and Visual Processing Program>

Figure 5:
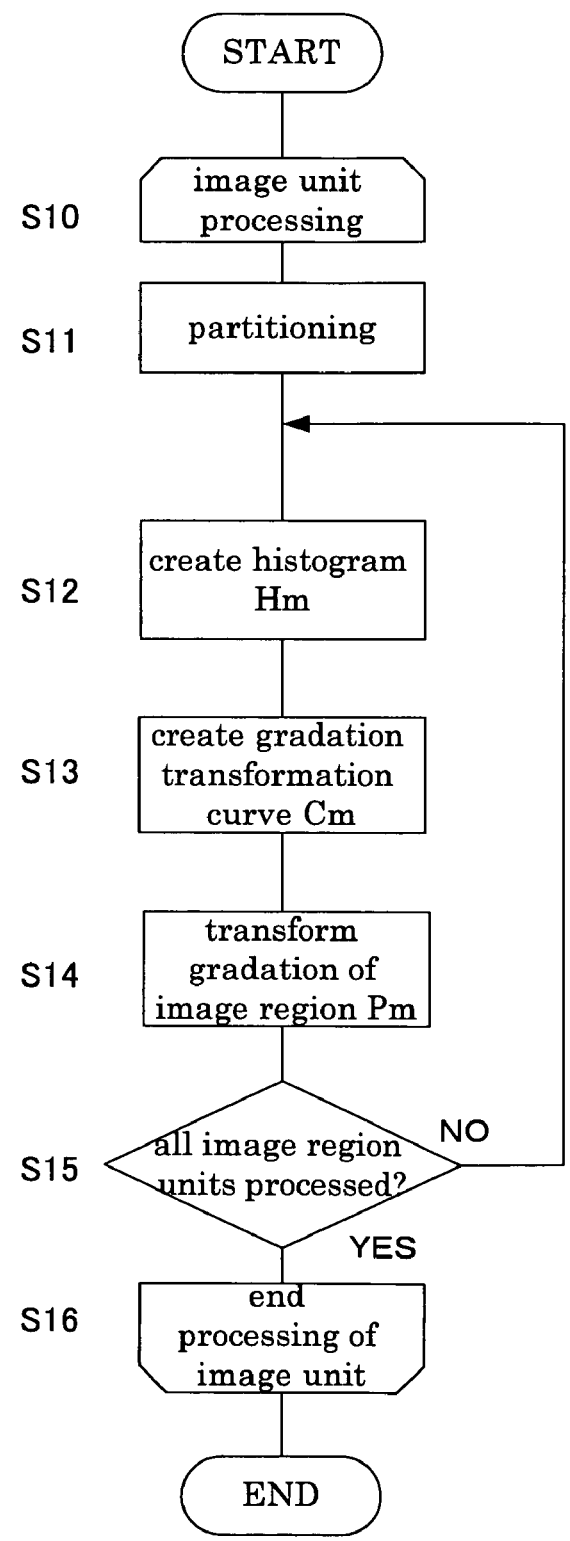
FIG. 5 is a flowchart describing the visual processing method (first embodiment).

FIG. 5 shows a flowchart for describing the visual processing method of the visual processing device 1. The visual processing method shown in FIG. 5 is achieved by hardware in the visual processing device 1, and is a method for performing gradation processing of an input signal IS (see FIG. 1). With the visual processing method shown in FIG. 5, the input signal IS is provided in image units (steps S10 to S16). The image unit performs processing (step S10). An original image that has been input as the input signal IS is partitioned into a plurality of image regions Pm ($1 \leq m \leq n$; where n is the number of partitions of the original image) (step S11), and gradation processing is performed for each image region Pm (steps S12 to S15).

A brightness histogram Hm of the pixels of a wide area image region Em comprising the respective image region Pm and the image regions surrounding that image region Pm is created (step S12). A gradation transformation curve Cm for that image region Pm is then created based on the brightness histogram Hm (step S13). Description of the brightness histogram Hm and the gradation transformation curve Cm is omitted here (see the section <Action> above). The gradation transformation curve Cm that is created is used to perform gradation processing with respect to the pixels of the image region Pm (step S14). Next it is determined whether or not processing of all of the image regions Pm is finished (step S15), and until it is determined that processing is finished, the processing of steps S12 to S15 is repeated, the number of time it is repeated being equal to the number of partitions of the original image. With this, processing in image units is finished (step S16).

It should be noted that each step of the visual processing method shown in FIG. 5 can also be achieved as a visual processing program by a computer or the like.

<Effects>

(1)

A gradation transformation curve Cm is created for each image region Pm. Thus, it is possible to perform more suitable gradation processing than if the same gradation transformation is performed with respect to the entire original image.

(2)

The gradation transformation curve Cm created for each image region Pm is created based on the brightness histogram Hm of the wide area image region Em. Thus, it is possible to sufficiently sample the brightness values even though each image region Pm is small. As a result, it is possible to create a suitable gradation transformation curve Cm even for small image regions Pm.

(3)

The wide area image regions correspond to adjacent image regions are overlapped. Thus, the gradation transformation curves for adjacent image regions often show similar trends. For this reason, a spatial processing effect can be added to the gradation processing of each image region, allowing the junction at the border between adjacent image regions to be kept from standing out unnaturally.

(4)

The size of each image region Pm is smaller than the conventional case. This allows pseudo-borders to be kept from occurring within the image regions Pm.

Modified Examples

The present invention is not limited to the foregoing embodiment, and various modifications are possible without departing from the gist thereof.

(1)

In the foregoing embodiment, 4800 partitions were given as an example of the partition number of the original image, but the effect of the present invention is not limited to instances where this is the case, and the same effects can be obtained with other partition numbers. It should be noted that with regard to the partition number there is a tradeoff between the amount of gradation processing and the visual effects. That is, increasing the partition number increases the processing amount of gradation processing but on the other hand yields better visual effects (e.g. the inhibition of a pseudo-border).

(2)

In the above embodiment, 25 was given as an example of the number of image regions making up the wide area image region, but the effects of the present invention are not limited to instances where this is the case, and the same effects can be achieved with other numbers.

Second Embodiment

A visual processing device 11 serving as a second embodiment of the present invention is described below using FIGS. 6 to 18. The visual processing device 11 is a device that performs gradation processing of an image, and is provided in or connected to a device that handles images, such as a computer, a television, a digital camera, a portable telephone, or a PDA. The visual processing device 11 is characterized in that it switches between and uses a plurality of gradation transformation curves stored in advance as a LUT.

<Configuration>

Figure 6:
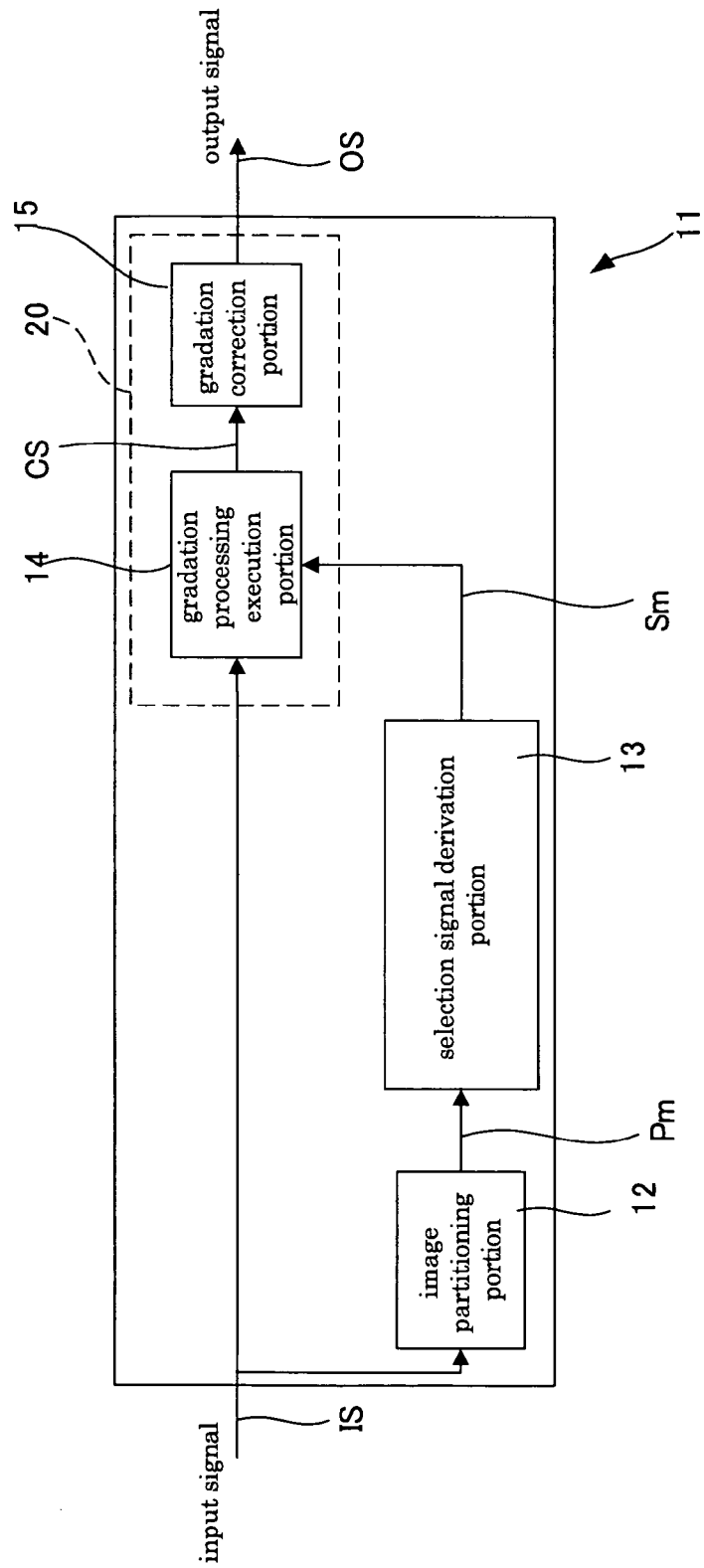
FIG. 6 is a block diagram describing the structure of the visual processing device 11 (second embodiment).

FIG. 6 shows a block diagram that describes the structure of the visual processing device 11. The visual processing device 11 is provided with an image partitioning portion 12, a selection signal derivation portion 13, and a gradation processing portion 20. The image partitioning portion 12 receives an input signal IS as an input and partitions the original image that is input as the input signal IS into a plurality of image regions Pm ($1 \leq m \leq n$; where n is the number of partitions of the original image), and outputs these. The selection signal derivation portion 13 outputs a selection signal Sm for selecting a gradation transformation curve Cm to be adopted for gradation processing for each image region Pm. The gradation processing portion 20 is provided with a gradation processing execution portion 14 and a gradation correction portion 15. The gradation processing execution portion 14 is provided with a plurality of gradation transformation curve candidates G1 to Gp (where p is the candidate number) as a two-dimensional LUT, and receives the input signal IS and a selection signal Sm as input and outputs a gradation processed signal CS that is obtained by performing gradation processing of the pixels within that image region Pm. The gradation correction portion 15 receives the gradation processed signal CS as input, corrects the gradation of the gradation processed signal CS, and then outputs the result as an output signal OS.

<Regarding the Gradation Transformation Curve Candidates>

Figure 7:
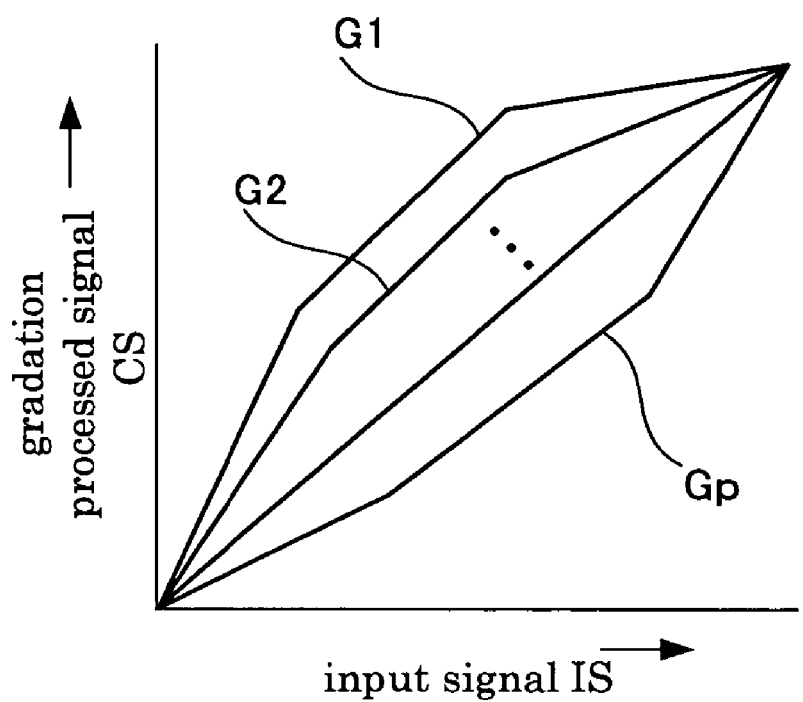
FIG. 7 is an explanatory diagram describing the gradation transformation curve candidates G1 to Gp (second embodiment).

The gradation transformation curve candidates G1 to Gp are described using FIG. 7. The gradation transformation curve candidates G1 to Gp are curves that give the relationship between the brightness values of the pixels of the input signal IS and the brightness values of the pixels of the gradation processed signal CS. In FIG. 7, the horizontal axis shows the brightness values of the pixels in the input signal IS, and the vertical axis shows the brightness values of the pixels in the gradation processed signal CS. The gradation transformation curve candidates G1 to Gp decrease monotonically in correspondence with their subscript, and the relationship $G1 \geq G2 \geq \ldots \geq Gp$ is achieved with regard to the brightness values of all pixels of the input signal IS. For example, the gradation transformation curve candidates G1 to Gp each are "power functions" whose variable is the brightness value of the pixels of the input signal IS, and if represented by $Gm=x^{(\delta m)}$ ($1 \leq m \leq p$; where x is a variable and $\delta m$ is constant), then $\delta 1 \leq \delta 2 \leq \ldots \leq \delta p$. Here, the brightness value of the input signal IS is a value in the range [0.0 to 1.0].

It should be noted that it is also possible for the above relationship of the gradation transformation curve candidates G1 to Gp to not hold for gradation transformation curve candidates whose subscript is large if the input signal IS is small, or for gradation transformation curve candidates whose subscript is small if the input signal IS is large. This is because such cases are rare and the effect on picture quality is small.

Figure 8:
FIG. 8 is an explanatory diagram describing the two-dimensional LUT 41 (second embodiment).

The gradation processing execution portion 14 is provided with the gradation transformation curve candidates G1 to Gp as a two-dimensional LUT. That is, the two-dimensional LUT is a lookup table (LUT) that gives a brightness value of the pixels of the gradation processed signal CS, with respect to the brightness value of the pixels of the input signal IS and the selection signal Sm for selecting a gradation transformation curve candidate G1 to Gp. FIG. 8 shows an example of this two-dimensional LUT. The two-dimensional LUT 41 shown in FIG. 8 is a matrix of 64 rows by 64 columns, the gradation transformation curve candidates G1 to G64 lined up in the row direction (horizontal direction). In the column direction (vertical direction) of the matrix are lined up the pixel values of the gradation processed signals CS corresponding to the value of the upper six bits of the pixel value of the input signal IS, which is for example expressed with 10 bits, that is, to the value of an input signal IS that has been segregated into 64 levels. The pixel value of the gradation processed signals CS has a value in the range of [0.0 to 1.0] if the gradation transformation curve candidates G1 to Gp are "power functions."

<Action>

The operations of the various portions are described here. The image partitioning portion 12 has substantially the same operation as the image partitioning portion 2 of FIG. 1, and partitions an original image that has been received as an input signal IS into a plurality (n) of image regions Pm (see FIG. 2). Here, the number of partitions of the original image (i) is greater than the number of partitions (e.g. 4 to 16 partitions) of the conventional visual processing device 300 shown in FIG. 33, and (ii) for example is 4800 partitions of 80 partitions in the horizontal direction by 60 partitions in the vertical direction.

The selection signal derivation portion 13 selects a gradation transformation curve Cm to be adopted for each image region Pm from among the gradation transformation curve candidates G1 to Gp. More specifically, the selection signal derivation portion 13 calculates the mean brightness value of the wide area image region Em that includes the image region Pm and selects one of the gradation transformation curve candidates G1 to Gp in accordance with that mean brightness value that is calculated. That is, each gradation transformation curve candidate G1 to Gp corresponds to a mean brightness value of the wide area image region Em, and the larger the mean brightness value, the larger the subscript of the gradation transformation curve candidate G1 to Gp that is selected.

Here, the wide area image region Em is the same as that described in [First Embodiment] using FIG. 2. That is, the wide area image region Em is a collection of a plurality of image regions including the image region Pm, and for example is a collection of 25 image regions of five blocks in the vertical direction by five blocks in the horizontal direction with the image region Pm at the center. It should be noted that depending on the position of the image region Pm, it may not be possible to acquire a wide area image region Em having five blocks in the vertical direction by five blocks in the horizontal direction around the image region Pm. For example, in the case of the image region Pl, which is positioned near the original image, it is not possible to take a wide area image region El having five blocks in the vertical direction by five blocks in the horizontal direction around the image region Pl. In this case, a region in which five blocks in the vertical direction by five blocks in the horizontal direction about the image region P1 that overlaps the original image is adopted as the wide area image region El.

The selection by the selection signal derivation portion 13 is output as a selection signal Sm that specifies one of the gradation transformation curve candidates G1 to Gp. More specifically, the selection signal Sm is output as the value of the subscript (1 to p) of the gradation transformation curve candidate G1 to Gp.

The gradation processing execution portion 14 receives as input the brightness values of the pixels of the image region Pm included in the input signal IS and the selection signal Sm, and for example using the two-dimensional LUT 41 shown in FIG. 8, outputs the brightness values of the gradation processed signal CS.

The gradation correction portion 15 corrects the brightness values of the pixels of the image portion Pm included in the gradation processed signal CS based on the pixel position and the gradation transformation curve that has been selected for the image region Pm and the image regions around the image region Pm. For example, the gradation transformation curve Cm that has been adopted for the pixels of the image region Pm and the gradation transformation curve that has been adopted for the image regions around the image region Pm are corrected by the internal division ratio of the pixel positions, obtaining post-correction brightness values of the pixels.

Figure 9:
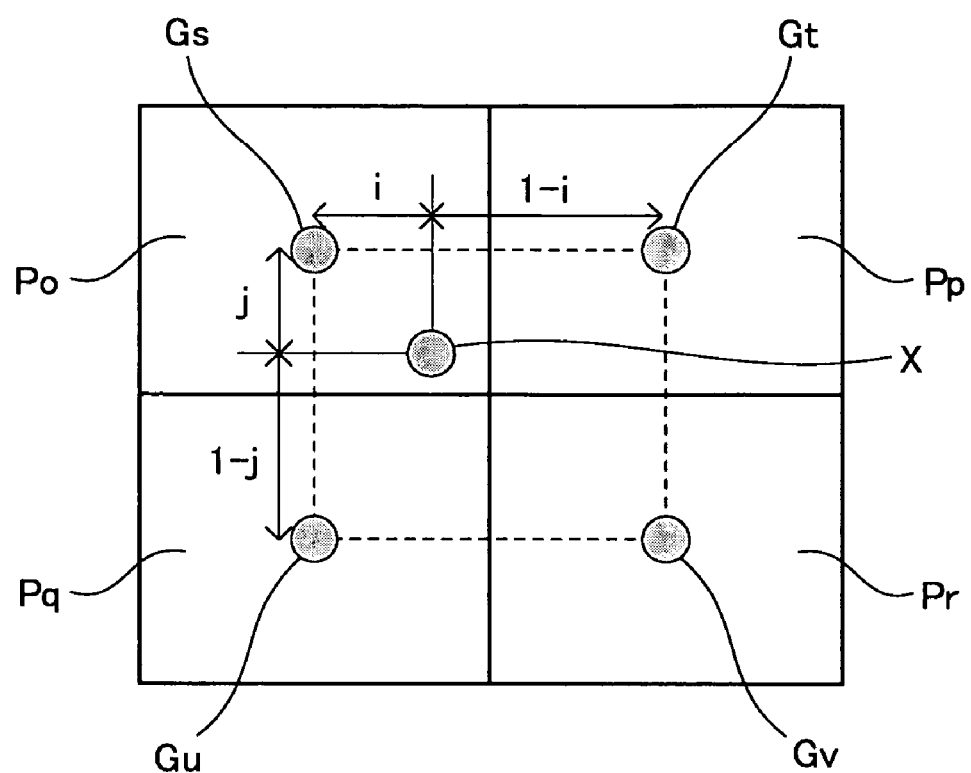
FIG. 9 is an explanatory diagram describing the operation of the gradation correction portion 15 (second embodiment).

The operation of the gradation correction portion 15 is described in greater detail using FIG. 9. FIG. 9 shows that the gradation transformation curve candidates Gs, Gt, Gu, and Gv (where s, t, u, and v are positive integers that are not more than the candidate number p of the gradation transformation curves) have been selected as the gradation transformation curves Co, Cp, Cq, and Cr of the image regions Po, Pp, Pq, and Pr (where o, p, q, and r are positive integers not more than the partition number n (see FIG. 2)).

Here, the position of the pixel x (having the brightness value [x]) of the image region Po, whose gradation is to be corrected, shall be the position obtained by interpolating the center of the image region Po and the center of the image region Pp by [i:1−i] and interpolating the center of the image region Po and the center of the image region Pq by [j:1−j]. In this case, the brightness value [x'] of the pixel x after gradation correction is obtained by $[x'] = \{(1-j)\cdot(1-i)\cdot[Gs]+(1-j)\cdot(i)\cdot[Gt]+(j)\cdot(1-i)\cdot[Gu]+(j)\cdot(i)\cdot[Gv]\}\cdot\{[x]/[Gs]\}$. It should be noted that [Gs], [Gt], [Gu], and [Gv] are the brightness values in a case where the gradation transformation curve candidates Gs, Gt, Gu, and Gv are applied to the brightness value [x].

<Visual Processing Method and Visual Processing Program>

Figure 10:
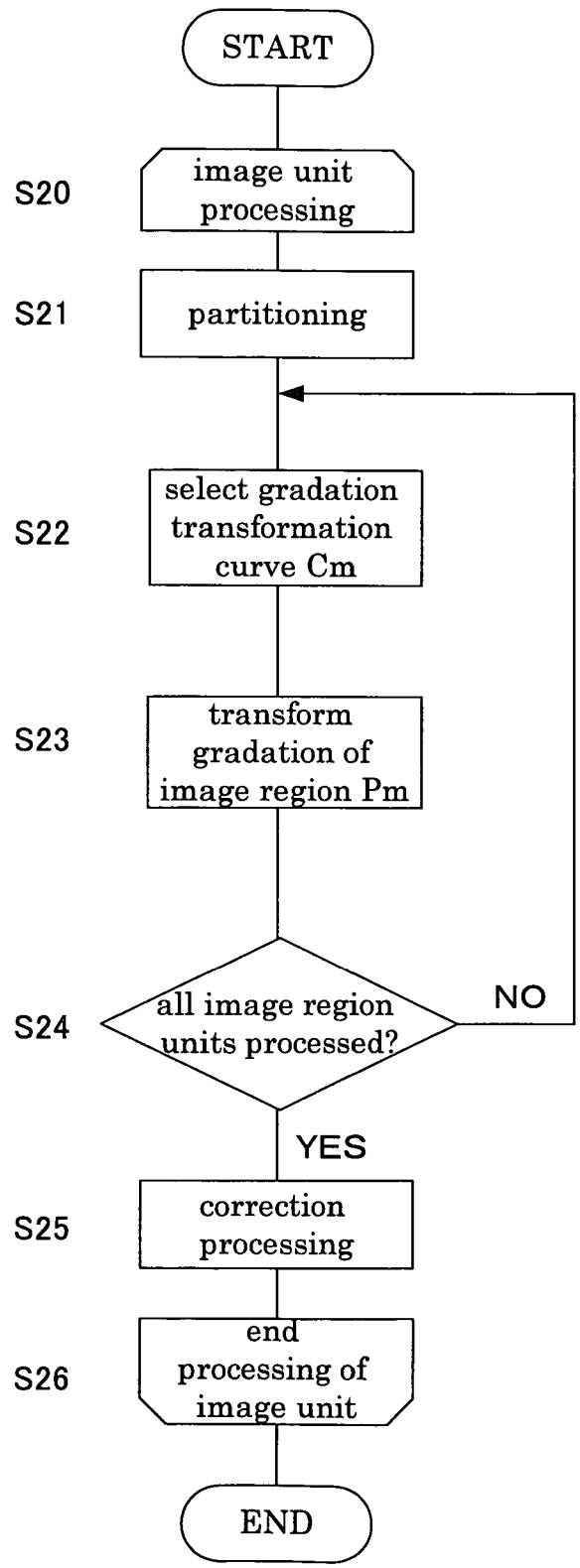
FIG. 10 is a flowchart describing the visual processing method (second embodiment).

FIG. 10 shows a flowchart describing the visual processing method of the visual processing device 11. The visual processing method shown in FIG. 10 is achieved by the hardware in the visual processing device 11, and is a method of performing gradation processing of an input signal IS (see FIG. 6). With the visual processing method shown in FIG. 10, the input signal IS is processed in image units (steps S20 to S26). The image unit performs processing (S20). An original image that is input as the input signal IS is partitioned into a plurality of image regions Pm ($1 \leq m \leq n$; where n is the number of partitions of the original image) (step S21), and gradation processing is performed for each image region Pm (steps S22 to S24).

In processing of each image region Pm, a gradation transformation curve Cm to be adopted for that image region Pm is selected from among the gradation transformation curve candidates G1 to Gp (step S22). More specifically, the mean brightness value of the wide area image region Em for the image region Pm is calculated and one of the gradation transformation curve candidates G1 to Gp is selected in accordance with that mean brightness value that is calculated. The gradation transformation curve candidates G1 to Gp are correlated to a mean brightness value of the wide area image region Em, and the larger the mean brightness value, the larger the subscript of the gradation transformation curve candidate G1 to Gp that is selected. Description of the wide area image region Em is omitted here (see the <Actions> section above).

The brightness value of the gradation processed signal CS corresponding to the brightness value of the pixels of the image region Pm of the input signal IS and the selection signal Sm that indicates the gradation transformation curve candidate that has been selected in step S22 from among the gradation transformation curve candidates G1 to Gp, is obtained using the two-dimensional LUT 41 shown in FIG. 8, for example, and output (step S23). Then, it is determined whether or not processing of all image regions Pm has finished (step S24), and until it is determined that processing is finished, the processes of steps S22 to S24 are repeated, for a number of times equal to the number of partitions of the original image. With this, processing of the image region units is finished.

The brightness value of the pixels of the image region Pm included in the gradation processed signal CS is then corrected based on the position of the pixels and the gradation transformation curves selected for the image region Pm and the image regions surrounding the image region Pm (step S25). For example, the gradation transformation curve Cm that has been adopted for the pixels of the image region Pm and the gradation transformation curves that have been selected for the image regions around the image region Pm are corrected by the internal division ratio of the pixel positions, finding the brightness value of the pixels after correction. The specific details of this correction are omitted here (see above section <Action>, FIG. 9).

With this, processing of the image units is finished (step S26).

It should be noted that the steps of the visual processing method shown in FIG. 10 can also be accomplished by a computer as a visual processing program, for example.

<Effects>

With the present invention, it is possible to obtain substantially the same effects as those discussed under [First Embodiment]<Effects>. Only those effects that are unique to the second embodiment are discussed below.

(1)

The gradation transformation curves Cm that are selected for the respective image regions Pm are created based on the mean brightness value of the wide area image region Em. Thus, sufficient sampling of the brightness value is possible even though the size of the image region Pm is small. As a result, even for small image regions Pm it is possible to select and apply an appropriate gradation transformation curve Cm.

(2)

The gradation processing execution portion 14 has a two-dimensional LUT that has been created in advance. The processing burden required for gradation processing, and more specifically the processing burden required for creation of the gradation transformation curves Cm, can thus be reduced. This allows the image regions Pm to be gradation processed faster.

(3)

The gradation processing execution portion 14 executes gradation processing using a two-dimensional LUT. The two-dimensional LUT is read from a memory device such as a hard disk or a ROM provided in the visual processing device 11 and is used for the gradation processing. By changing the content of the two-dimensional LUT that is read out, it is possible to execute a variety gradation processing without changing the hardware configuration. That is, gradation processing that is more suited to the characteristics of the original image can be accomplished.

(4)

The gradation correction portion 15 uses a single gradation transformation curve Cm to correct the gradation of pixels of the image region Pm that have been subjected to gradation processing. Thus, it is possible to obtain an output signal OS that has been more suitably gradation processed. For example, it becomes possible to inhibit the occurrence of pseudo-borders. It also becomes possible to further prevent the junction between borders of the various image regions Pm from standing out unnaturally in the output signal OS.

Modified Examples

The present invention is not limited to the foregoing embodiment, and various modifications and improvements thereof are possible without departing from the gist of the invention.

(1)

In the foregoing embodiment, 4800 partitions were given as an example of the number of partitions of the original image, but the effect of the present invention is not limited to instances where this is the case, and the same effects can be obtained with other numbers of partitions. It should be noted that with regard to the partition number there is a tradeoff between the gradation processing burden and the visual effects. That is, increasing the partition number increases the processing burden of gradation processing but on the other hand leads to a better visual effect (e.g. the inhibition of pseudo-borders).

(2)

In the above embodiment, 25 was given as an example of the number of image regions making up the wide area image region, but the effects of the present invention are not limited to instances where this is the case, and the same effects can be achieved with other numbers.

(3)

In the foregoing embodiment, a two-dimensional LUT 41 comprising a 64 row×64 column matrix served as an example of the two-dimensional LUT. The effects of the invention, however, are not limited to a two-dimensional LUT of this size. For example, it is also possible for the two-dimensional LUT to be a matrix in which an even greater number of gradation transformation curve candidates are arranged in the row direction. Alternatively, it is also possible for the pixel values of the gradation processed signals CS corresponding to values obtained by separating the pixel values of the input signal IS in finer stages to be arranged in the column direction of the matrix. More specifically, the matrix can include the pixel values of the gradation processed signal CS arranged corresponding to the pixel values of an input signal IS that is expressed with 10 bits.

A large two-dimensional LUT allows more suitable gradation processing to be performed, whereas a small two-dimensional LUT allows the amount of memory for storing the two-dimensional LUT to be reduced.

(4)

In the foregoing embodiment, it was explained that the pixel values of the gradation processing signals CS corresponding to the upper six bit values of the pixel values of the input signal IS, which is for example expressed with 10-bits, that is, the values of the input signal IS after being divided into 64 levels, are lined up. Here, it is also possible for the gradation processed signal CS to be output as a component of the matrix obtained by linear interpolation with the value of the lower four bits of the pixel value of the input signal IS by the gradation processing execution portion 14. That is, the components of the matrix corresponding to the value of the upper six bits of the pixel value of the input signal IS, which is for example expressed with 10 bits, are arranged in the column direction of the matrix, and the components of the matrix corresponding to the value of the upper six bits of the pixel value of the input signal IS and the components of the matrix corresponding to the values obtained by adding a [1] to the value of the upper six bits of the pixel value of the input signal IS (for example, in FIG. 8, the components of one row) are linearly interpolated using the value of the lower four bits of the pixel value of the input signal IS, and the result is output as the gradation processed signal CS.

By doing this, more suitable gradation processing can be performed even though the two-dimensional LUT 41 (see FIG. 8) is small in size.

(5)

In the foregoing embodiment, it was explained that a gradation transformation curve Cm to be adopted for the image region Pm is selected based on the mean brightness value of the wide area image region Em. Here, the method of selecting the gradation transformation curve Cm is not limited to this method. For example, it is also possible to select the gradation transformation curve Cm to be adopted for the image region Pm based on the maximum brightness value or the minimum brightness value of the wide area image region Em. It should be noted that when selecting the gradation transformation curve Cm, the value [Sm] of the selection signal Sm can be the mean brightness value, the maximum brightness value, or the minimum brightness value of the wide area image region Em. In this case, the gradation transformation curve candidates G1 to G64 are correlated to the respective values obtained by dividing into 64 levels the value that can be taken by the selection signal Sm.

For example, it is also possible to select the gradation transformation curve Cm to be adopted for the image region Pm in the following manner. That is, the mean brightness value is found for each of the image regions Pm and then from these mean brightness values, a provisional selection signal Sm' is found for each image region Pm. Here, the value of the provisional selection signal Sm' is the number of the subscript of the gradation transformation curve candidates G1 to Gp. Then, for the image regions included in the wide area image region Em, the values of the provisional selection signals Sm' are averaged to find the value [Sm] of the selection signal Sm for the image region Pm, and the candidate of the gradation transformation curve candidates G1 to Gp whose subscript is the integer closest to the value [Sm] is selected as the gradation transformation curve Cm.

(6)

Figure 11:
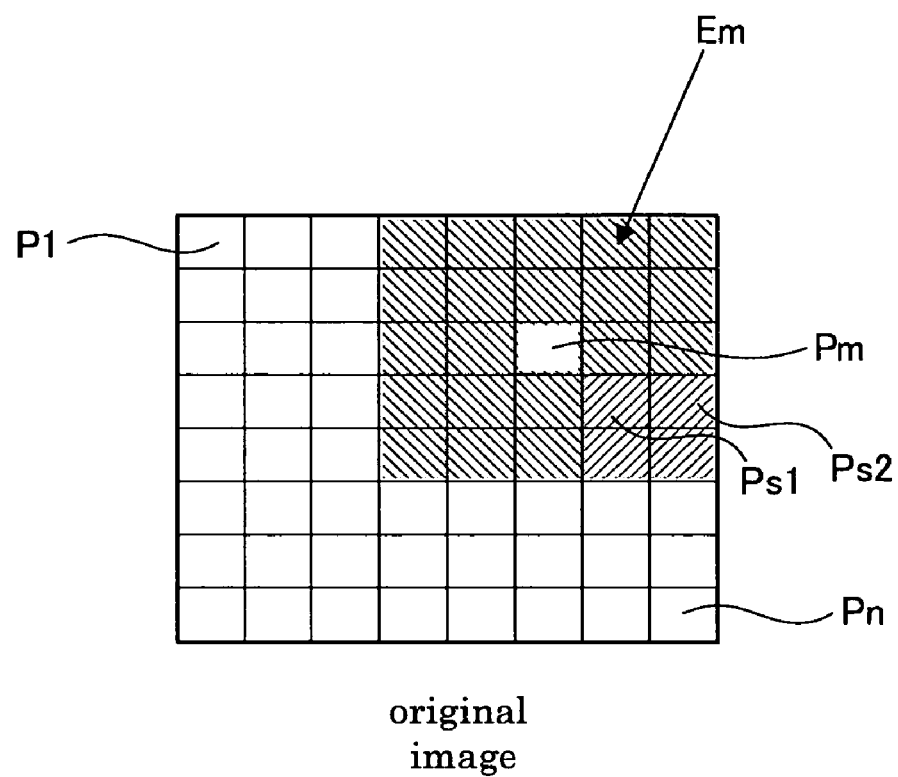
FIG. 11 is an explanatory diagram describing a modified example of selection of the gradation transformation curve Cm (second embodiment).

In the foregoing embodiment, it was explained that the gradation transformation curve Cm to be adopted for the image region Pm is selected based on the mean brightness value of the wide area image region Em. Here, it is also possible for the gradation transformation curve Cm to be adopted for the image region Pm to be selected based on a weighted mean rather than a simple mean of the wide area image region Em. For example, as shown in FIG. 11, it is possible to find the mean brightness value of each of the image regions making up the wide area image region Em, and then reduce the weight or exclude the image regions Ps1, Ps2, . . . that have a mean brightness value that significantly differs from the mean brightness value of the image region Pm, and have the result serve as the mean brightness value of the wide area image region Em.

By doing this, if the wide area image region Em includes regions with a peculiar brightness (for example, a case in which the wide area image region Em includes the border between two objects with different brightness values), the effect that the brightness values of those peculiar regions has on selection of the gradation transformation curve Cm to be adopted for the image region Pm is reduced, and this allows more suitable gradation processing to be performed.

(7)

In the foregoing embodiment, the gradation correction portion 15 is optional. That is, even if the gradation processed signal CS is output, the same effects as those set forth under [First Embodiment]<Effects> and those set forth under [Second embodiment]<Effects> (1) and (2) can be obtained over those of the conventional visual processing device 300 (see FIG. 33).

(8)

In the foregoing embodiment, it was explained that the gradation transformation curve candidates G1 to Gp decrease monotonically in correspondence with their subscript, satisfying the relationship G1≧G2≧ . . . ≧Gp with respect to the brightness values of all the pixels of the input signal IS. Here, it is also possible for the gradation transformation curve candidates G1 to Gp provided in the two-dimensional LUT to not satisfy the relationship G1≧G2≧ . . . ≧Gp for some of the brightness values of the pixels of the input signal IS. That is, it is also possible for some of the gradation transformation curve candidates G1 to Gp to intersect one another.

For example, in cases where the value of the input signal IS is large but the mean brightness value of the wide area image region Em is small, such as small bright spots within a dark nighttime scene (such as neon spots in an evening scene), the value of the image signal after gradation processing has little impact on the picture quality. In such a case, it is not necessary for the gradation transformation curve candidates G1 to Gp of the two-dimensional LUT to satisfy the relationship G1≧G2≧ . . . ≧Gp with respect to some of the brightness values of the pixels of the input signal IS. That is, any value stored in the two-dimensional LUT can be adopted for portions where the value after gradation processing has little impact on the picture quality.

It should be noted that even in a case where any value can be stored in the two-dimensional LUT, it is preferable to maintain the relationship of the values that are stored with respect to a same input signal IS and a selection signal Sm monotonically decreasing or monotonically increasing with respect to the values of the input signal IS and the selection signal Sm.

Further, in the foregoing embodiment it was explained that the gradation transformation curve candidates G1 to Gp of the two-dimensional LUT are "power functions." Here, it is not absolutely necessary for the gradation transformation curve candidates G1 to Gp to be formulated as "power functions." For example, they can also be functions that have an S-shape or an inverted S-shape.

(9)

It is also possible for the visual processing device 11 to be further provided with a profile data creation portion for creating profile data, which are the values stored in the two-dimensional LUT. More specifically, the profile data creation portion comprises the image partitioning portion 2 and the gradation transformation curve derivation portion 10 of the visual processing device 1 (see FIG. 1), and stores a collection of a plurality of gradation transformation curves that have been created in the two-dimensional LUT as profile data.

It also does not matter if each of the gradation transformation curves stored in the two-dimensional LUT is correlated to the spatially processed input signal IS. In this case, in the visual processing device 11 it is possible to replace the image partitioning portion 12 and the selection signal derivation portion 13 with a spatial processing portion that spatially processes the input signal IS.

(10)

In the foregoing embodiment, it is not necessary for the brightness value of the pixel of the input signal IS to be a value in the range of [0.0 to 1.0]. If an input signal IS is input as a value in another range, then the values of that range can be normalized to [0.0 to 1.0]. It is also possible to not perform normalization and instead suitably change the values that are handled in the above processing.

(11)

It is also possible for each of the gradation transformation curve candidates G1 to Gp to be gradation transformation curves for gradation processing an input signal IS having a dynamic range that is wider than a normal dynamic range and outputting a gradation processed signal CS that has an ordinary dynamic range.

Recently, there has been progress in the development of devices capable of handling dynamic ranges that are one to three orders of magnitude wider than an ordinary dynamic range through the use of a method such as narrowing the light amount and using a CCD with a good S/N ratio, opening an electron shutter long and short twice, or using a sensor that has low-sensitivity or high-sensitivity pixels.

In conjunction with this, it is necessary to appropriately perform gradation processing when the input signal IS has a dynamic range that is wider than the ordinary dynamic range (for example, a signal having a value range of [0.0 to 1.0]).

Figure 12:
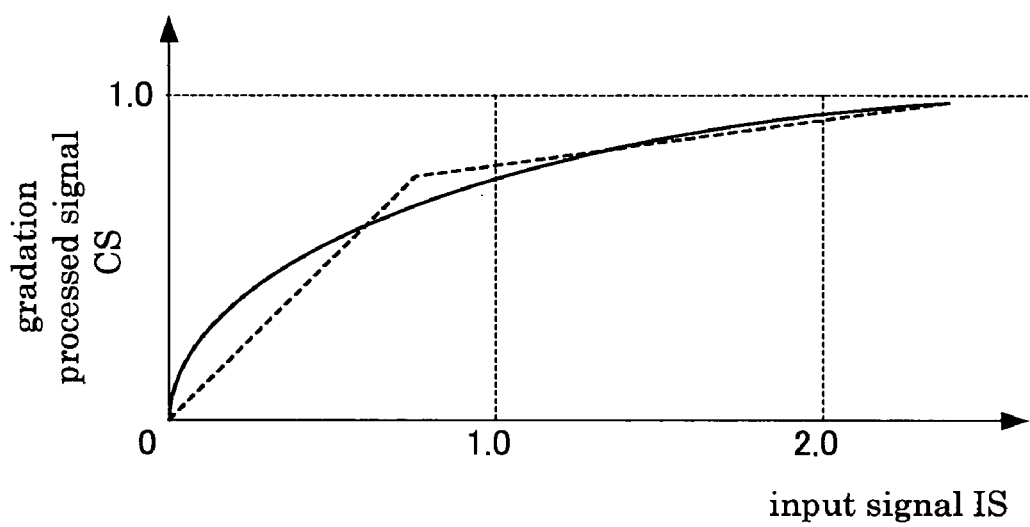
FIG. 12 is an explanatory diagram describing the gradation processing according to a modified example (second embodiment).

Here, as shown in FIG. 12, the gradation transformation curve that is used leads to the output of a gradation processed signal CS having a value in the range of [0.0 to 1.0] even for an input signal IS having a range that exceeds [0.0 to 1.0].

Due to this, it becomes possible to appropriately gradation process even an input signal IS that has a wide dynamic range and then output a gradation processed signal CS that has a normal dynamic range.

Also, in the foregoing embodiment, it was mentioned that "the pixel value of the gradation processed signals CS is a value in the range of [0.0 to 1.0] if the gradation transformation curve candidates G1 to Gp are 'power functions.'" Here, the pixel value of the gradation processed signals CS is not limited to this range. For example, it is also possible for the gradation transformation curve candidates G1 to Gp to perform dynamic range compression with respect to an input signal IS having a value of [0.0 to 1.0].

(12)

In the foregoing embodiment, it was explained that "the gradation processing execution portion 14 includes a plurality of gradation transformation curve candidates G1 to Gp as a two-dimensional LUT." Here, it is also possible for the gradation processing execution portion 14 to have a one-dimensional LUT that stores the relationship between a curve parameter for specifying a gradation transformation curve candidate G1 to Gp and the selection signal Sm.

<<Configuration>>

Figure 13:
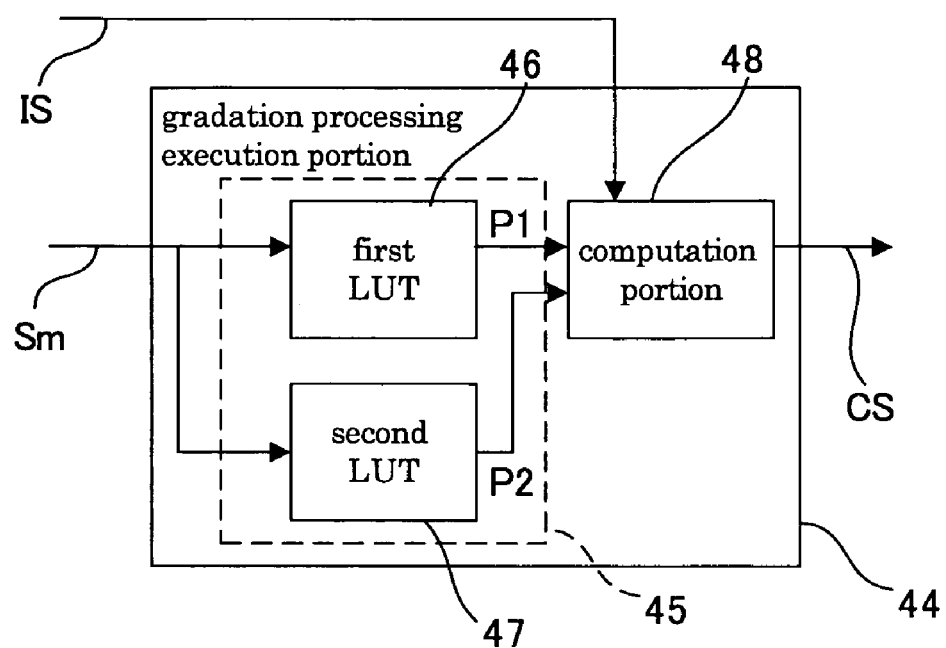
FIG. 13 is a block diagram describing the structure of the gradation processing execution portion 44 (second embodiment).

FIG. 13 shows a block diagram for describing the structure of a gradation processing execution portion 44, which serves as a modified example of the gradation processing execution portion 14. The gradation processing execution portion 44 receives an input signal IS and a selection signal Sm as input, and outputs a gradation processed signal CS, which is obtained by processing the input signal IS. The gradation processing execution portion 44 is provided with a curve parameter output portion 45 and a computation portion 48.

The curve parameter output portion 45 comprises a first LUT 46 and a second LUT 47. The first LUT 46 and the second LUT 47 receive the selection signal Sm as input and output a curve parameter P1 and P2, respectively, of the gradation transformation curve candidate Gm specified by the selection signal Sm.

The computation portion 48 receives the curve parameters P1 and P2 and the input signal IS as input, and outputs a gradation processed signal CS.

<<Regarding the One-Dimensional LUT>>

The first LUT 46 and the second LUT 47 are one-dimensional LUTs storing the values of the curve parameters P1 and P2, respectively, with respect to the selection signal Sm. Before describing the first LUT 46 and the second LUT 47 in detail, the content of the curve parameters P1 and P2 shall be described.

Figure 14:
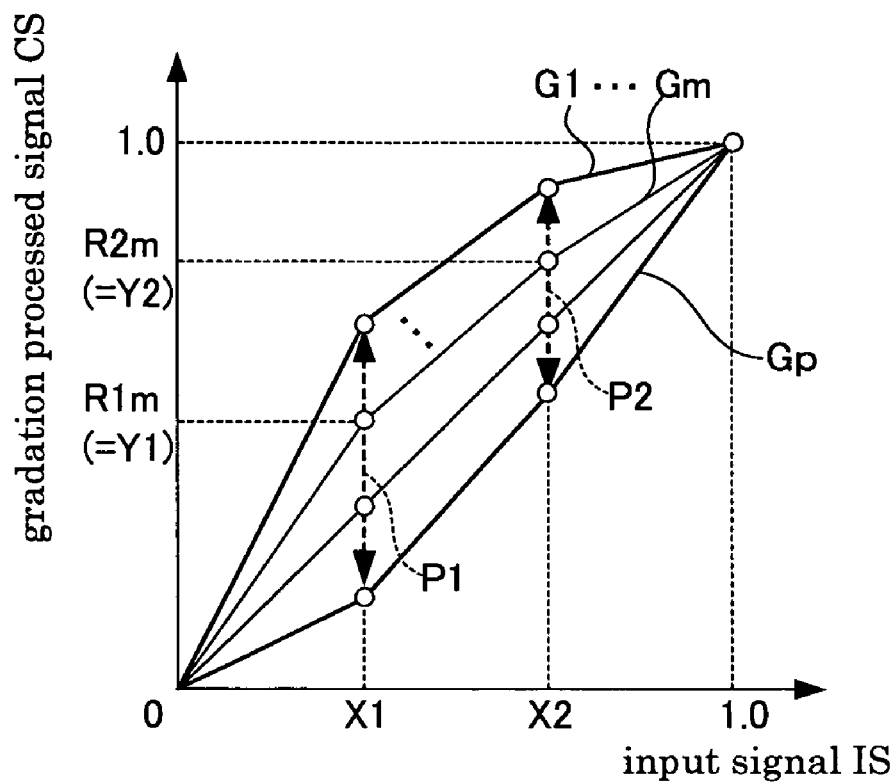
FIG. 14 is an explanatory diagram describing the relationship between the curve parameters P1 and P2, and the gradation transformation curve candidates G1 to Gp (second embodiment).

The relationship between the curve parameters P1 and P2 and the gradation transformation curve candidates G1 to Gp is described using FIG. 14. FIG. 14 shows the gradation transformation curve candidates G1 to Gp. Here, the gradation transformation curve candidates G1 to Gp decrease monotonically in correspondence with their subscript, and satisfy the relationship G1≧G2≧ ... ≧Gp with regard to the brightness values of the pixels of all the input signals IS. It should be noted that it is possible also for the above relationship of the gradation transformation curve candidates G1 to Gp to not hold for gradation transformation curve candidates whose subscript is large if the input signal IS is small, or for gradation transformation curve candidates whose subscript is small if the input signal IS is large.

The curve parameters P1 and P2 each are output as a value of the gradation processed signal CS with respect to a predetermined value of the input signal IS. That is, if the gradation transformation curve candidate Gm is specified by the selection signal Sm, then the value of the curve parameter P1 is output as the value [R1m] of the gradation transformation curve candidate Gm with respect to a predetermined value [X1] of the input signal IS, and the value of the curve parameter P2 is output as the value [R2m] of the gradation transformation curve candidate Gm with respect to a predetermined value [X2] of the input signal IS. Here, the value [X2] is larger than the value [X1].

The first LUT 46 and the second LUT 47 are described next.

The first LUT 46 and the second LUT 47 respectively store the values of the curve parameters P1 and P2 with respect to each of the selection signals Sm. More specifically, the values of the curve parameters P1 and P2 each are given in six bits with respect to selection signals Sm, each of which is given as a six bit signal. Here, the bit number that is secured for the selection signals Sm and the curve parameters P1 and P2 is not limited to this.

Figure 15:
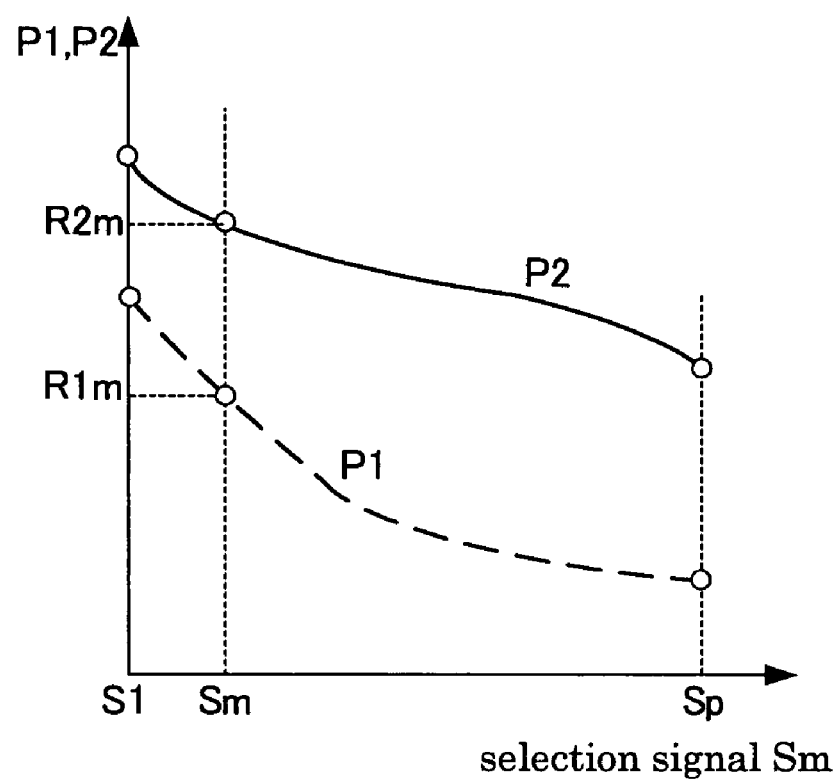
FIG. 15 is an explanatory diagram describing the relationship between the curve parameters P1 and P2, and the selection signal Sm (second embodiment).

The relationship between the curve parameters P1 and P2 and the selection signal Sm is described using FIG. 15. FIG. 15 shows the change in the values of the curve parameters P1 and P2 with respect to the selection signal Sm. The first LUT 46 and the second LUT 47 store the values of the curve parameters P1 and P2 with respect to each selection signal Sm. For example, the value [R1m] is stored as the value of the curve parameter P1, and the value [R2m] is stored as the value of the curve parameter P2, for the selection signal Sm.

With the above first LUT 46 and second LUT 47, curve parameters P1 and P2 are output with respect to the selection signal Sm that has been received as input.

<<Regarding the Computation Portion 48>>

The computation portion 48 derives a gradation processed signal CS for the input signal IS based on the curve parameters P1 and P2 (value [R1m] and value [R2m]) that are obtained. This procedure is described in greater detail below. Here, the value of the input signal IS is given in the value range of [0.0 to 1.0]. Also, the gradation transformation curve candidates G1 to Gp are for transforming the input signal IS that has been given in value range of [0.0 to 1.0] to a gradation in a value range of [0.0 to 1.0]. It should be noted that the gradation transformation curve candidates G1 to Gp also can be adopted in a case where the input signal IS is not limited to this range.

First, the computation portion 48 performs a comparison of the value of the input signal IS and the predetermined values [X1] and [X2].

If the value of the input signal IS (the value [X]) is at least [0.0] but less than [X1], then the value (this shall be the value [Y]) of the gradation processed signal CS with respect to the value [X] on the line segment joining the origin and the coordinate ([X1], [R1m]) in FIG. 14 is found. More specifically, the value [Y] is found by the equation [Y]=([X]/[X1])*[R1m].

If the value of the input signal IS is equal to or greater than [X1] but less than [X2], then the value [Y] corresponding to the value [X] on the line segment joining the coordinate ([X1], [R1m]) and the coordinate ([X2], [R2m]) in FIG. 14 is found. More specifically, the value [Y] is found by the equation [Y]=[R1m]+{([R2m]−[R1m])/([X2]−[X1])}*([X]−[X1]).

If the value of the input signal IS is at least [X2] but not more than [1.0], then the value [Y] corresponding to the value [X] on the line segment joining the coordinate ([X2], [R2m]) and the coordinate ([1.0], [1.0]) in FIG. 14 is found. More specifically, the value [Y] is found by the equation [Y]=[R2m]+{([1.0]−[R2m])/([1.0]−[X2])}*([X]−[X2]).

The computation portion 48 drives the gradation processed signal CS for the input signal IS through the above computations.

<<Gradation Processing Method and Program>>

The above-described processing can also be accomplished as a gradation processing program by a computer. The gradation processing program is a program for causing a computer to execute the gradation processing method discussed below.

The gradation processing method is a method of obtaining the input signal IS and the selection signal Sm and outputting a gradation processed signal CS, and is characterized in that the gradation of the input signal IS is processed using one-dimensional LUTs.

First, when the selection signal Sm is obtained, the curve parameters P1 and P2 are output from the first LUT 46 and the second LUT 47. Detailed description of the first LUT 46, the second LUT 47, and the curve parameters P1 and P2 is omitted here.

Then, the gradation of the input signal IS is transformed based on the curve parameters P1 and P2. The details of this gradation processing are discussed in the description relating to the computation portion 48, and thus will not be described here.

A gradation processed signal CS that corresponds to the input signal IS is derived through the above gradation processing method.

<Effects>

In the gradation processing execution portion 44 serving as a modified example of the gradation processing execution portion 14, two one-dimensional LUTs are provided instead of a two-dimensional LUT. Thus, the memory amount for storing the lookup tables can be reduced.

Modified Examples (1)

In the above modified example, it was explained that "the curve parameters P1 and P2 are the values of the gradation transformation curve candidate Gm with respect to predetermined values of the input signal IS." Here, it is also possible for the curve parameters P1 and P2 to be other curve parameters of the gradation transformation curve candidate Gm. This is described in more specific terms below.

(1-1)

The curve parameters can also be the slope of the gradation transformation curve candidate Gm. This will be described more specifically using FIG. 14. If the gradation transformation curve candidate Gm has been specified by the selection signal Sm, then the value of the curve parameter P1 is the value [K1m] of the slope of the gradation transformation curve candidate Gm in the predetermined range [0.0 to X1] of the input signal IS, and the value of the curve parameter P2 is the value [K2m] of the slope of the gradation transformation curve candidate Gm in the predetermined range [X1 to X2] of the input signal IS.

Figure 16:
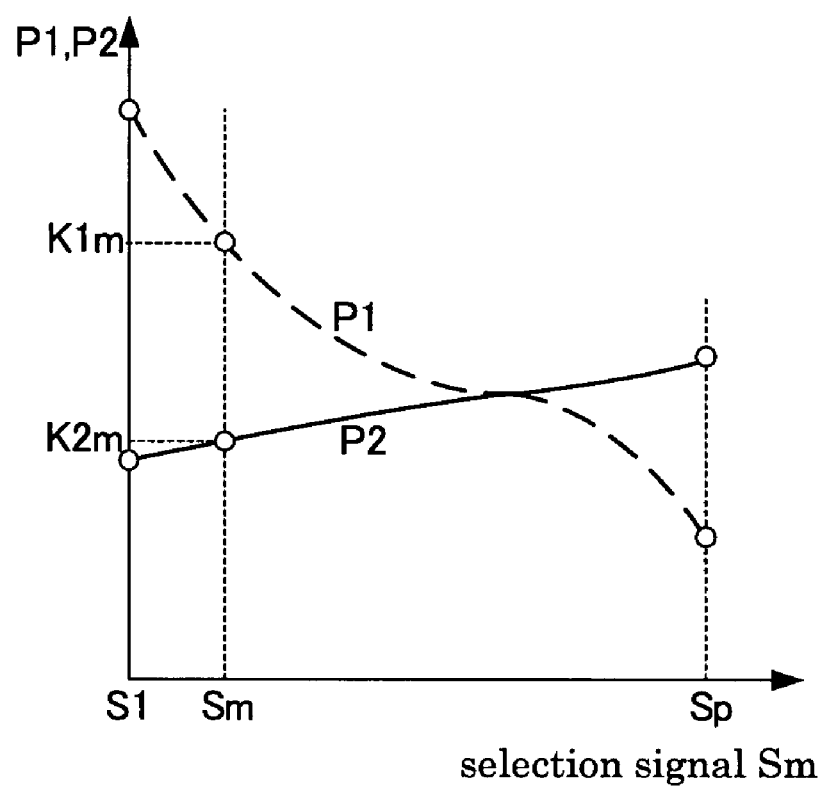
FIG. 16 is an explanatory diagram describing the relationship between the curve parameters P1 and P2, and the selection signal Sm (second embodiment).
Figure 17:
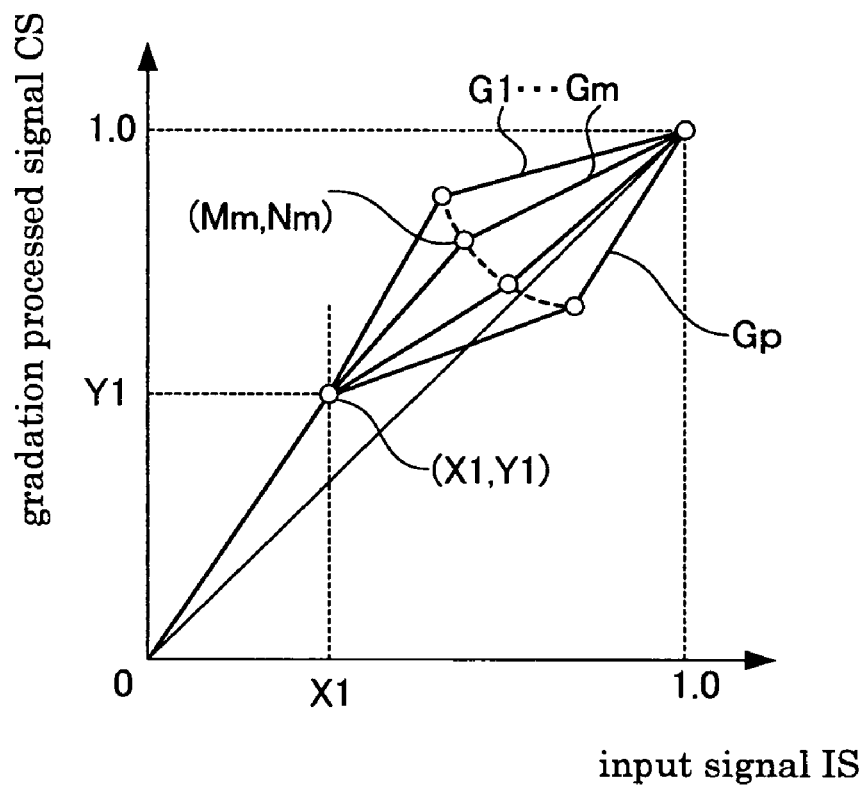
FIG. 17 is an explanatory diagram describing the relationship between the curve parameters P1 and P2, and the gradation transformation curve candidates G1 to Gp (second embodiment).

The relationship between the curve parameters P1 and P2 and the selection signal Sm is described using FIG. 16. FIG. 16 shows the change in the values of the curve parameters P1 and P2 with respect to the selection signal Sm. The values of the curve parameters P1 and P2 with respect to each selection signal Sm are stored on the first LUT 46 and the second LUT 47. For example, the value [K1m] is stored as the value of the curve parameter P1, and the value [K2m] is stored as the value of the curve parameter P2, for the selection signal Sm.

Due to the above first LUT 46 and second LUT 47, curve parameters P1 and P2 are output with respect to the selection signal Sm that has been input.

The computation portion 48 derives a gradation processed signal CS for the input signal IS based on the curve parameters P1 and P2 that have been obtained. This procedure is described in greater detail below.

First, the computation portion 48 performs a comparison of the input signal IS and the predetermined values [X1] and [X2].

If the value of the input signal IS (the value [X]) is at least [0.0] but less than [X1], then the value of the gradation processed signal CS (this shall be the value [Y]) with respect to the value [X] on the line segment joining the origin and the coordinate ([X1], [K1m]*[X1] (hereinafter, written as [Y1])) in FIG. 14 is found. More specifically, the value [Y] is found by the equation [Y]=[K1m]*[X].

If the value of the input signal IS is equal to or greater than [X1] but less than [X2], then the value [Y] corresponding to the value [X] on the line segment joining the coordinate ([X1], [Y1]) and the coordinate ([X2], [K1m]*[X1]+[K2m]*([X2]−[X1]) (hereinafter, written as [Y2])) in FIG. 14 is found. More specifically, the value [Y] is found by the equation [Y]=[Y1]+[K2m]*([X]−[X1]).

If the value of the input signal IS is at least [X2] but not more than [1.0], then the value [Y] corresponding to the value [X] on the line segment joining the coordinate ([X2], [Y2]) and the coordinate (1.0, 1.0) in FIG. 14 is found. More specifically, the value [Y] is found by the equation [Y]=[Y2]+{([1.0]−[Y2])/([1.0]−[X2])}*([X]−[X2]).

Through the above computations, the computation portion 48 derives the gradation processed signal CS for the input signal IS.

(1-2)

It is also possible for the curve parameters to be coordinates on the gradation transformation curve candidate Gm. This is described in greater detail using FIG. 17. When the gradation transformation curve candidate Gm has been selected by the selection signal Sm, the value of the curve parameter P1 is the value [Mm] of one of the components of a coordinate on the gradation transformation curve candidate Gm, and the value of the curve parameter P2 is the value [Nm] of the other component of a coordinate on the gradation transformation curve candidate Gm. All gradation transformation curve candidates G1 to Gp are curves that pass through the coordinate (X1, Y1).

Figure 18:
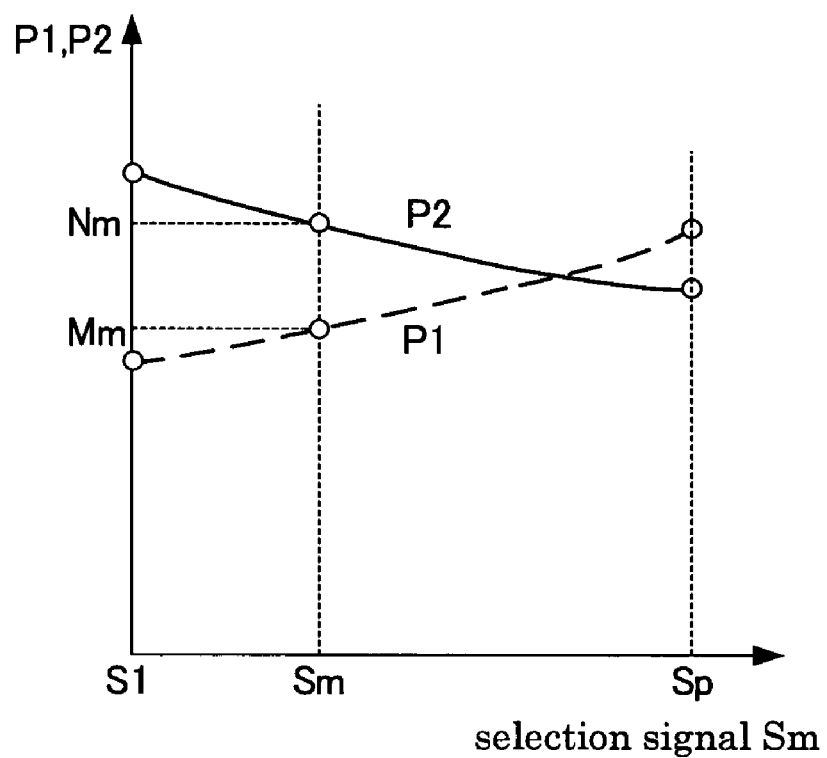
FIG. 18 is an explanatory diagram describing the relationship between the curve parameters P1 and P2, and the selection signal Sm (second embodiment).

The relationship between the curve parameters P1 and P2 and the selection signal Sm is described using FIG. 18. FIG. 18 shows the change in the values of the curve parameters P1 and P2 with respect to the selection signal Sm. The first LUT 46 and the second LUT 47 store the values of the curve parameters P1 and P2 with respect to each selection signal Sm. For example, with respect to the selection signal Sm, the value [Mm] is stored as the value of the curve parameter P1, and the value [Nm] is stored as the value of the curve parameter P2.

Due to the above first LUT 46 and second LUT 47, curve parameters P1 and P2 are output for the selection signal Sm that has been input.

With the computation portion 48, a gradation processed signal CS is derived from the input signal IS through the same procedure as that of the modified example described using FIG. 14. Detailed description of this procedure is thus omitted here.

(1-3)

The above modified example is only one example, and it is also possible for the curve parameters P1 and P2 to be yet other parameters of the gradation transformation curve candidate Gm.

Further, there is no limitation to the above as regards the number of the curve parameters. That number can be smaller or greater than that described above.

In the description of the computation portion 48, the computations described were for a case in which the gradation transformation curve candidates G1 to Gp are curves having straight line segments. Here, if the coordinates of the gradation transformation curve candidates G1 to Gp are given as curve parameters, then it is also possible to create a smooth curve that passes through the given coordinates (curve fitting), and to perform gradation transformation using this curve that is created.

(2)

In the above modified example, it was explained that "the curve parameter output portion 45 comprises a first LUT 46 and a second LUT 47." Here, it is also possible for the curve parameter output portion 45 to not be provided with LUTs for storing the values of the curve parameters P1 and P2 for the values of the selection signals Sm.

In this case, the curve parameter output portion 45 calculates the values of the curve parameters P1 and P2. More specifically, the curve parameter output portion 45 stores parameters representing graphs of the curve parameters P1 and P2 as shown in FIG. 15, FIG. 16, and FIG. 18, for example. The curve parameter output portion 45 specifies the graphs of the curve parameters P1 and P2 from the stored parameters. Further, using the graphs of the curve parameters P1 and P2, it outputs the values of the curve parameters P1 and P2 with respect to the selection signal Sm.

Here, the parameters for specifying the graphs of the curve parameters P1 and P2 can be coordinates on a graph, the slope of a graph, or the curvature. For example, the curve parameter output portion 45 stores the coordinates of two points on each graph of the curve parameters P1 and P2 shown in FIG. 15, and uses a straight line that joins these two coordinates as the respective graphs of the curve parameters P1 and P2.

Here, when specifying the graphs of the curve parameters P1 and P2 from the parameters, it is possible to use not only collinear approximation but also broken-line approximation and curve approximation.

Thus, it is possible to output the curve parameters without using a memory for storing a LUT. That is, the capacity of the memory provided in the device can be reduced even further.

Third Embodiment

Figure 19:
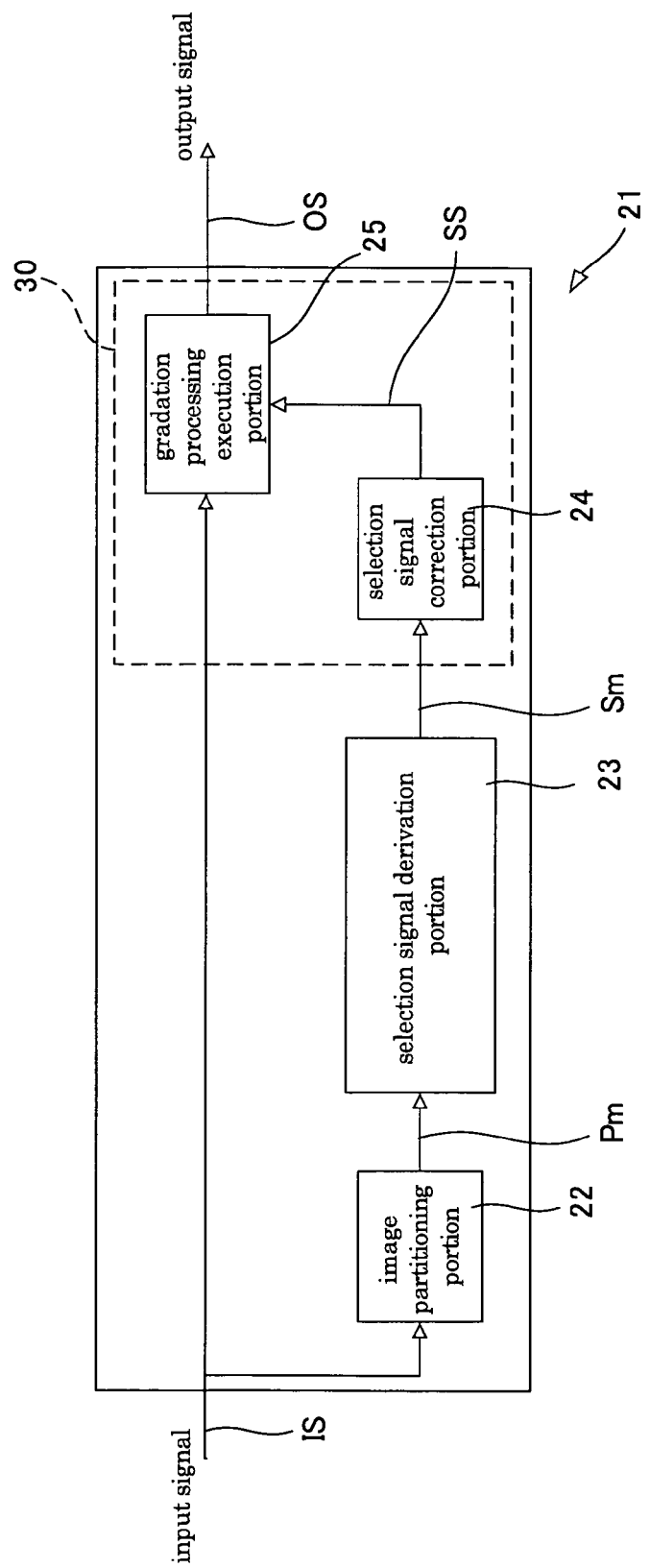
FIG. 19 is a block diagram describing the structure of the visual processing device 21 (third embodiment).
Figure 20:
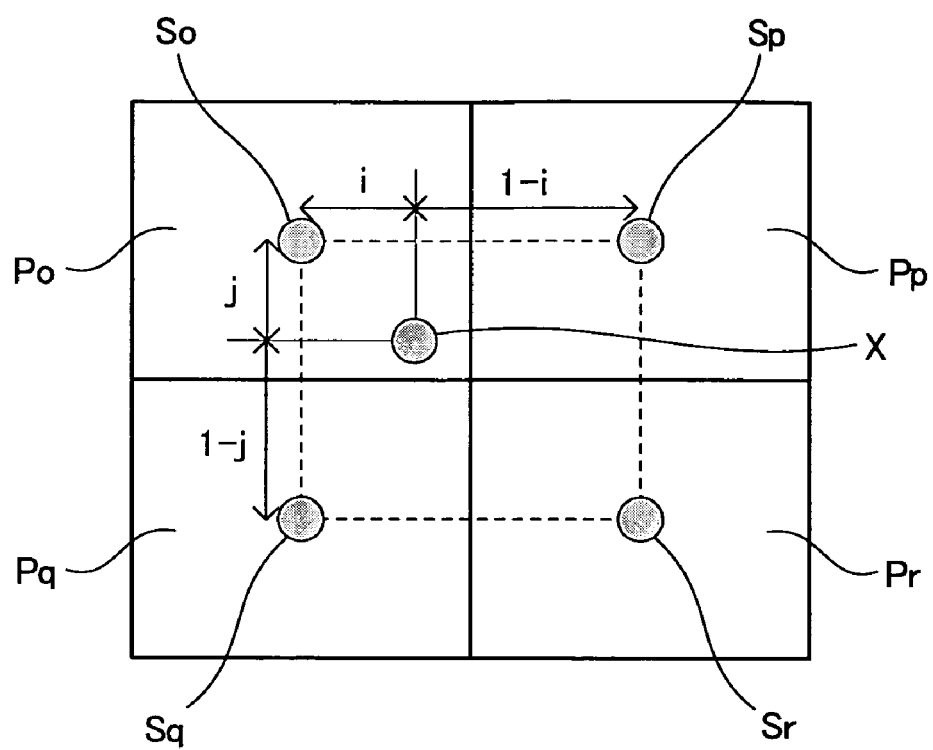
FIG. 20 is an explanatory diagram describing the operation of the selection signal correction portion 24 (third embodiment).
Figure 21:
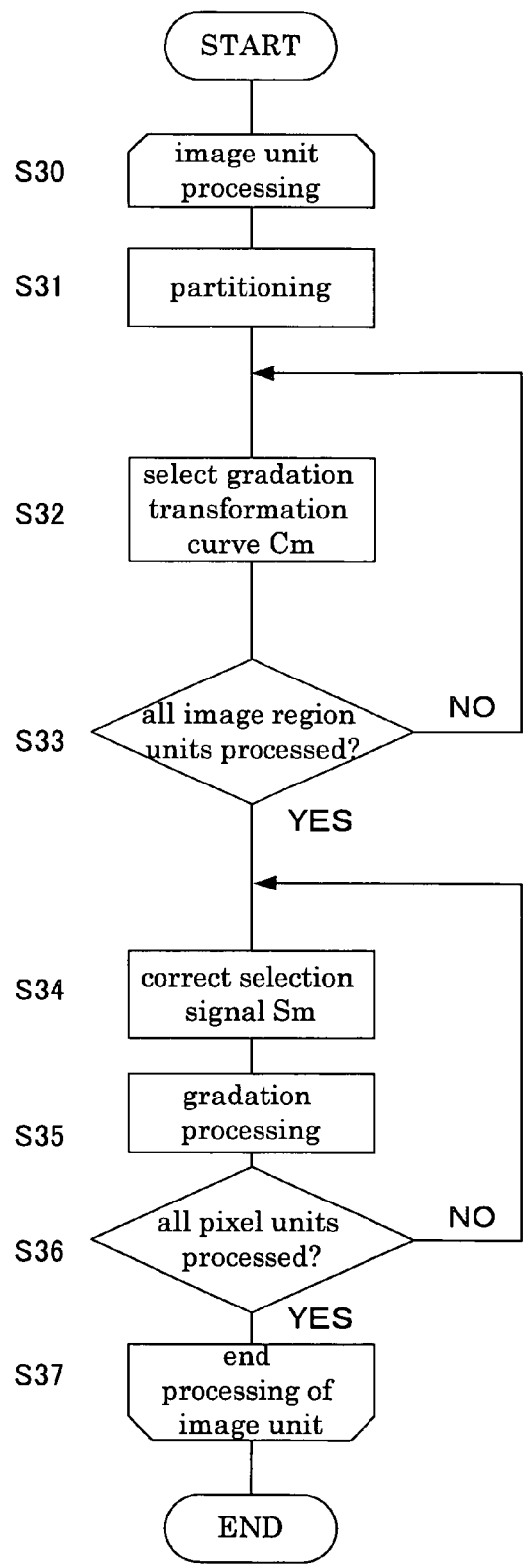
FIG. 21 is a flowchart describing the visual processing method (third embodiment).

A visual processing device 21 serving as a third embodiment of the present invention is described using FIGS. 19 to 21. The visual processing device 21 is a device that performs gradation processing of an image, and is provided in or connected to a device that handles images, such as a computer, a television, a digital camera, a portable telephone, or a PDA. The visual processing device 21 is characterized in that it switches between a plurality of gradation transformation curves stored in advance as a LUT, for each pixel to be subjected to gradation processing.

<Configuration>

FIG. 19 shows a block diagram that describes the structure of the visual processing device 21. The visual processing device 21 is provided with an image partitioning portion 22, a selection signal derivation portion 23, and a gradation processing portion 30. The image partitioning portion 22 receives an input signal IS as input and partitions the original image that is input as the input signal IS into a plurality of image regions Pm ($1 \leq m \leq n$; where n is the number of partitions of the original image), and outputs these. The selection signal derivation portion 23 outputs a selection signal Sm for selecting a gradation transformation curve Cm for each image region Pm. The gradation processing portion 30 is provided with a selection signal correction portion 24 and a gradation processing execution portion 25. The selection signal correction portion 24 receives the selection signal Sm as input and for each pixel outputs a selection signal SS, which is a signal that is obtained by correcting the selection signal Sm for each of the respective image regions Pm. The gradation processing execution portion 25 is provided with a plurality of gradation transformation curve candidates G1 to Gp (where p is the candidate number) as a two-dimensional LUT, and receives the input signal IS and the selection signal SS for each pixel as input and for each pixel outputs an output signal OS that has been subjected to gradation processing.

<Regarding the Gradation Transformation Curve Candidates>

The gradation transformation curve candidates G1 to Gp are substantially the same as those described using FIG. 7 in [Second embodiment], and thus are not described here. However, in this embodiment, the gradation transformation curve candidates G1 to Gp are curves that give the relationship between the brightness value of the pixels of the input signal IS and the brightness value of the pixels of the output signal OS.

The gradation processing execution portion 25 is provided with the gradation transformation curve candidates G1 to Gp as a two-dimensional LUT. That is, the two-dimensional LUT is a lookup table (LUT) that gives the brightness value of the pixels of the output signal OS with respect to the brightness value of the pixels of the input signal IS and the selection signal SS for selecting a gradation transformation curve candidate G1 to Gp. The specific examples of this portion are substantially the same as those described in [Second embodiment] using FIG. 8, and thus will not be described here. However, in the present embodiment, the pixel values of the output signal OS corresponding to the values of the upper six bits of the pixel value of the input signal IS, which for example is expressed with 10 bits, are arranged in the column direction of the matrix.

<Action>

The operations of the various portions are described here. The image partitioning portion 22 has substantially the same operation as the image partitioning portion 2 of FIG. 1, and partitions an original image that has been received as an input signal IS into a plurality (n) of image regions Pm (see FIG. 2). Here, the number of partitions of the original image is greater than the number of partitions (e.g. 4 to 16 partitions) of the conventional visual processing device 300 shown in FIG. 33, and for example is 4800 partitions of 80 partitions in the horizontal direction by 60 partitions in the vertical direction.

The selection signal derivation portion 23 selects a gradation transformation curve Cm for each image region Pm from among the gradation transformation curve candidates G1 to Gp. More specifically, the selection signal derivation portion 23 calculates the mean brightness value of the wide area image region Em that includes the image region Pm and selects one of the gradation transformation curve candidates G1 to Gp in accordance with that mean brightness value that has been calculated. That is, each gradation transformation curve candidate G1 to Gp corresponds to a mean brightness value of the wide area image region Em, and the larger the mean brightness value, the larger the subscript of the gradation transformation curve candidate G1 to Gp that is selected.

Here, the wide area image region Em is the same as that described in [First Embodiment] using FIG. 2. That is, the wide area image region Em is a collection of a plurality of image regions including the respective image region Pm, and for example is a collection of 25 image regions of five blocks in the vertical direction by five blocks in the horizontal direction about the image region Pm. It should be noted that depending on the position of the image region Pm, it may not be possible to acquire a wide area image region Em having five blocks in the vertical direction by five blocks in the horizontal direction around the image region Pm. For example, in the case of the image region Pl, which is positioned near the original image, it is not possible to obtain a wide area image region El that has five blocks in the vertical direction by five blocks in the horizontal direction around the image region Pl. In this case, a region in which five blocks in the vertical direction by five blocks in the horizontal direction about the image region P1 that overlaps the original image is adopted as the wide area image region E1.

The selection by the selection signal derivation portion 23 is output as the selection signal Sm, which specifies one of the gradation transformation curve candidates G1 to Gp. More specifically, the selection signal Sm is output as the value of the subscript (1 to p) of the gradation transformation curve candidate G1 to Gp.

The selection signal correction portion 24, through correction using the selection signals Sm that have been output for the respective image regions Pm, outputs a selection signal SS for each pixel for selection of a gradation transformation curve for each pixel making up the input signal IS. For example, the selection signal SS for pixels included in the image region Pm is found by correcting the values of the selection signals output for the image region Pm and the image regions surrounding the image region Pm using the internal division ratio of the pixel positions.

The operation of the selection signal correction portion 24 is described in further detail using FIG. 20. FIG. 20 shows a state in which the selection signals So, Sp, Sq, and Sr have been output in correspondence with the image regions Po, Pp, Pq, and Pr (where o, p, q, and r are positive integers less than the partition number n (see FIG. 2)).

Here, the position of a pixel x to be subjected to gradation correction shall be the position obtained by interpolating the center of the image region Po and the center of the image region Pp by [i:1−i] and interpolating the center of the image region Po and the center of the image region Pq by [j:1−j]. In this case, the value [SS] of the selection signal SS for the pixel x is found by $[SS]=\{(1-j)\cdot(1-i)\cdot[So]+(1-j)\cdot(i)\cdot[Sp]+(j)\cdot(1\cdot i)\cdot[Sq]+(j)\cdot(i)\cdot[Sr]\}$. It should be noted that [So], [Sp], [Sq], and [Sr] are the values of the selection signals So, Sp, Sq, and Sr.

The gradation processing execution portion 25 receives the brightness value of the pixel included in the input signal IS and the selection signal SS, and using the two-dimensional LUT 41 shown in FIG. 8, for example, outputs the brightness value of the output signal OS.

It should be noted that if the value [SS] of the selection signal SS is not a value that is equal to the subscript (1 to p) of the gradation transformation curve candidates G1 to Gp of the two-dimensional LUT 41, then the gradation transformation curve candidate G1 to Gp whose subscript is the integer nearest the value [SS] is used for gradation processing of the input signal IS.

<Visual Processing Method and Visual Processing Program>

FIG. 21 shows a flowchart describing the visual processing method of the visual processing device 21. The visual processing method shown in FIG. 21 is achieved by hardware in the visual processing device 21, and is a method of performing gradation processing of an input signal IS (see FIG. 19). With the visual processing method shown in FIG. 21, the input signal IS is processed in image units (steps S30 to S37). An image unit performs processing (step S30). An original image that is input as the input signal IS is partitioned into a plurality of image regions Pm ($1 \leq m \leq n$; where n is the number of partitions of the original image) (step S31), a gradation transformation curve Cm is selected for each image region Pm (steps S32 and S33), and a gradation transformation curve is selected for each pixel of the original image based on a selection signal Sm for selecting the gradation transformation curve Cm for the image region Pm and the gradation processing in image units is performed (steps S34 to S36).

A detailed description of each of these steps follows.

A gradation transformation curve Cm is chosen for each image region Pm from among the gradation transformation curve candidates G1 to Gp (step S32). More specifically, the mean brightness value of the wide area image region Em having the image region Pm is calculated and one of the gradation transformation curve candidates G1 to Gp is selected in accordance with the mean brightness value that is calculated. The gradation transformation curve candidates G1 to Gp are correlated to a mean brightness value of the wide area image region Em, and the larger the mean brightness value, the larger the subscript of the gradation transformation curve candidate G1 to Gp that is selected. Description of the wide area image region Em is omitted here (see the <Actions> section above). The result of this selection is output as a selection signal Sm that indicates one of the gradation transformation curve candidates G1 to Gp. More specifically, the selection signal Sm is output as the value of the subscript (1 to p) of the gradation transformation curve candidate G1 to Gp. Then, it is determined whether or not processing of all the image regions Pm has finished (step S33), and until it is determined that processing is finished, the processing of steps S32 to S33 are repeated, for a number of times equal to the number of partitions of the original image. With this, processing in image region units is finished.

Through correction using the selection signals Sm that have been output for the respective image regions Pm, a selection signal SS for each pixel for selecting a gradation transformation curve for each pixel making up the input signal IS is output (step S34). For example, the selection signals SS for the pixels included in the image region Pm are found by correcting the values of the selection signals output for the image region Pm and the image regions surrounding the image region Pm using the internal division ratio of the pixel positions. Description of the details of this correction are omitted here (see <Action> above; FIG. 20).

The brightness value of a pixel included in the input signal IS and the selection signal SS are received as input, and using the two-dimensional LUT 41 shown in FIG. 8, for example, a brightness value of the output signal OS is output (step S35). It is then determined whether or not processing is finished for all of the pixels (step S36), and until it is determined that processing is finished, the processes of steps S34 to S36 are repeated, the number of repeats being equal to the number of pixels. With this, processing in image units is finished (step S37).

It should be noted that each of the steps of the visual processing method shown in FIG. 21 can also be achieved by a computer, for example, as a visual processing program.

<Effects>

With the present invention, it is possible to obtain the same effects as those discussed under <Effects> in [First Embodiment] and [Second embodiment]. Below only the effects that are unique to the third embodiment are discussed.

(1)

Each gradation transformation curve Cm that is selected for a respective image region Pm is created based on the mean brightness value of the wide area image region Em. Thus, sufficient sampling of the brightness value is possible even though the size of the image region Pm is small. As a result, it is possible to select an appropriate gradation transformation curve Cm even for small image regions Pm.

(2)

The selection signal correction portion 24, through correction based on the selection signals Sm output in image region units, for each pixel outputs a selection signal SS. The pixels of the original image making up the input signal IS are gradation processed using the gradation transformation curve candidates G1 to Gp, which are specified by the selection signal SS for each pixel. Thus, it is possible to obtain an output signal OS that has been more appropriately gradation processed. For example, it becomes possible to inhibit pseudo-borders from occurring. Also, in the output signal OS it becomes possible to further prevent the junction between borders of the various image regions Pm from standing out unnaturally.

(3)

The gradation processing execution portion 25 has a two-dimensional LUT that has been created in advance. The processing burden required for gradation processing, and more specifically the processing burden required for creation of the gradation transformation curves Cm, can thus be reduced. This allows gradation processing to be carried out faster.

(4)

The gradation processing execution portion 25 executes gradation processing using a two-dimensional LUT. The content of the two-dimensional LUT is read from a memory device such as hard disk or a ROM provided in the visual processing device 21 and is used in gradation processing. By changing the content of the two-dimensional LUT that is read out, it is possible to execute various gradation processing without changing the hardware configuration. That is, it becomes possible to achieve gradation processing that is more suited to the characteristics of the original image.

Modified Examples

The present invention is not limited to the foregoing embodiment, and various modifications and improvements thereof are possible without departing from the gist of the invention. For example, it is possible to adopt substantially the same modifications as those of [Second embodiment] <Modified Examples> in to this third embodiment. In particular, by regarding the selection signal Sm and the gradation processed signal CS in the [Second embodiment]<Modified Examples> (10) through (12) as the selection signal SS and the output signal OS, respectively, those modifications can be similarly adopted for the third embodiment.

Modified examples that are unique to the third embodiment are discussed below.

(1)

In the foregoing embodiment, a two-dimensional LUT 41, which comprises a 64 row×64 column matrix, serves as an example of the two-dimensional LUT. The effects of the invention, however, are not limited to a two-dimensional LUT of this size. For example, it is also possible to adopt a matrix in which a greater number of gradation transformation curve candidates are arranged in the row direction. Alternatively, it is also possible for the pixel values of the output signal OS corresponding to values obtained by separating the pixel values of the input signal IS in finer stages to be arranged in the column direction of the matrix. For example, the matrix can include the pixel values of the output signal OS arranged with respect to the pixel values of an input signal IS that is expressed with 10-bits.

A large two-dimensional LUT allows more suitable gradation processing can be performed, whereas a small two-dimensional LUT allows the amount of memory for storing the two-dimensional LUT to be reduced.

(2)

In the foregoing embodiment, it was explained that if the value [SS] of the selection signal SS is not a value that is equal to the subscript (1 to p) of a gradation transformation curve candidate G1 to Gp provided in the two-dimensional LUT 41 (see FIG. 8), then the gradation transformation curve candidate G1 to Gp having as its subscript the integer that is nearest to the value [SS] is used for gradation processing of the input signal IS. Here, it is also possible to adopt a configuration in which if the value [SS] of the selection signal SS is not a value that is equal to the subscript (1 to p) of a gradation transformation curve candidate G1 to Gp provided in the two-dimensional LUT 41, then both a gradation transformation curve candidate Gk (1≦k≦p−1) whose subscript is the maximum integer (k) that does not exceed the value [SS] of the selection signal SS and the gradation transformation curve candidate Gk+1 whose subscript is the minimum integer (k+1) that exceeds [SS] are used to take a weighted average (internal division) of the pixel values of the input signal IS that has been gradation processed using the value after the decimal point of the value [SS] of the selection signal SS, and the result is output as the output signal OS.

(3)

In the foregoing embodiment, it was explained that the pixel values of the output signal OS corresponding to the value of the top six bits of the pixel values of the input signal IS, which is expressed with 10-bits, for example, are arranged in the column direction of the matrix. Here, it is also possible for the output signal OS to be output as the matrix component obtained by linear interpolation with the value of the bottom four bits of the pixel values of the input signal IS performed by the gradation processing execution portion 25. That is, the components of the matrix corresponding to the value of the upper six bits of the pixel values of the input signal IS, which is expressed with 10-bits, for example, are arranged in the column direction of the matrix, and the components of the matrix corresponding to the value of the upper six bits of the pixel values of the input signal IS and the components of the matrix corresponding to the values obtained by adding a [1] to the upper six bits of the pixel values of the input signal IS (for example, in FIG. 8, the components of one row) are linearly interpolated using the value of the lower four bits of the pixel values of the input IS, and the result is output as the output signal OS.

By doing this, more suitable gradation processing can be performed even if the two-dimensional LUT 41 (see FIG. 8) is small in size.

(4)

In the foregoing embodiment, it was explained that a selection signal Sm for the image region Pm is output based on the mean brightness value of the wide area image region Em. Here, the method of outputting the selection signal Sm is not limited to this method. For example, it is also possible to output the selection signal Sm for the image region Pm based on the maximum brightness value or the minimum brightness value of the wide area image region Em. It should be noted that the value [Sm] of the selection signal Sm can itself be the mean brightness value, the maximum brightness value, or the minimum brightness value of the wide area image region Em.

For example, it is also possible to output the selection signal Sm for the image region Pm in the following manner. That is, the mean brightness value is found for each image region Pm and then from these mean brightness values, a provisional selection signal Sm' for each of the image regions Pm is found. Here, the value of the provisional selection signal Sm' is the number of the subscript of the gradation transformation curve candidate G1 to Gp. Then, for each of the image regions included in the wide area image region Em, the values of the provisional selection signals Sm' are averaged and the result is regarded as the selection signal Sm for the image region Pm.

(5)

In the foregoing embodiment, it was explained that the selection signal Sm for the image region Pm is output based on the mean brightness value of the wide area image region Em. Here, it is also possible for the selection signal Sm for the image region Pm to be output based on the weighted mean rather than the simple mean of the wide area image region Em. For example, as was described in [Second embodiment] using FIG. 11, the mean brightness value of each of the image regions making up the wide area image region Em is found, and then the weight of the image regions Ps1, Ps2, . . . that have a mean brightness value that significantly differs from the mean brightness value of the image region Pm is reduced and the mean brightness value of the wide area image region Em is found.

By doing this, if the wide area image region Em includes regions with a peculiar brightness (for example, a case in which the wide area image region Em includes the border between two objects with different brightness values), the effect that the brightness values of those peculiar regions has on the output of the selection signal Sm is reduced, and this allows more appropriate selection signal Sm output to be performed.

(6)

It is also possible for the visual processing device 21 to be further provided with a profile data creation portion for creating profile data, which are the values stored in the two-dimensional LUT. More specifically, the profile data creation portion comprises the image partitioning portion 2 and the gradation transformation curve derivation portion 10 of the visual processing device 1 (see FIG. 1), and stores in the two-dimensional LUT a group of a plurality of gradation transformation curves that have been created as profile data.

It also does not matter if each of the gradation transformation curves stored in the two-dimensional LUT are correlated to the spatially processed input signal IS. In this case, in the visual processing device 21 it is possible to replace the image partitioning portion 22, the selection signal derivation portion 23, and the selection signal correction portion 24 with a spatial processing portion for spatially processing the input signal IS.

Fourth Embodiment

A visual processing device 61 serving as a fourth embodiment of the present invention is described using FIGS. 22 to 25.

Figure 22:
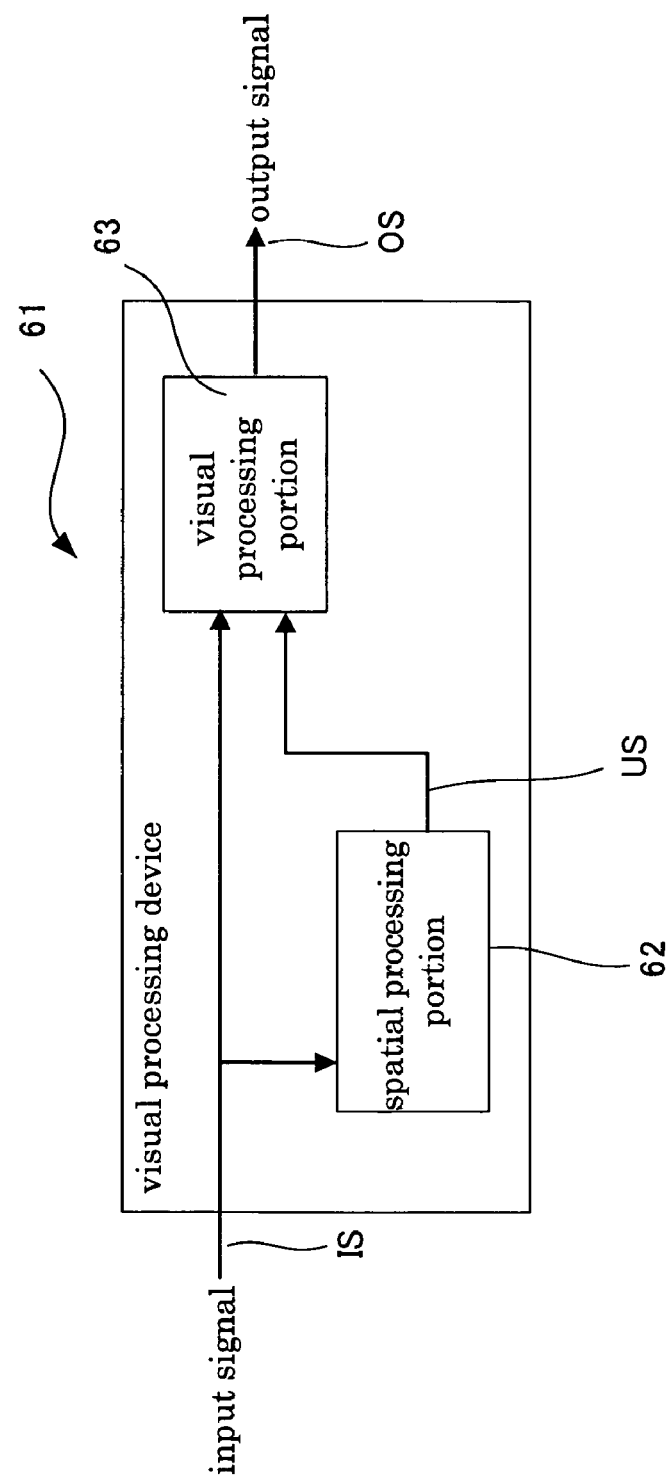
FIG. 22 is a block diagram describing the structure of the visual processing device 61 (fourth embodiment).

The visual processing device 61 shown in FIG. 22 is a device that performs visual processing such as spatial processing or gradation processing of the image signal. The visual processing device 61, together with a device that performs color processing of an image signal, constitutes an image processing device in a machine that handles images, such as a computer, a television, a digital camera, a portable telephone, a PDA, a printer, or a scanner.

The visual processing device 61 is characterized in that it is a device that performs visual processing using an image signal and a blur signal that is obtained by spatially processing (blur filtering) the image signal, and has this characteristic in spatial processing.

Conventionally, when deriving a blur signal using the pixels surrounding a pixel being processed, if the surrounding pixels include pixels that significantly differ from the pixel being processed in their darkness, then the blur signal will be affected by those pixels having a different darkness. That is, when spatially processing the pixels near an edge portion of an object in an image, pixels originally not part of the edge are affected by the darkness of the edge. Thus, this spatial processing for example causes pseudo-borders to occur.

Accordingly, there is a need to perform spatial processing that is suited to the content of the image. To meet this need, JP H10-75395A proposes creating a plurality of blur signals each with a different degree of blur, and by synthesizing or switching between those blur signals, outputting a suitable blur signal. By doing this, its aim is to change the filter size of the spatial processing and thereby inhibit the effect of pixels having different darkness.

On the other hand, with the configuration of this published patent application, a plurality of blur signals are created and these blur signals are either synthesized or switched between, and this results in a large circuit structure scale or processing burden of the device.

Accordingly, it is an object of the visual processing device 61 serving as a fourth embodiment of the present invention to output an appropriate blur signal, and to reduce the circuit structure scale or processing burden of the device.

<Visual Processing Device 61>

FIG. 22 shows the basic structure of the visual processing device 61, which performs visual processing of an image signal (input signal IS) and outputs the result as a visually processed image (output signal OS). The visual processing device 61 is provided with a spatial processing portion 62 that spatially processes the brightness value of each pixel of the original image obtained as the input signal IS and outputs the result as an unsharp signal US, and a visual processing portion 63 that uses the input signal IS and the unsharp signal US for the same pixel to perform visual processing of the original image and outputs the result as the output signal OS.

<Spatial Processing Portion 62>

Figure 23:
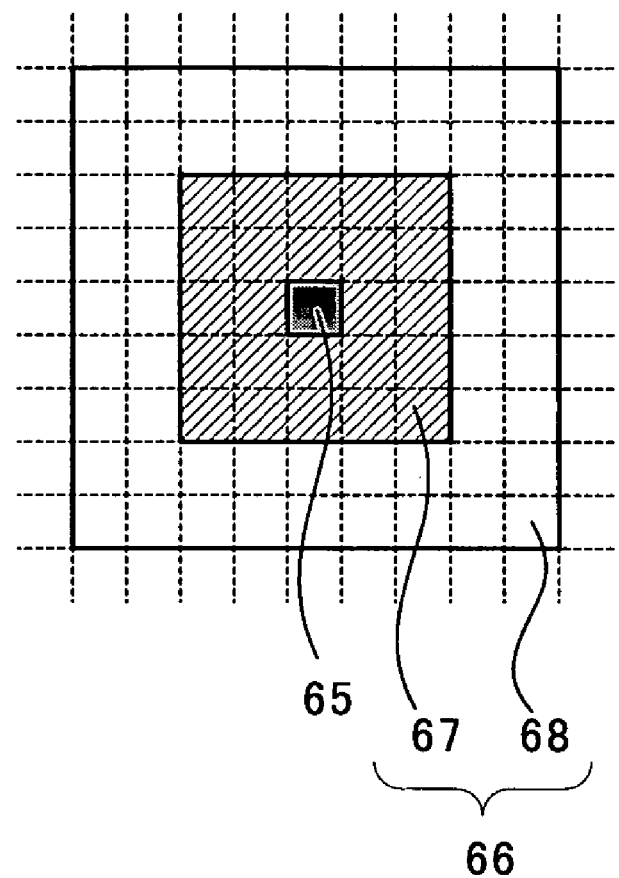
FIG. 23 is an explanatory diagram describing the spatial processing of the spatial processing portion 62 (fourth embodiment).
Figure 25:
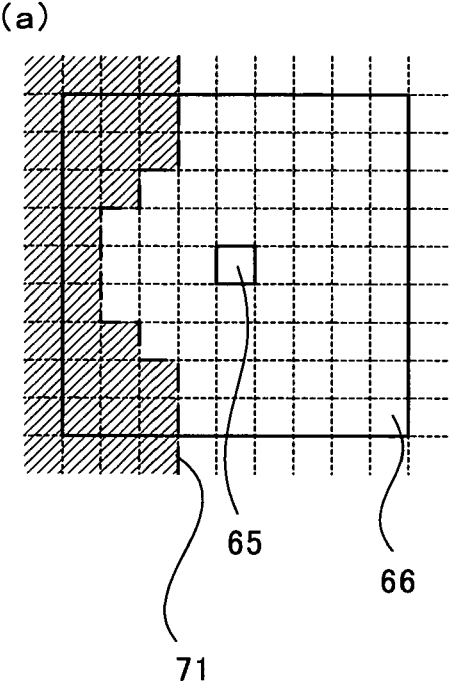
FIG. 25 is an explanatory diagram describing the effects of visual processing by the visual processing device 61 (fourth embodiment).
Figure 25:
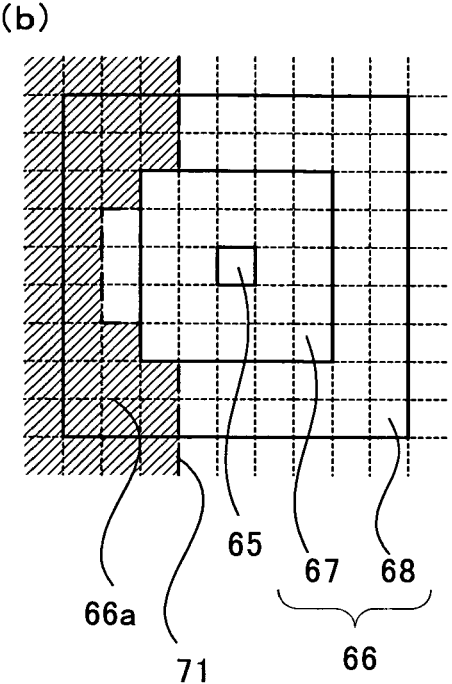

The spatial processing by the spatial processing portion 62 is described using FIG. 23. The spatial processing portion 62 obtains the pixel values of a target pixel 65 to be spatially processed and the pixels in the region surrounding the target pixel 65 (hereinafter, referred to as surrounding pixels 66) from the input signal IS.

The surrounding pixels 66 are pixels located in the region around the target pixel 65, and are the pixels included in a surrounding region of nine pixels vertically by nine pixels horizontally expanding out from the target pixel 65 at the center. It should be noted that the size of the surrounding region is not limited to this size, and it can be smaller or larger than this. Further, the surrounding pixels 66 can be divided into first surrounding pixels 67 and second surrounding pixels 68 based on their proximity to the target pixel 65. In FIG. 23, the pixels in the region of five vertical pixels by five horizontal pixels about the target pixel 65 are regarded as the first surrounding pixels 67. The pixels positioned around the first surrounding pixels 67 are regarded as the second surrounding pixels 68.

The spatial processing portion 62 performs a filter computation with respect to the target pixel 65. With the filter computation, a weighted mean of the pixel values of the target pixel 65 and the surrounding pixels 66 is taken using a weight based on the difference in the pixel values and distance between the target pixel 65 and the surrounding pixels 66. The weighted average is calculated based on the equation $F=(\Sigma[Wij]*[Aij])/(\Sigma[Wij])$. Here, $[Wij]$ is the weight coefficient of the pixel that is positioned in the i-th row and j-th column in the target pixel 65 and the surrounding pixels 66, and $[Aij]$ is the pixel value of the pixel that is positioned in the i-th row and j-th column in the target pixel 65 and the surrounding pixels 66. Also, "$\Sigma$" means to find the sum of the target pixel 65 and the surrounding pixels 66.

The weight coefficient [Wij] is described using FIG. 24. The weight coefficient [Wij] is a value that is determined based on the difference in the pixel values of the target pixel 65 and the surrounding pixels 66 and the distance between them. More specifically, the larger the absolute value of the difference in pixel value, the smaller the value of the weight coefficient. Also, the greater the distance, the smaller the value of the weight coefficient.

For example, the weight coefficient [Wij] for the target pixel 65 is the value [1].

For those pixels of the first surrounding pixels 67 that have a pixel value with which the absolute value of its difference with respect to the pixel value of the target pixel 65 is smaller than a predetermined threshold value, the weight coefficient [Wij] is the value [1]. For those pixels of the first surrounding pixels 67 that have a pixel value with which the absolute value of that difference is greater than the predetermined threshold value, the weight coefficient [Wij] is the value [/1;2]. That is, the pixels of the first surrounding pixels 67 may be given different weight coefficients depending on their pixel value.

For those pixels of the second surrounding pixels 68 that have a pixel value with which the absolute value of its difference with respect to the pixel value of the target pixel 65 is smaller than a predetermined threshold value, the weight coefficient [Wij] is the value [/1;2]. For those pixels of the second surrounding pixels 68 that have a pixel value with which the absolute value of that difference is greater than a predetermined threshold value, the weight coefficient [Wij] is the value [/1;4]. That is, the pixels of the second surrounding pixels 68 may be given different weight coefficients depending on their pixel value. Also, the second surrounding pixels 68 are assigned smaller weight coefficients because they are farther from the target pixel 165 than the first surrounding pixels 67.

Here, the predetermined value is for example a value in the range of [20/256 to 60/256] with respect to pixel value of the target pixel 65, which takes a value in the range of [0.0 to 1.0].

The weighted mean calculated in this way is output as an unsharp signal US.

<Visual Processing Portion 63>

With the visual processing portion 63, visual processing is performed using the values of the input signal IS and the unsharp signal US for the same pixel. The visual processing that is performed here is processing such as contrast enhancement or dynamic range compression of the input signal IS. With contrast enhancement, the image is made sharper by using the difference between the input signal IS and the unsharp signal US, or using a function to enhance the ratio between the two, to obtain an enhanced signal that is then added to the input signal IS. With dynamic range compression, the unsharp signal US is subtracted from the input signal IS.

The processing in the visual processing portion 63 can also be performed using a two-dimensional LUT with which the input signal IS and the unsharp signal US are received as input and an output signal OS is output.

<Visual Processing Method and Program>

The above processing can also be can executed as a visual processing program by a computer or the like. The visual processing program is a program that causes a computer to execute the visual processing method described below.

The visual processing method includes a spatial processing step of performing spatial processing of the brightness value of the pixel of an original image that is obtained as an input signal IS and outputting the result as an unsharp signal US, and a visual processing step of using the input signal IS and the unsharp signal US for the same pixel to perform visual processing of the original image and then outputting the result as an output signal OS.

In the spatial processing step, a weighted mean is taken for each pixel of the input signal IS as discussed in the description of the spatial processing portion 62, and the result is output as an unsharp signal US. The specific details of this are described above and thus will not be discussed here.

In the visual processing step, the input signal IS and the unsharp signal US for the same pixel are used to perform the visual processing discussed in the description of the visual processing portion 63, and the result is output as an output signal OS. The specific details of this are described above and thus will not be discussed here.

<Effects>

The effects of the visual processing performed by the visual processing device 61 are described using FIGS. 25(a) and (b). FIG. 25(a) and FIG. 25(b) shows the processing performed using a conventional filter. FIG. 25(b) shows the processing performed using the filter of the present invention.

FIG. 25(a) shows a field including an object 71 in which the surrounding pixels 66 have different darkness. A smoothing filter that has a predetermined filter coefficient is used to spatially process the target pixel 65. Thus, the target pixel 65, which is not actually a part of the object 71, is affected by the darkness of the object 71.

FIG. 25(b) shows the appearance of the spatial processing of the present invention. With the spatial processing of the present invention, spatial processing is performed with respect to each of the portion 66a in which the surrounding pixels 66 include the object 71, the first surrounding pixels 67, which do not include the object 71, the second surrounding pixels 68, which do not include the object 71, and the target pixel 65, using different weight coefficients. For this reason, it is possible to keep the spatially processed target pixel 65 from being affected by pixels having a completely different darkness, making more suitable spatial processing possible.

Also, with the visual processing device 61, it is not necessary to create a plurality of blur signals as in JP H10-75395A. Thus, the circuit scale or the processing burden of the device can be reduced.

Further, with the visual processing device 61, it is possible to suitably change in a substantive manner the filter size of the space filter and the shape of the image referenced by the filter in accordance with the image content. Thus, it is possible to perform spatial processing that is suited for the image content.

Modified Examples (1)

The size of the surrounding pixels 66, the first surrounding pixels 67, and the second surrounding pixels 68 discussed above is only one example, and they may also be other sizes.

The weight coefficient mentioned above is only one example, and it may be other values as well. For example, in a case where the absolute value of the difference between the pixel values exceeds a predetermined threshold, then the value [0] can be given as the weight coefficient. By doing this, it is possible to eliminate the effect that pixels with significantly different darkness have on the spatially processed target pixel 65. In an application where contrast enhancement is the goal, this has the effect that the contrast of areas originally having a relatively large contrast is not over-enhanced.

The weight coefficient can also be given as the value of a function such as that shown below.

(1-a)

It is also possible to give the value of the weight coefficient by a function whose variable is the absolute value of difference between pixel values. The function can for example be a function that monotonically decreases with respect to the absolute value of the difference between pixel values, as in the weight coefficient increasing (approaching 1) when the absolute value of the difference between pixel values is small, and the weight coefficient decreasing (approaching 0) when the absolute value of the difference between pixel values is large.

(1-b)

It is also possible to give the value of the weight coefficient with a function whose variable is the distance from the target pixel 65. The function can for example be a function that monotonically decreases with respect to the distance from the target pixel 65, as in the weight coefficient increasing (approaching 1) when the distance from the target pixel 65 is small, and the weight coefficient decreasing (approaching 0) when the distance from the target pixel 65 is large.

In (1-a) and (1-b) above, the weight coefficient is given in a more continuous manner. Thus, it is possible to give a more suitable weight coefficient than in a case where a threshold value is used, and this allows excessive contrast enhancement to be inhibited and the occurrence of pseudo-borders, for example, to be inhibited. As a result, it is possible to accomplish processing that yields a better visual effect.

(2)

The above-described processing performed with respect to each of the pixels can also be performed with respect to a unit of blocks that includes a plurality of pixels. More specifically, the mean pixel value of a target block to be subjected to spatial processing and the mean pixel values of surrounding blocks surrounding the target block are calculated, and then a weighted mean is taken of the mean pixel values using the same weight coefficients as discussed above. By doing this, the mean pixel value of the target block is subjected to further spatial processing.

In such a case, it is possible also to use the spatial processing portion 62 as either the selection signal derivation portion 13 (see FIG. 6) or the selection signal derivation portion 23 (see FIG. 19). Doing this yields the same result as that described in [Second embodiment]<Modified Example> (6) or [Third embodiment] <Modified Example> (5).

This will be described using FIGS. 26 to 28.

<<Configuration>>

Figure 26:
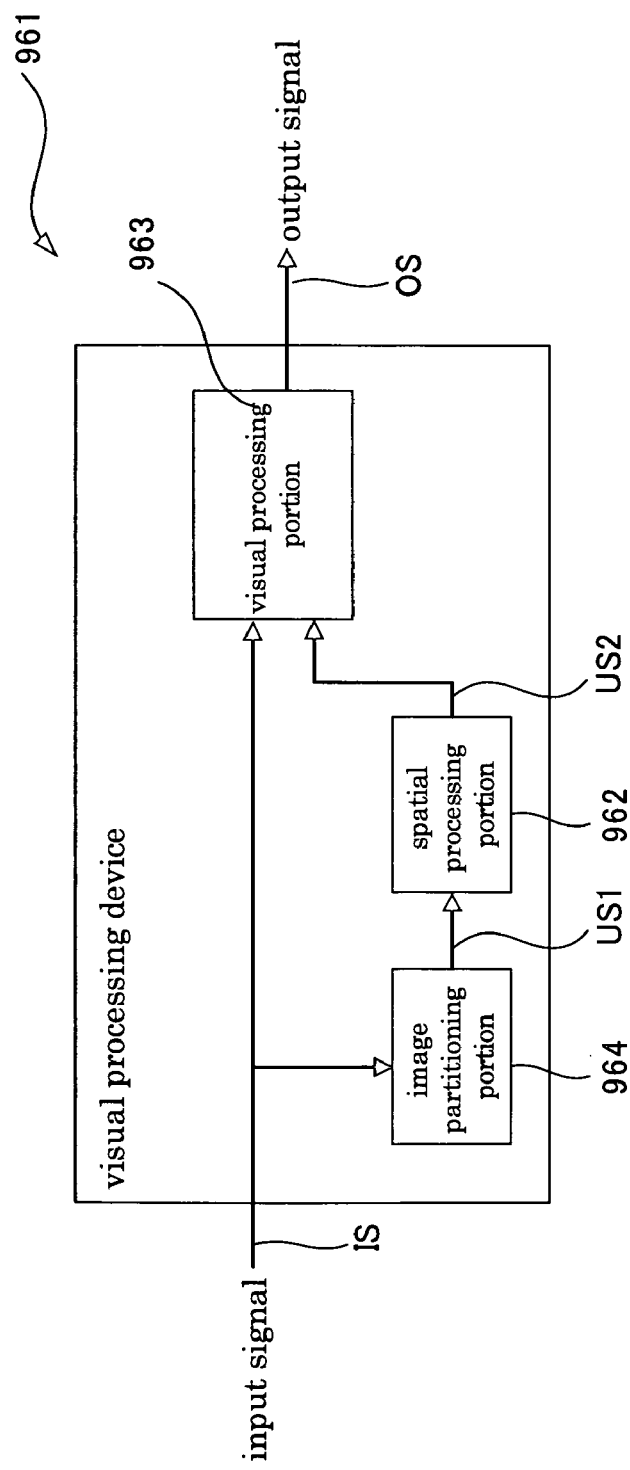
FIG. 26 is a block diagram describing the structure of the visual processing device 961 (fourth embodiment).

FIG. 26 is a block diagram showing the configuration of a visual processing device 961 that performs the processing described using FIGS. 22 to 25 in units of blocks each including a plurality of pixels.

The visual processing device 961 comprises an image partitioning portion 964 that partitions an image that has been input as an input signal IS into a plurality of image blocks, a spatial processing portion 962 that spatially processes each image block that has been obtained by partitioning, and a visual processing portion 963 that performs visual processing using the input signal IS and a spatially processed signal US2, which is the output of the spatial processing portion 962.

The image partitioning portion 964 partitions an image that has been input as an input signal IS into a plurality of image blocks. Then, a processed signal US1 that includes a characteristic parameter is derived for each image block that has been obtained by partitioning. The characteristic parameter is a parameter that expresses a characteristic of the image in each image block that has been obtained by partitioning, and for example is a mean value (simple mean, weighted mean, etc.) or a representative value (maximum value, minimum value, median value, etc.).

The spatial processing portion 962 obtains a processed signal US1 that includes the characteristic parameter of each image block and performs spatial processing.

Figure 27:
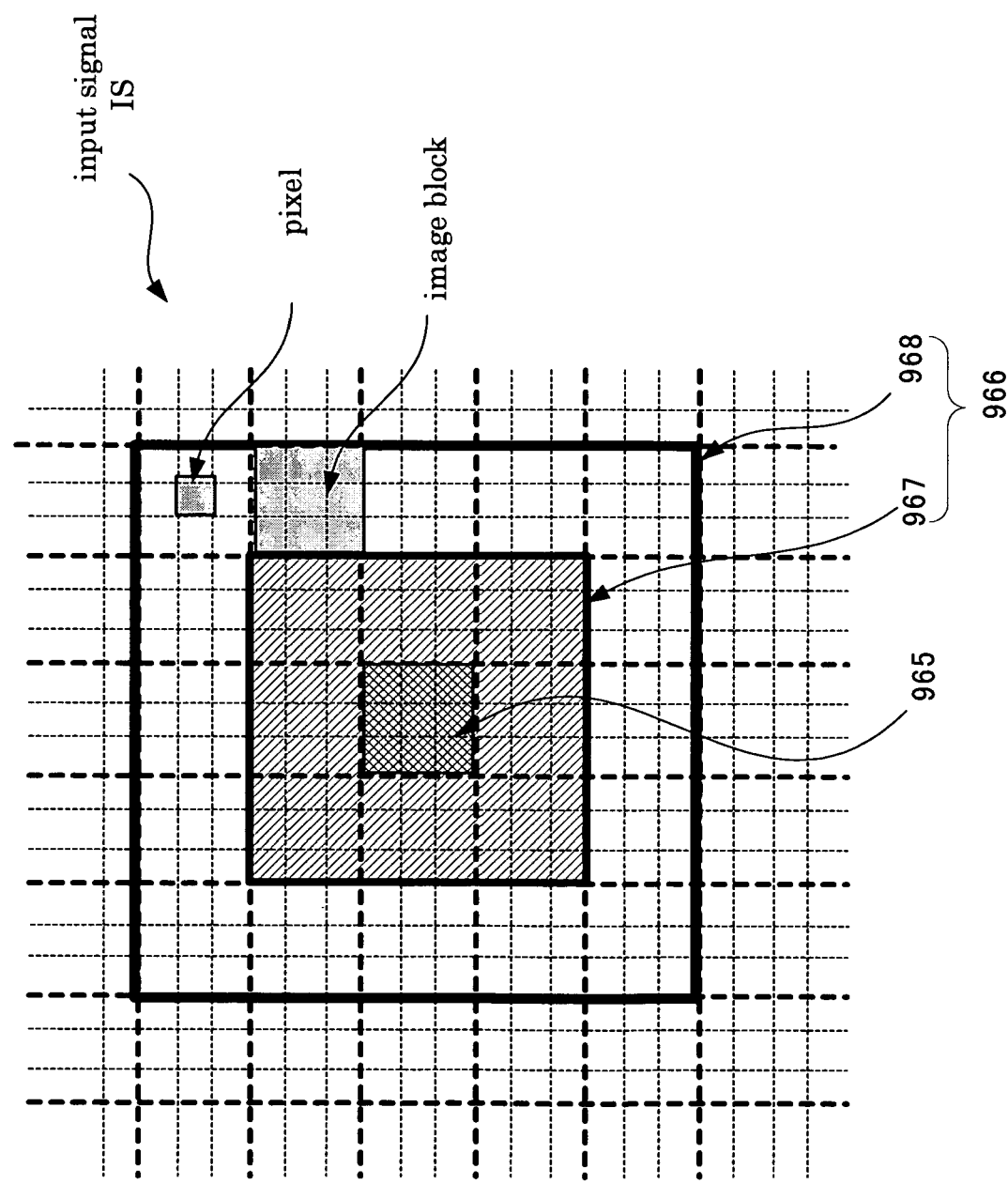
FIG. 27 is an explanatory diagram describing the spatial processing of the spatial processing portion 962 (fourth embodiment).

The spatial processing of the spatial processing portion 962 is described using FIG. 27. FIG. 27 shows an input signal IS that has been partitioned into image blocks, each of which includes a plurality of pixels. Here, each one of the image blocks has been obtained as a region that includes nine pixels, three pixels vertically by three pixels horizontally. It should be noted that this partitioning method is only one example, and there is no limitation to this partitioning method. Also, to attain a sufficient visual processing effect, it is preferable that the spatially processed signal US2 is created for a significantly wide region.

The spatial processing portion 962 obtains the characteristic parameter from the target image block 965 to be subjected to spatial processing and each surrounding image block included in the surrounding region 966, which is located around the target image block 965, from the processed signal US1.

The surrounding region 966 is a region that is located around the target image block 965 and is a region composed of five vertical blocks by five horizontal blocks spreading out from the target image block 965 at the center. It should be noted that the size of the surrounding region 966 is not limited to this, and it can be smaller or larger. The surrounding region 966 also is divided into a first surrounding region 967 and a second surrounding region 968 based on the distance from the target image block 965.

In FIG. 27, the first surrounding region 967 is defined as the three vertical block by three horizontal block region about the target image block 965. Further, the second surrounding region 968 is defined as the region located surrounding the first surrounding region 967.

The spatial processing portion 962 performs a filter computation with respect to the characteristic parameter of the target image block 965.

With the filter computation, a weighted mean is taken of the characteristic parameter of the target image block 965 and the surrounding image blocks of the surrounding region 966. Here, the weight of the weighted mean is determined based on the distance, and difference in characteristic parameter values, between the target image block 965 and the surrounding image blocks.

More specifically, the weighted mean is calculated based on the equation $F=(\Sigma[Wij]*[Aij])/(\Sigma[Wij])$.

Here, [Wij] is the weight coefficient of the image block that is positioned in the i-th row and j-th column in the target image block 965 and the surrounding region 966, and [Aij] is the value of the characteristic parameter of the image block positioned in the i-th row and j-th column in the target image block 965 and the surrounding region 966. Also, "$\Sigma$" means to take the sum of the image blocks of the target image block 965 and the surrounding region 966.

Figure 28:
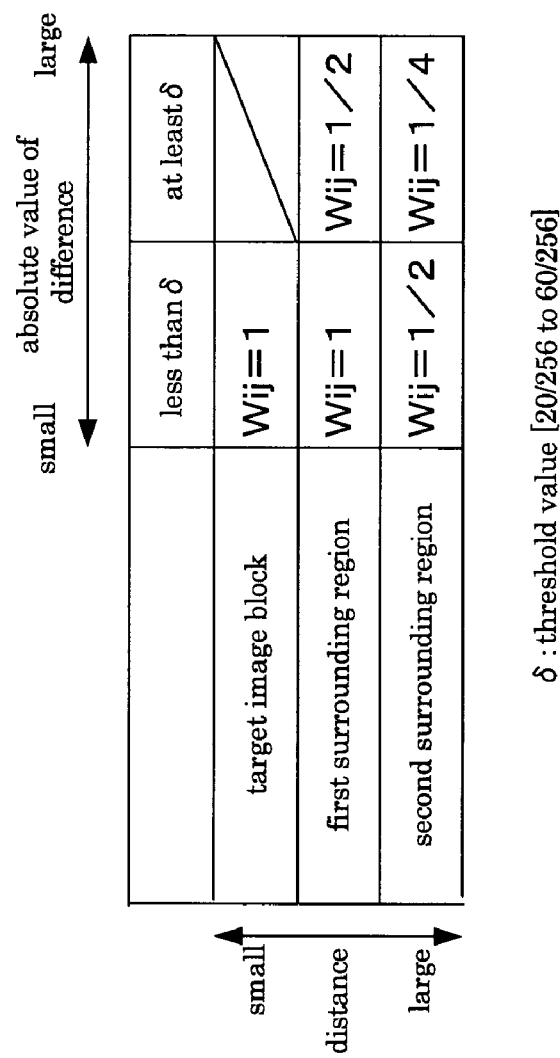
FIG. 28 is a chart describing the weight coefficient [Wij] (fourth embodiment).

The weight coefficient [Wij] is described using FIG. 28.

The weight coefficient [Wij] is a value that is determined based on the distance, and difference in characteristic parameter values, between the surrounding image blocks of the target image block 965 and the surrounding region 966. More specifically, the larger the absolute value of the difference in the value of the characteristic parameter, the smaller the value of the weight coefficient. Further, the greater the value of the distance, the smaller the value of the weight coefficient.

For example, the weight coefficient [Wij] for the target image block 965 is the value [1].

For those surrounding image blocks of the first surrounding region 967 that have a characteristic parameter value with which the absolute value of its difference with respect to the value of the characteristic parameter of the target image block 965 is smaller than a predetermined threshold value, the weight coefficient [Wij] is the value [1]. For those surrounding image blocks of the first surrounding region 967 that have a characteristic parameter value with which the absolute value of that difference is greater than a predetermined threshold value, the weight coefficient [Wij] is the value [/1; 2]. That is, the surrounding image blocks included in the first surrounding region 967 can have different weight coefficients depending on the value of the characteristic parameter.

For those surrounding image blocks of the second surrounding region 968 that have a characteristic parameter value with which the absolute value of its difference with respect to the value of the characteristic parameter of the target image block 965 is smaller than a predetermined threshold value, the weight coefficient [Wij] is the value [/1; 2]. For those surrounding image blocks of the second surrounding region 968 that have a characteristic parameter value with which the absolute value of that difference is greater than a predetermined threshold value, the weight coefficient [Wij] is the value [/1;4]. That is, the surrounding image blocks included in the second surrounding region 968 can have different weight coefficients depending on the value of the characteristic parameter. Also, the second surrounding region 968 is assigned smaller weight coefficients because it is farther from the target image block 965 than the first surrounding region 967.

Here, the predetermined value is for example a value in the range of [20/256 to 60/256] with respect to values of the characteristic parameter of the target image block 965 within the range of [0.0 to 1.0].

The weighted mean calculated in the above manner is output as the spatially processed signal US2.

The visual processing portion 963 performs the same visual processing as that of the visual processing portion 63 (see FIG. 22). However, it differs from the visual processing portion 63 in that instead of an unsharp signal US, it uses a spatially processed signal US2 of the target image block including the target pixel to be subjected to visual processing.

Also, the processing by the visual processing portion 963 can be performed at once for all target image block units, which include a target pixel, or alternatively, the processing can be performed in the order of the pixels that are obtained from the input signal IS, switching between the spatially processed signals US2.

The above processing is performed for all of the pixels included in the input signal IS.

<<Effects>>

With the processing of the spatial processing portion 962, processing is performed in image block units. For this reason, the processing amount of the spatial processing portion 962 can be reduced and this makes it possible to achieve faster visual processing. It also becomes possible to reduce the scale of the hardware.

Modified Examples

In the above it was explained that processing is performed in square block units. Here, the shape of the block is not limited to this.

Further, the weight coefficient and threshold values can be suitably altered.

Here, it is also possible for some weight coefficient values to be [0]. This is the same as adopting any shape as the shape of the surrounding region 966.

Further, it was explained that the spatial processing portion 962 performs spatial processing using the characteristic parameters of the target image block 965 and the surrounding region 966, but it is also possible for spatial processing to be performed using the characteristic parameters of the surrounding region 966 only. That is, the target image block 965 is set to a weight [0] as its weighted mean for the spatial processing.

(3)

The processing in the visual processing portion 63 is not limited to the above. For example, it is also possible for the visual processing portion 63 to use the value A of the input signal IS, the value B of the unsharp signal US, the dynamic range compression function F4, and the enhancement function F5 to calculate C through the equation $C=F4(A)*F5(A/B)$, and output the resulting value as the output signal OS. Here, the dynamic range compression function F4 is a monotously increasing function such as a concave power function. For example, it can be expressed by $F4(x)=x^\gamma (0<\gamma<1)$. The enhancement function F5 is a power function. It is for example expressed by $F5(x)=x^\alpha (0<\alpha \leq 1)$.

In a case where this processing is performed in the visual processing portion 63, it is possible to compress the dynamic range of the input signal IS while enhancing local contrast by using a suitable unsharp signal US that is output by the spatial processing portion 62 of the present invention.

On the other hand, if the unsharp signal US is not suitable and there is too little blur, then the edges will be enhanced but enhancement of the contrast cannot be performed suitably. Conversely, if there is too much blur, then the contrast can be enhanced but compression of the dynamic range cannot be performed suitably.

Fifth Embodiment

Applied examples of the visual processing devices, visual processing method, and visual processing program described in the first to fourth embodiment, and a system using these, are described below as a fifth embodiment of the present invention.

The visual processing device is a device that performs gradation processing of an image, and is provided in or connected to a device that handles images, such as a computer, a television, a digital camera, a portable telephone, or a PDA, and is attained as an integrated circuit such as an LSI.

More specifically, each functional block of the foregoing embodiments can be independently achieved as a single chip, or can be achieved by a single chip that incorporates some or all of those functions. It should be noted that here reference is made to an LSI, but based on the degree of integration, the term IC, system LSI, super LSI, or ultra LSI may also be used.

Further, the manner in which the integrated chip is achieved is not limited to an LSI, and it is also possible to use a dedicated circuit or a general purpose processor. After LSI manufacturing, it is also possible to employ a programmable FPGA (Field Programmable Gate Array) or a reconfigurable processor in which the connections and settings of the circuit cells within the LSI can be reconfigured.

Further, if other technologies that accomplish integration that by improving upon or that are derived from semiconductor technology come to replace LSIs, then naturally it is also possible to integrate the functional blocks using that technology. Applications in biotechnology represent one such potential example.

The processing of the various blocks of the visual processing devices of FIG. 1, FIG. 6, FIG. 19, FIG. 22, and FIG. 26 is for example performed by a central processing unit (CPU)

provided in the visual processing device. Also, a program for performing that processing is stored on a memory device such as a hard disk or ROM, and this program is run on the ROM, or read to and run on a RAM. Further, the two-dimensional LUT that is referenced by the gradation processing execution portion 14 and 25 of FIG. 6 and FIG. 19 is stored on a memory device such as a hard disk or ROM, and is referenced when necessary. Further, the two-dimensional LUT can also be supplied from a two-dimensional LUT supply device that is directly connected to, or is indirectly connected over a network, to the visual processing device. The same applies for the one-dimensional LUT that is referenced by the gradation processing execution portion 44 of FIG. 13.

The visual processing device can also be a device that performs gradation processing of the images of each frame (each field) that is provided in or is connected to a device that handles moving images.

The visual processing method described in the first through fourth embodiments is executed in each of the visual processing devices.

The visual processing program is a program for executing gradation processing of images that is stored on a memory device such as a hard disk or ROM in a device provided in or connected to a machine that handles images, such as a computer, a television, a digital camera, a portable telephone, or a PDA. The program is for example furnished through a storage medium such as a CD-ROM or over a network.

In the above embodiments, it was explained that the brightness value of each of the pixels is converted. Here, the present invention is not limited to the color space of the input signal IS. That is, the processing of the above embodiments can also be similarly applied to the luminance and brightness value of each of the color spaces in a case where the input signal IS is expressed in YCbCr color space, YUV color space, Lab color space, Luv color space, YIQ color space, XYZ color space, YPbPr color space, or RGB color space.

If the input signal IS is expressed in RGB color space, then the processing of this embodiment can be independently performed for each of the RGB components.

Sixth Embodiment

An example of the application of the visual processing devices, the visual processing methods and the visual processing programs, as well as a system using the same according to a sixth example of the present invention are described with reference to FIGS. 29 to 32.

Figure 29:
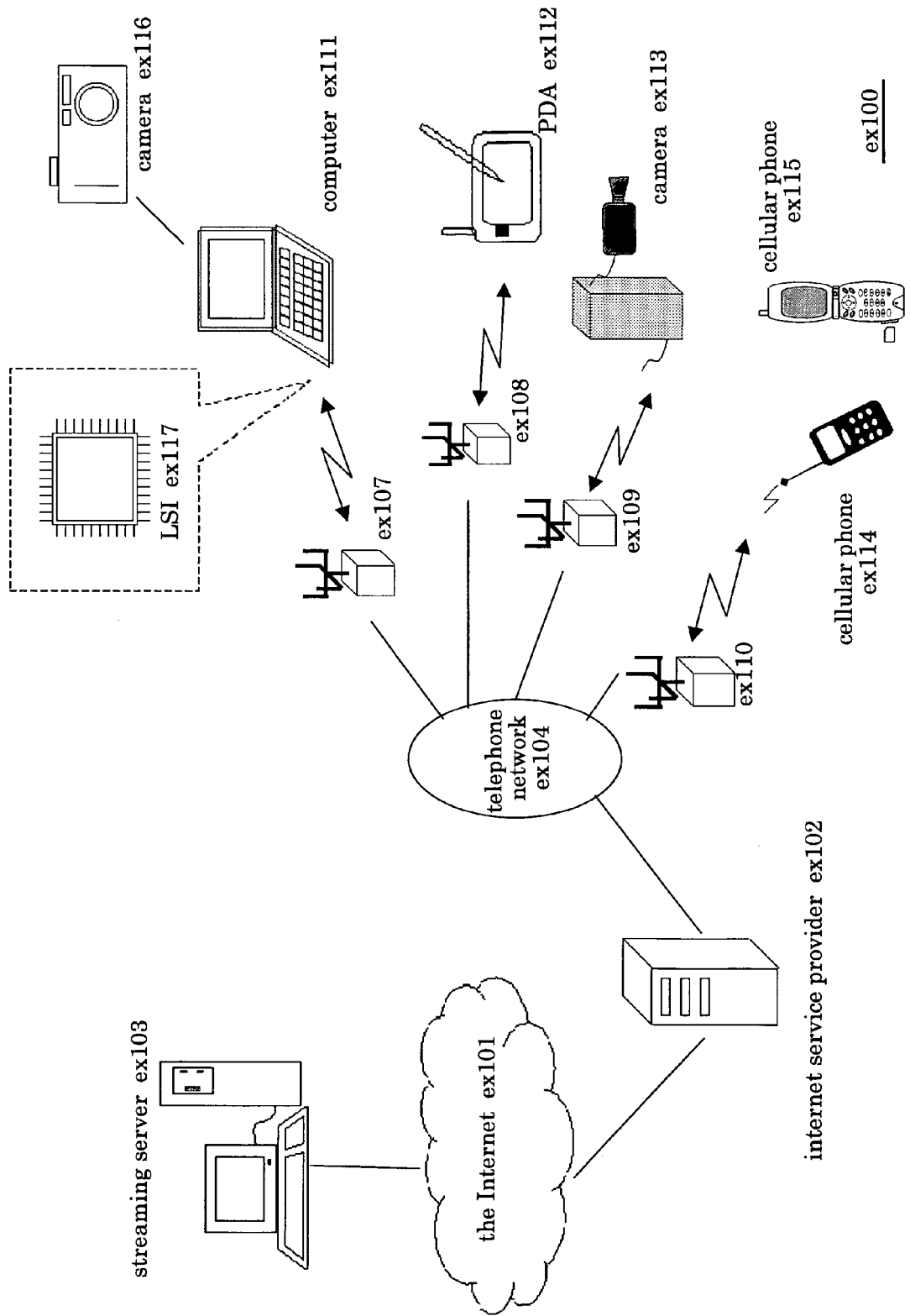
FIG. 29 is a block diagram describing the overall configuration of the content supply system (sixth embodiment).

FIG. 29 is a block diagram showing an overall structure of a content providing system ex100 that realizes a content delivering service. An area where a communication service is provided is divided into cells of a desired size, and base stations ex107-ex110 that are fixed radio stations are provided in the cells.

This content providing system ex100 includes a computer ex111, a personal digital assistant (PDA) ex112, a camera ex113, a cellular phone ex114, a cellular phone with camera ex115 and other equipment that are connected to the Internet ex101 for example via an internet service provider ex102, a telephone network ex104 and base stations ex107-ex110.

However, the content providing system ex100 can adopt any combination for connection without being limited to the combination shown in FIG. 29. In addition, each of the devices can be connected directly to the telephone network ex104 without the base stations ex107-ex110 that are fixed radio stations.

The camera ex113 is a device such as a digital video camera that can obtain a moving image. In addition, the cellular phone may be any type of PDC (Personal Digital Communications) method, CDMA (Code Division Multiple Access) method, W-CDMA (Wideband-Code Division Multiple Access) method, or GSM (Global System for Mobile Communications) method, or a cellular phone of PHS (Personal Handyphone System).

In addition, the streaming server ex103 is connected to the camera ex113 via the base station ex109 and the telephone network ex104, so that live delivery can be performed on the basis of coded data transmitted by a user of the camera ex113. The coding process of the obtained data may be performed by the camera ex113 or by a server for transmitting data. In addition, the moving image data obtained by the camera ex116 may be transmitted to the streaming server ex103 via the computer ex111. The camera ex116 is a device that can take a still image like a digital camera and a moving image. In this case, coding of the moving image data may be performed by the camera ex116 or by the computer ex111. In addition, the coding process may be performed by an LSI ex117 in the computer ex111 or the camera ex116. Note that it is possible to incorporate software for coding and decoding images into a storage medium (a CD-ROM, a flexible disk, a hard disk or the like) that is a recording medium readable by the computer ex111. Furthermore, the cellular phone with camera ex115 may transmit the moving image data. In this case, the moving image data is coded by the LSI in the cellular phone ex115.

In this content providing system ex100, content (for example, a moving image of a music concert) that the user is recording with the camera ex113 or the camera ex116 are coded as shown in the above-described embodiments and transmitted to the streaming server ex103, while the streaming server ex103 delivers a stream of the content data to a client who made a request. The client may be the computer ex111, the PDA ex112, the camera ex113, the cellular phone ex114 or the like that can decode the coded data. Thus, in the content providing system ex100, the client can receive and reproduce the coded data. The system can realize personal broadcasting when the client receives, decodes and reproduces the stream in real time.

To display the content, the visual processing devices, the visual processing methods and the visual processing programs may be used. For example, the computer ex111, the PDA ex112, the camera ex113, the cellular phone ex114 or the like may be provided with the visual processing devices and execute the visual processing methods and the visual processing programs.

The streaming server ex103 may be a device which provides the visual processing device with the profile data through the Internet ex101. Moreover, a plurality of the streaming servers ex103 may be exist and each of the streaming servers ex103 may provide different profile datas. Furthermore, the streaming server ex103 may produce the profile data. If the visual processing device can obtain the profile data through the Internet ex101, it is not necessary for the visual processing device to store a large number of profiles for the visual processing in advance, and this allows the storage capacity for the profiles to be reduced. Further, by obtaining the profiles from different servers which locate on the Internet ex101, it is possible for the visual processing device to execute different image processings.

An example regarding a cellular phone will now be described.

Figure 30:
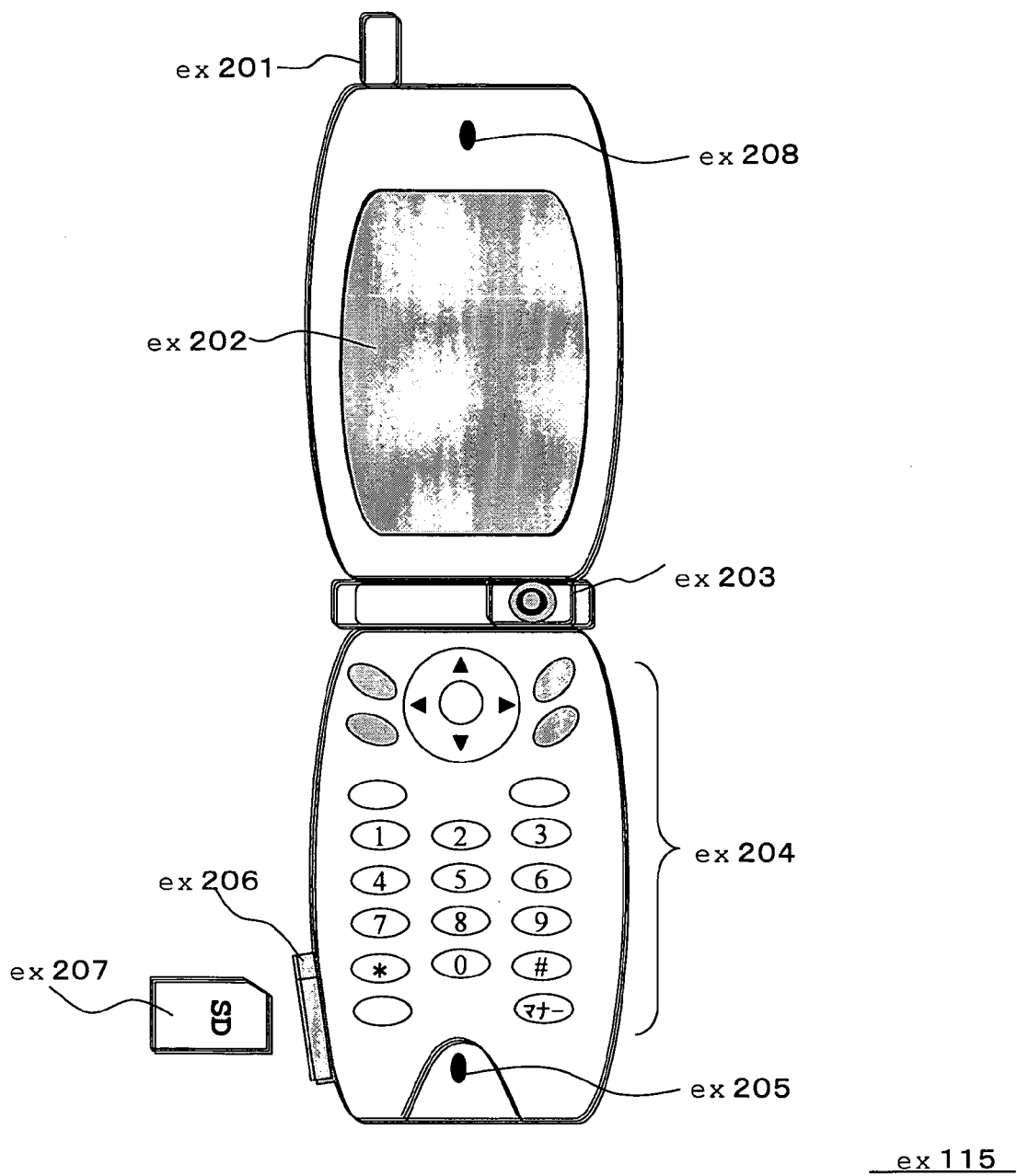
FIG. 30 is an example of a portable telephone furnished with the visual processing device of the present invention (sixth embodiment).

FIG. 30 shows the cellular phone ex115 that utilizes the visual processing devices of the present invention. The cellular phone ex115 includes an antenna ex201 for transmitting and receiving radio waves with the base station ex110, a camera portion ex203 such as a CCD camera that can take a still image, a display portion ex202 such as a liquid crystal display for displaying images obtained by the camera portion ex203 or images received by the antenna ex201 after the image data are decoded, a main body portion including a group of operating keys ex204, a sound output portion ex208 such as a speaker for producing sounds, a sound input portion ex205 such as a microphone for receiving sounds, a recording medium ex207 for storing coded data or decoded data such as data of taken moving images or still images, data of received e-mails, moving images or still images, and a slot portion ex206 that enables the recording medium ex207 to be attached to the cellular phone ex115. The recording medium ex207 such as an SD card includes a plastic case housing a flash memory element that is one type of EEPROM (Electrically Erasable and Programmable Read Only Memory) non-volatile memory that is electronically rewritable and erasable.

Furthermore, the cellular phone ex115 will be described with reference to FIG. 31. The cellular phone ex115 includes a main controller portion ex311 for controlling each portion of the main body portion having the display portion ex202 and the operating keys ex204, a power source circuit portion ex310, an operational input controller portion ex304, an image coding portion ex312, a camera interface portion ex303, an LCD (Liquid Crystal Display) controller portion ex302, an image decoding portion ex309, a multiplex separation portion ex308, a recording and reproduction portion ex307, a modem circuit portion ex306 and a sound processing portion ex305, which are connected to each other via a synchronizing bus ex313.

When the user turns on a clear and power key, the power source circuit portion ex310 supplies power from a battery pack to each portion so that the digital cellular phone with camera ex115 is activated.

The cellular phone ex115 converts a sound signal collected by the sound input portion ex205 during a sound communication mode into digital sound data by the sound processing portion ex305 under control of the main controller portion ex311 that includes a CPU, a ROM and a RAM. The digital sound data are processed by the modem circuit portion ex306 as a spectrum spreading process and are processed by the transmission and reception circuit portion ex301 as a digital to analog conversion process and a frequency conversion process. After that, the data are transmitted via the antenna ex201. In addition, the cellular phone ex115 amplifies a signal that is received by the antenna ex201 during the sound communication mode and performs the frequency conversion process and an analog to digital conversion process on the data, which is processed by the modem circuit portion ex306 as a spectrum inverse spreading process and is converted into a analog sound signal by the sound processing portion ex305. After that, the analog sound signal is delivered by the sound output portion ex208.

Furthermore, when transmitting electronic mail during a data communication mode, text data of the electronic mail are entered by using the operating keys ex204 of the main body portion and are given to the main controller portion ex311 via the operational input controller portion ex304. The main controller portion ex311 performs the spectrum spreading process on the text data by the modem circuit portion ex306 and performs the digital to analog conversion process and the frequency conversion process by the transmission and reception circuit portion ex301. After that, the data are transmitted to the base station ex110 via the antenna ex201.

When transmitting image data during the data communication mode, the image data obtained by the camera portion ex203 are supplied to the image coding portion ex312 via the camera interface portion ex303. In addition, if the image data are not transmitted, it is possible to display the image data obtained by the camera portion ex203 directly by the display portion ex202 via the camera interface portion ex303 and an LCD controller portion ex302.

The image coding portion ex312 converts the image data supplied from the camera portion ex203 into the coded image data by compressing and coding the data, and the coded image data are supplied to the multiplex separation portion ex308. In addition, the cellular phone ex115 collects sounds by the sound input portion ex205 while the camera portion ex203 is taking the image, and the digital sound data is supplied from the sound processing portion ex305 to the multiplex separation portion ex308.

The multiplex separation portion ex308 performs multiplexing of the coded image data supplied from the image coding portion ex312 and the sound data supplied from the sound processing portion ex305 by a predetermined method. Multiplexed data obtained as a result are processed by the modem circuit portion ex306 as a spectrum spreading process and are processed by the transmission and reception circuit portion ex301 as a digital to analog conversion process and a frequency conversion process. After that, the data are transmitted via the antenna ex201.

When receiving moving image file data linked to a web page during the data communication mode, a signal received from the base station ex110 via the antenna ex201 is processed by the modem circuit portion ex306 as a spectrum inverse spreading process. Multiplexed data obtained as a result are supplied to the multiplex separation portion ex308.

In addition, in order to decode multiplexed data received via the antenna ex201, the multiplex separation portion ex308 separates a coded bit stream of image data in the multiplexed data from a coded bit stream of sound data. Then, the multiplex separation portion ex308 supplies the coded image data to the image decoding portion ex309 via the synchronizing bus ex313 and supplies the sound data to the sound processing portion ex305.

Next, the image decoding portion ex309 generates reproduction moving image data by decoding the coded bit stream of the image data and supplies the data to the display portion ex202 via the LCD controller portion ex302. Thus, the moving image data included in a moving image file that is linked to a home page can be displayed. In this case, the sound processing portion ex305 converts the sound data into an analog sound signal, which is supplied to the sound output portion ex208. Thus, sound data included in the moving image file that is linked to a home page can be reproduced.

Note that the image decoding portion ex309 may be provided with the visual processing device shown in the above-described embodiments.

Figure 32:
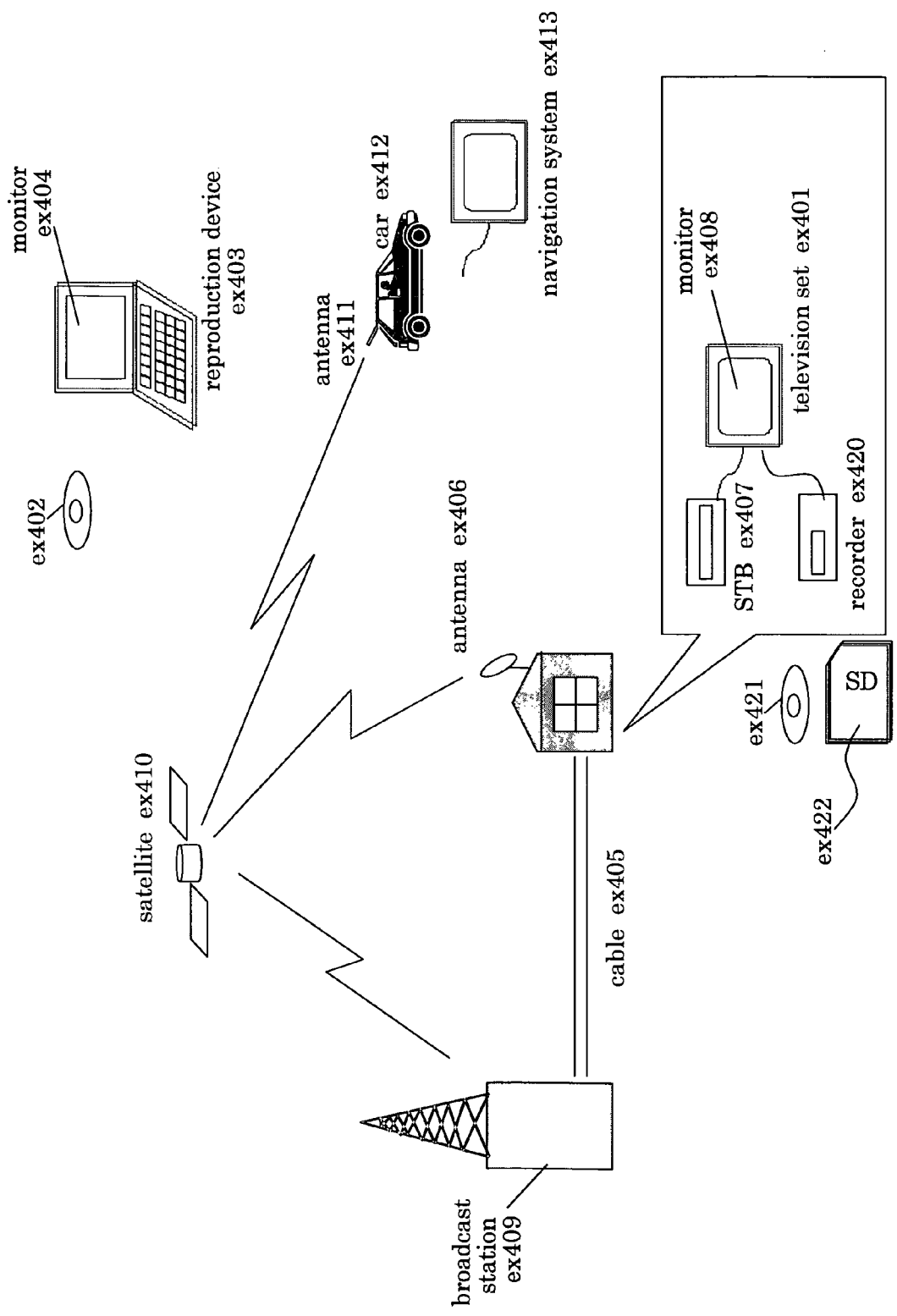
FIG. 32 is an example of the system for digital broadcast (sixth embodiment).

Note that the present invention is not limited to the example of the system described above. Digital broadcasting by satellite or terrestrial signals has been a recent topic of discussion. As shown in FIG. 32, the visual processing devices, the visual processing methods and the visual processing programs of the present invention can be incorporated into the digital broadcasting system, too.

More specifically, in a broadcast station ex409, a coded bit stream of image information is sent to a communication or a broadcasting satellite ex410 via a radio wave. The broadcasting satellite ex410 that received the coded bit stream of image information sends radio waves for broadcasting. These radio waves are received by an antenna ex406 of a house equipped with a satellite broadcasting reception facility, and a device such as a television set (a receiver) ex401 or a set top box (STB) ex407 decodes the coded bit stream and reproduces the same. In addition, the television set (the receiver) ex401 or the set top box (STB) ex407 may be provided with the visual processing devices shown in the above-described embodiments, use the visual processing methods shown in the above-described embodiments or execute the visual processing programs shown in the above-described embodiments. In addition, a reproduction device ex403 for reading and decoding a coded bit stream that is recorded on a storage medium ex402 such as a CD or a DVD that is a recording medium may be equipped with the visual processing devices, the visual processing methods or the visual processing programs shown in the above-described embodiments. In this case, the reproduced image signal and text track are displayed on a monitor ex404. In addition, it is possible to mount the visual processing devices, the visual processing methods or the visual processing programs shown in the above-described embodiments, in a set top box ex407 that is connected to a cable ex405 for a cable television or the antenna ex406 for a satellite or surface wave broadcasting, so that the image can be reproduced on a monitor ex408 of the television set. In this case, it is possible to incorporate the visual processing devices shown in the above-described embodiments not into the set top box but into the television set. In addition, it is possible that a car ex412 equipped with an antenna ex411 receives a signal from the broadcasting satellite ex410 or the base station ex107 and reproduces the moving image on a display of a navigation system ex413 in the car ex412.

Furthermore, it is possible to encode the image signal and record the encoded image signal in a recording medium. As a specific example, there is a recorder ex420 such as a DVD recorder for recording image signals on a DVD disk ex421 or a disk recorder for recording image signals on a hard disk. Furthermore, it is possible to record on an SD card ex422. In addition, in case that the recorder ex420 includes the decoding apparatus of the present invention, it is possible to reproduce image signals recorded on a DVD disk ex421 or a SD card ex422 via the image signal processing device, so as to display on the monitor ex408.

Figure 31:
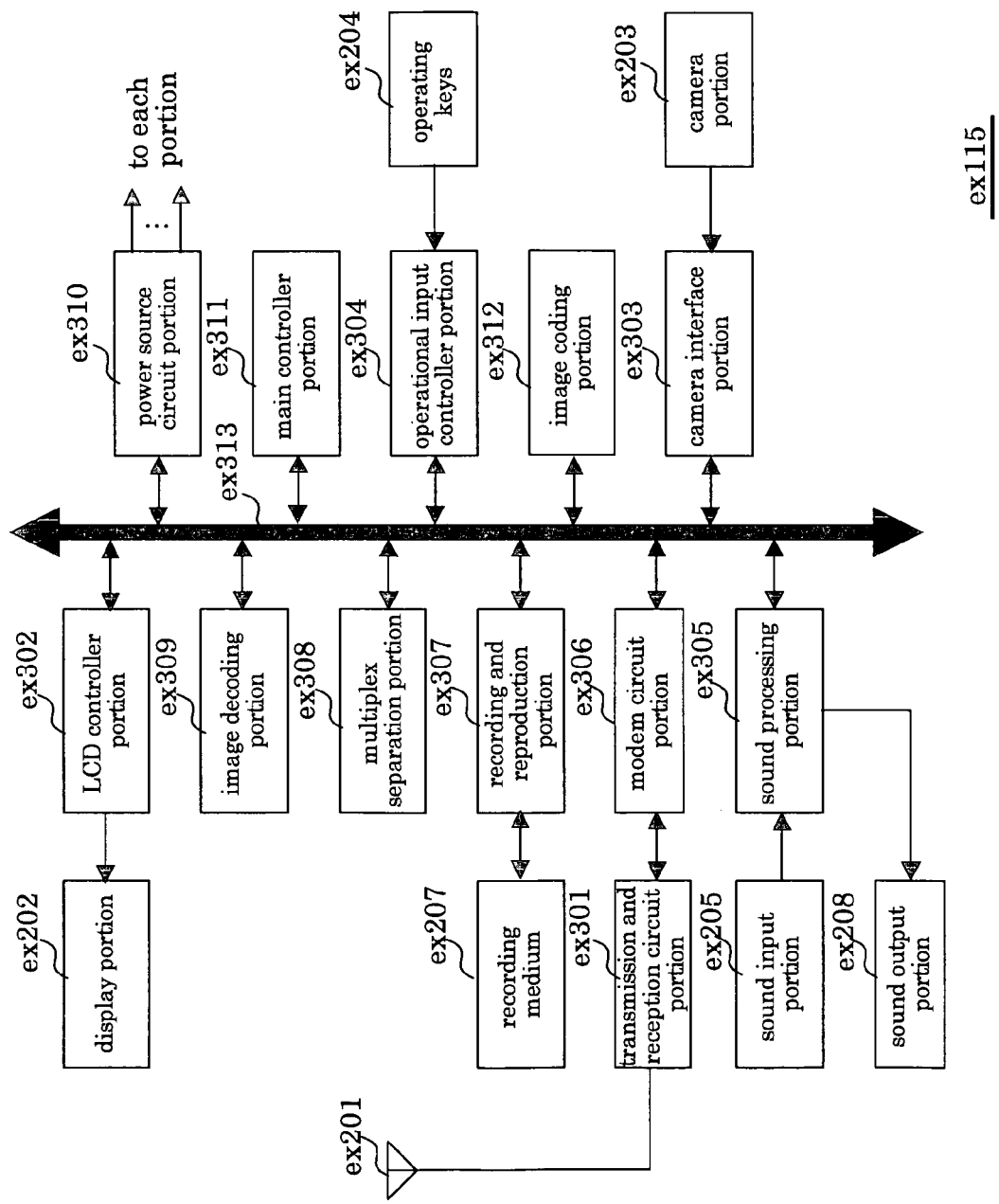
FIG. 31 is a block diagram describing the configuration of the portable telephone (sixth embodiment).

Note that in the structure of the navigation system ex413 shown in FIG. 31, the camera portion ex203, the camera interface portion ex303 and the image coding portion ex312 can be omitted. This can be also applied to the computer ex111 and the television set (the receiver) ex401.

In addition, the terminal device such as the cellular phone ex114 may include three types of assemblies. A first type is a transmission and reception terminal having both the coder and the decoder, a second type is a transmission terminal having only a coder and a third type is a reception terminal having only a decoder.

Thus, the visual processing devices, the visual processing methods or the visual processing programs shown in the above-described embodiments can be used for any device and system described above, so that effects described above can be obtained.

[Attachments]

The present invention shown in the above-described embodiments can also be expressed as follows.

<Content of the Attachment>

(Attachment 1)

A visual processing device comprising:

image region partitioning means that partitions an image signal that has been received as input into a plurality of image regions;

gradation transformation property derivation means that derives a gradation transformation property for each image region, and uses the gradation property of a target image region whose gradation transformation property is to be derived and surrounding image regions surrounding the target image region to derive the gradation transformation property of the target image region; and gradation processing means that transforms the gradation of the image signal based on the gradation transformation property that has been derived.

(Attachment 2)

The visual processing device according to attachment 1, wherein the gradation transformation property is a gradation transformation curve; and wherein the gradation transformation property derivation means has histogram creation means that uses the gradation properties to create a histogram, and gradation curve creation means that creates a gradation transformation curve based on the histogram that is created.

(Attachment 3)

The visual processing device according to attachment 1, wherein the gradation transformation property is a selection signal for selecting a single gradation transformation table from among a plurality of gradation transformation tables for transforming the gradation of the image signal; and wherein the gradation processing means has the plurality of gradation transformation tables as a two-dimensional LUT.

(Attachment 4)

The visual processing device according to attachment 3, wherein the two-dimensional LUT holds a plurality of gradation transformation tables in the order of monotonically increasing or monotonically decreasing values of the gradation processed image signals with respect to the values of the selection signals, for all of the values of the image signals.

(Attachment 5)

The visual processing device according to attachment 3 or 4, wherein the two-dimensional LUT can be altered by the registration of the profile data.

(Attachment 6)

The visual processing device according to any one of attachments 3 to 5, wherein the values of the selection signals are derived as the characteristic amount of an individual selection signal that is a selection signal that has been derived for the target image region and each image region of the surrounding image regions.

(Attachment 7)

The visual processing device according to any one of attachments 3 to 5, wherein the value of the selection signal is derived based on a gradation property characteristic amount that is a characteristic amount that has been derived using the gradation properties of the target image region and the surrounding image regions.

(Attachment 8)

The visual processing device according to any one of attachments 3 to 7, wherein the gradation processing means comprises gradation processing execution means that uses the gradation transformation table selected by the selection signal to transform the gradation of the target image region, and correction means that corrects the gradation of the gradation processed image signal, and based on the gradation processing table that has been selected for the image region including a target pixel to be corrected and adjacent image regions that are adjacent to the image region including the target pixel, corrects the gradation of the target pixel.

(Attachment 9)

The visual processing device according to any one of attachments 3 to 7, wherein the gradation processing means includes correction means that corrects the selection signal to derive a corrected selection signal for selecting a gradation processing table for each pixel of the image signal, and gradation processing execution means that uses the gradation transformation table selected by the corrected selection signal to transform the gradation of the image signal.

(Attachment 10)

A visual processing method comprising:

an image region partitioning step of partitioning an image signal that has been received as input into a plurality of image regions;

a gradation transformation property derivation step of deriving gradation transformation properties for each image region, and uses the gradation property of a target image region whose gradation transformation property is to be derived and surrounding image regions surrounding the target image region to derive the gradation transformation property of the target image region; and a gradation processing step of transforming the gradation of the image signal based on the gradation transformation property that has been derived.

(Attachment 11)

The visual processing method according to attachment 10, wherein the gradation transformation property is a gradation transformation curve; and wherein the gradation transformation property derivation step has a histogram creation step of using the gradation properties to create a histogram, and a gradation curve creation step of creating the gradation transformation curve based on the histogram that is created.

(Attachment 12)

The visual processing method according to attachment 10, wherein the gradation transformation property is a selection signal for selecting a single gradation transformation table from among a plurality of gradation transformation tables for transforming the gradation of the image signal; and wherein the gradation processing step has a gradation processing execution step of using the gradation transformation table selected by the selection signal to transform the gradation of the target image region, and a correction step of correcting the gradation of the gradation processed image signal, and based on the gradation processing table that has been selected for the image region including a target pixel to be corrected and an adjacent image region that is adjacent to the image region including the target pixel, correcting the gradation of the target pixel.

(Attachment 13)

The visual processing method according to attachment 10, wherein the gradation transformation property is a selection signal for selecting a single gradation transformation table from among a plurality of gradation transformation tables for transforming the gradation of the image signal; and wherein the gradation processing step includes a correction step of correcting the selection signal to derive a corrected selection signal for selecting a gradation processing table for each pixel of the image signal, and a gradation processing execution step of using the gradation transformation table selected by the corrected selection signal to transform the gradation of the image signal.

(Attachment 14)

A visual processing program for performing a visual processing method on a computer, the visual processing program causing the computer to perform a visual processing method that comprises:

an image region partitioning step of partitioning an image signal that has been received as input into a plurality of image regions;

a gradation transformation property derivation step of deriving gradation transformation properties for each image region, and using the gradation properties of a target image region whose gradation transformation property is to be derived and surrounding image regions surrounding the target image region to derive the gradation transformation property of the target image region; and a gradation processing step of transforming the gradation of the image signal based on the gradation transformation property that has been derived.

(Attachment 15)

The visual processing program according to attachment 14, wherein the gradation transformation property is a gradation transformation curve; and wherein the gradation transformation property derivation step has a histogram creation step of using the gradation properties to create a histogram, and a gradation curve creation step of creating the gradation transformation curve based on the histogram that is created.

(Attachment 16)

The visual processing program according to attachment 14, wherein the gradation transformation property is a selection signal for selecting a single gradation transformation table from among a plurality of gradation transformation tables for transforming the gradation of the image signal; and wherein the gradation processing step has a gradation processing execution step of using the gradation transformation table selected by the selection signal to transform the gradation of the target image region, and a correction step of correcting the gradation of the gradation processed image signal, in which based on the gradation processing table that has been selected for the image region including a target pixel to be corrected and an adjacent image region that is adjacent to the image region including the target pixel, the gradation of the target pixel is corrected.

(Attachment 17)

The visual processing program according to attachment 14, wherein the gradation transformation property is a selection signal for selecting a single gradation transformation table from among a plurality of gradation transformation tables for transforming the gradation of the image signal; and wherein the gradation processing step includes a correction step of correcting the selection signal to derive a corrected selection signal for selecting a gradation processing table for each pixel of the image signal, and a gradation processing execution step of using the gradation transformation table selected by the corrected selection signal to transform the gradation of the image signal.

(Attachment 18)

The visual processing device according to attachment 1, wherein the gradation processing means has parameter output means that outputs a curve parameter of a gradation transformation curve for transforming the gradation of the image signal based on the gradation transformation property, and gradation processes the image signal using the gradation transformation curve specified by the gradation transformation property and the curve parameter.

(Attachment 19)

The visual processing device according to attachment 18, wherein the parameter output means is a lookup table that stores the relationship between the gradation transformation properties and the curve parameters.

(Attachment 20)

The visual processing device according to attachment 18 or 19, wherein the curve parameter includes a value of a gradation processed image signal with respect to a predetermined value of the image signal.

(Attachment 21)

The visual processing device according to any one of attachments 18 to 20, wherein the curve parameter includes the slope of the gradation transformation curve in a predetermined section of the image signal.

(Attachment 22)

The visual processing device according to any one of attachments 18 to 21, wherein the curve parameter includes at least one coordinate point through which the gradation transformation curve passes.

(Attachment 23)

A visual processing device comprising:

spatial processing means that performs spatial processing of each of the plurality of image regions in an image signal that has been received as input to derive spatially processed signals, in the spatial processing, using a weighting based on the difference in gradation properties of a target image region to be subjected to spatial processing and surrounding image regions surrounding the target image region to take the weighted mean of the gradation properties of the target image region and the surrounding image regions; and visual processing means that performs visual processing of the target image region based on the gradation properties of the target image region and the spatially processed signal.

(Attachment 24)

The visual processing device according to attachment 23, wherein the weighting is smaller the greater the absolute value of the gradation property difference.

(Attachment 25)

The visual processing device according to attachment 23 or 24, wherein the weighting is smaller the greater the distance between the target image region and the surrounding image region.

(Attachment 26)

The visual processing device according to any one of attachments 23 to 25, wherein the image region includes a plurality of pixels; and wherein the gradation properties of the target image region and the surrounding image regions are set as a characteristic amount of pixel values making up each of those image regions.

(Attachment 27)

A visual processing device comprising:

target image region determination means that determines a target image region for which to derive a gradation transformation property from an image signal that has been received as input;

surrounding image region determination means that determines at least one surrounding image region that is positioned proximal to the target image region and that includes a plurality of pixels;

gradation transformation property derivation means that uses surrounding image data of the surrounding image region to derive the gradation transformation property of the target image region; and gradation processing means that performs gradation processing of the image signal of the target image region based on the gradation transformation property that has been derived.

(Attachment 28)

A visual processing method comprising:

a target image region determination step of determining a target image region for which to derive a gradation transformation property from an image signal that has been received as input;

a surrounding image region determination step of determining at least one surrounding image region that is positioned proximal to the target image region and that includes a plurality of pixels;

a gradation transformation property derivation step of using surrounding image data of the surrounding image region to derive the gradation transformation property of the target image region; and a gradation processing step of performing gradation processing of the image signal of the target image region based on the gradation transformation property that has been derived.

(Attachment 29)

A visual processing program for using a computer to perform a visual processing method of visually processing an image signal that has been input, wherein the visual processing method comprises:

a target image region determination step of determining a target image region for which to derive a gradation transformation property from an image signal that has been received as input;

a surrounding image region determination step of determining at least one surrounding image region that is positioned proximal to the target image region and that includes a plurality of pixels;

a gradation transformation property derivation step of using surrounding image data of the surrounding image region to derive the gradation transformation property of the target image region; and a gradation processing step of performing gradation processing of the image signal of the target image region based on the gradation transformation property that has been derived.

(Attachment 30)

A semiconductor device comprising:

a target image region determination portion that determines a target image region for which to derive a gradation transformation property from an image signal that has been received as input;

a surrounding image region determination portion that determines at least one surrounding image region that is positioned proximal to the target image region and that includes a plurality of pixels;

a gradation transformation property derivation portion that uses surrounding image data of the surrounding image region to derive the gradation transformation property of the target image region; and a gradation processing portion that performs gradation processing of the image signal of the target image region based on the gradation transformation property that has been derived.

<Description of the Attachments>

The visual processing device according to attachment 1 is provided with image region partitioning means, gradation transformation property derivation means, and gradation processing means. The image region partitioning means partitions an image signal that has been received as input into a plurality of image regions. The gradation transformation property derivation means derives gradation transformation properties for each image region, and uses the gradation properties of a target image region whose gradation transformation property is to be derived and surrounding image regions surrounding the target image region to derive the gradation transformation property of the target image region. The gradation processing means performs gradation processing of the image signal based on the gradation transformation property that has been derived.

Here, the gradation transformation property is a property of gradation processing for each image region. The gradation property is for example a pixel value such as the luminance or brightness of each pixel.

With the visual processing device of this invention, the gradation transformation property of each image region is determined using not only the gradation properties of each image region but also the gradation properties of image regions over a wide area that includes surrounding image regions. As a result, a spatial processing effect can be added to the gradation processing of each image region, this makes it possible to perform gradation processing that yields a better visual effect.

The visual processing device according to attachment 2 is the visual processing device according to attachment 1 in which the gradation transformation property is a gradation transformation curve. Also, the gradation transformation property derivation means has histogram creation means that uses the gradation properties to create a histogram, and gradation curve creation means that creates a gradation transformation curve based on the histogram that is created.

Here, the histogram is a distribution of the gradation properties of the pixels in the target image region and the surrounding image regions. The gradation curve creation means takes the cumulative curve of the cumulative histogram values as the gradation transformation curve.

With the visual processing device of this invention, the histogram is created using not only the gradation properties of each image region but also the gradation properties of image regions over a wide area that includes surrounding image regions. Thus, it is possible to increase the number of partitions of the image signal and reduce the size of the image regions, and this makes it possible to inhibit pseudo-borders due to gradation processing from occurring. Further, it allows the boundary between image regions to be kept from standing out unnaturally.

The visual processing device according to attachment 3 is the visual processing device according to attachment 1 in which the gradation transformation property is a selection signal for selecting a single gradation transformation table from among a plurality of gradation transformation tables for transforming the gradation of the image signal. Also, the gradation processing means holds the plurality of gradation transformation tables as a two-dimensional LUT.

Here, the gradation transformation table is for example a lookup table (LUT) storing the pixel values of the gradation processed image signals with respect to the pixel values of the image signals.

The selection signal for example has a value that has been assigned to a single gradation transformation table to be selected from among the values respectively assigned to each of a plurality of gradation transformation tables. The gradation processing means references the two-dimensional LUT from the value of the selection signal and the pixel value of the image signal and outputs the pixel value of the gradation processed image signal.

With the visual processing device of this invention, gradation processing is performed by referencing a two-dimensional LUT. Gradation processing thus can be performed faster. Also, because gradation processing is performed after selecting one gradation transformation table from among a plurality of gradation processing tables, appropriate gradation processing can be performed.

The visual processing device according to attachment 4 is the visual processing device according to attachment 3 in which the two-dimensional LUT stores a plurality of gradation transformation tables in the order of monotonically increasing or monotonically decreasing values of the gradation processed image signals with respect to the values of the selection signals, for all of the values of the image signals.

With the visual processing device of this invention, the value of the selection signal indicates the extent of gradation transformation.

The visual processing device according to attachment 5 is the visual processing device according to attachment 3 or 4 in which the two-dimensional LUT can be changed by the registration of the profile data.

Here, the profile data are the data stored in the two-dimensional LUT, whose elements are the pixel values of the gradation processed image signals.

With the visual processing device of this invention, by changing the two-dimensional LUT it is possible to make various changes to the gradation processing features without changing the hardware configuration.

The visual processing device according to attachment 6 is the visual processing device according to any one of attachments 3 to 5 in which the value of the selection signal is derived as the characteristic amount of an individual selection signal that is a selection signal that has been derived for each image region of the target image region and the surrounding image regions.

Here, the characteristic amount of the individual selection signal is for example the mean value (simple mean or weighted mean), maximum value, or minimum value of the selection signals derived for each image region.

With the visual processing device of this invention, the selection signal for the target image region is derived as the characteristic amount of the selection signals for a wide image region area that includes surrounding image regions. Thus, it is possible to add a spatial processing effect to the selection signal, and this allows the boundary between image regions to be kept from standing out unnaturally.

The visual processing device according to attachment 7 is the visual processing device according to any one of attachments 3 to 5 in which the value of the selection signal is derived based on a gradation property characteristic amount that is a characteristic amount that has been derived using the gradation properties of the target image region and the surrounding image regions.

Here, the gradation property characteristic amount is for example the mean value (simple mean or weighted mean), maximum value, or minimum value of the gradation properties of a wide area that includes the target image region and surrounding image regions.

With the visual processing device of this invention, the selection signal for the target image region is derived based on the gradation property characteristic amount for a wide area that includes surrounding image regions. Thus, it is possible to add a spatial processing effect to the selection signal, and this allows the boundary between image regions to be kept from standing out unnaturally.

The visual processing device according to attachment 8 is the visual processing device according to any one of attachments 3 to 7 in which the gradation processing means comprises gradation processing execution means and correction means. The gradation processing execution means uses the gradation transformation table selected by the selection signal to transform the gradation of the target image region. The correction means corrects the gradation of the gradation processed image signal, and based on the gradation processing table that has been selected for the image region including a target pixel to be corrected and adjacent image regions that are adjacent to the image region including the target pixel, corrects the gradation of the target pixel.

Here, the adjacent image regions can be the same image regions as the surrounding image regions when deriving the gradation transformation properties, or they can be different image regions. For example, as the adjacent image regions it is possible to select the three image regions, of the image regions adjacent to the image region that includes the target pixel, that have the shortest distance to the target pixel.

The correction means for example uses the same gradation transformation table for each target image region to correct the gradation of the gradation processed image signal. Correction of the target pixel is for example performed such that the effect that each gradation transformation table selected for the adjacent image regions has corresponds to the position of the target pixel.

With the visual processing device of this invention, it is possible to correct the gradation of the image signal for each pixel. Thus, the boundary between image regions can be further prevented from standing out unnaturally, and this allows the visual effect to be increased.

The visual processing device according to attachment 9 is the visual processing device according to any one of attachments 3 to 7 in which the gradation processing means includes correction means and gradation processing execution means. The correction means corrects the selection signal to derive a corrected selection signal for selecting a gradation processing table for each pixel of the image signal. The gradation processing execution means uses the gradation transformation table selected by the corrected selection signal to transform the gradation of the image signal.

The correction means for example corrects the selection signal that has been derived for each target image region based on the pixel position and the selection signals that have been derived for the image regions adjacent to the target image region, deriving a selection signal for each pixel.

With the visual processing device of this invention, it is possible to derive a selection signal for each pixel. Thus, the boundary between image regions can be further prevented from standing out unnaturally, and this allows the visual effect to be increased.

The visual processing method according to attachment 10 comprises an image region partitioning step, a gradation transformation property derivation step, and a gradation processing step. The image region partitioning step is a step of partitioning an image signal that has been received as input into a plurality of image regions. The gradation transformation property derivation step is a step of deriving a gradation transformation property for each image region, in which the gradation properties of a target image region whose gradation transformation property is to be derived and surrounding image regions surrounding the target image region are used to derive the gradation transformation property of the target image region. The gradation processing step is a step of transforming the gradation of the image signal based on the gradation transformation property that has been derived.

Here, the gradation transformation property is a property of gradation processing for each image region. The gradation property is for example a pixel value such as the luminance or brightness of each pixel.

With the visual processing method of this invention, the gradation transformation property of each image region is determined using not only the gradation properties of each image region but also the gradation properties of image regions over a wide area that includes surrounding image regions. As a result, a spatial processing effect can be added to the gradation processing of each image region, and this makes it possible to perform gradation processing that produces a better visual effect.

The visual processing method according to attachment 11 is the visual processing method according to attachment 10 in which the gradation transformation property is a gradation transformation curve. Also, the gradation transformation property derivation step has a histogram creation step of using the gradation properties to create a histogram, and a gradation curve creation step of creating the gradation transformation curve based on the histogram that is created.

Here, the histogram is a distribution of the gradation properties of the pixels in the target image region and the surrounding image regions. In the gradation curve creation step, the cumulative curve of the cumulative histogram values is taken as the gradation transformation curve.

With the visual processing method of this invention, the histogram is created using not only the gradation properties of each image region but also the gradation properties of image regions over a wide area that includes surrounding image regions. Thus, it is possible to increase the number of partitions of the image signal and reduce the size of the image regions, and this makes it possible to inhibit pseudo-borders from occurring due to gradation processing. Further, it allows the boundary between image regions to be kept from standing out unnaturally.

The visual processing method according to attachment 12 is the visual processing method according to attachment 10 in which the gradation transformation property is a selection signal for selecting a single gradation transformation table from among a plurality of gradation transformation tables for transforming the gradation of the image signal. Also, the gradation processing step has a gradation processing execution step and a correction step. The gradation processing execution step is a step of using the gradation transformation table selected by the selection signal to transform the gradation of the target image region The correction step is a step of correcting the gradation of the gradation processed image signal, in which based on the gradation processing table that has been selected for the image region including a target pixel to be corrected and an adjacent image region that is adjacent to the image region including the target pixel, the gradation of the target pixel is corrected.

Here, the gradation transformation table is for example a lookup table (LUT) storing the pixel values of the gradation processed image signals with respect to the pixel values of the image signals. The adjacent image regions can be the same image regions as the surrounding image regions when deriving the gradation transformation properties, or they can be different image regions. For example, as the adjacent image regions it is possible to select the three image regions, of the image regions adjacent to the image region that includes the target pixel, that have the shortest distance to the target pixel.

The selection signal for example has a value that has been assigned to a single gradation transformation table to be selected from among the values respectively assigned to each of a plurality of gradation transformation tables. The gradation processing step is a step of referencing the LUT from the value of the selection signal and the pixel values of the image signal and outputting the pixel values of the gradation processed image signal. The correction step is a step of for example using the same gradation transformation table for each target image region to correct the gradation of the gradation processed image signal. Correction of a target pixel is for example performed such that the effect that each gradation transformation table selected for the adjacent image regions has corresponds to the position of the target pixel.

With the visual processing method of this invention, gradation processing is performed with reference to a LUT. Thus, the speed of gradation processing can be increased. Also, gradation processing is performed by selecting a single gradation transformation table from among a plurality of gradation transformation tables, and thus it is possible to perform gradation processing that is appropriate. Moreover, the gradation of the image signal is corrected for each pixel. Thus, the boundary between image regions can be further prevented from standing out unnaturally, and this increases the visual effect.

The visual processing method according to attachment 13 is the visual processing method according to attachment 10 in which the gradation transformation property is a selection signal for selecting a single gradation transformation table from among a plurality of gradation transformation tables for transforming the gradation of the image signal. Further, the gradation processing step includes a correction step and a gradation processing execution step. The correction step is a step of correcting the selection signal to derive a corrected selection signal for selecting a gradation processing table for each pixel of the image signal. The gradation processing execution step is a step of using the gradation transformation table selected by the corrected selection signal to transform the gradation of the image signal.

Here, the gradation transformation table is for example a lookup table (LUT) storing the pixel values of gradation processed image signals with respect to the pixel values of image signals.

The selection signal for example has a value that has been assigned to a single gradation transformation table to be selected from among the values assigned to each of a plurality of gradation transformation tables. The gradation processing step is a step of referencing the two-dimensional LUT from the value of the selection signal and the pixel value of the image signal and outputting the pixel value of the gradation processed image signal. The correction step is a step of for example correcting the selection signal that has been derived for each target image region based on the pixel position and the selection signals that have been derived for the image regions adjacent to the target image region, thereby deriving a selection signal for each pixel.

With the visual processing method of this invention, gradation processing is performed with reference to a LUT. Thus, the speed of gradation processing can be increased. Also, gradation processing is performed by selecting a single gradation transformation table from a plurality of gradation transformation tables, and thus it is possible to perform gradation processing that is appropriate. Moreover, a selection signal is derived for each pixel. Thus, the boundary between image regions can be further prevented from standing out unnaturally, and this increases the visual effect.

The visual processing program according to attachment 14 is a visual processing program for causing a computer to perform a visual processing method that comprises an image region partitioning step, a gradation transformation property derivation step, and a gradation processing step. The image region partitioning step is a step of partitioning an image signal that has been received as input into a plurality of image regions. The gradation transformation property derivation step is a step of deriving a gradation transformation property for each image region, in which the gradation properties of a target image region whose gradation transformation property is to be derived and surrounding image regions surrounding the target image region are used to derive the gradation transformation property of the target image region. The gradation processing step is a step of transforming the gradation of the image signal based on the gradation transformation property that has been derived.

Here, the gradation transformation property is a property of gradation processing for each image region. The gradation property is for example a pixel value such as the luminance or brightness of each pixel.

With the visual processing program of this invention, the gradation transformation property of each image region is determined using not only the gradation properties of each image region but also the gradation properties of image regions over a wide area that includes surrounding image regions. As a result, a spatial processing effect can be added to the gradation processing of each image region, and this makes it possible to achieve gradation processing that produces a better visual effect.

The visual processing program according to attachment 15 is the visual processing program according to attachment 14 in which the gradation transformation property is a gradation transformation curve. Also, the gradation transformation property derivation step has a histogram creation step of using the gradation properties to create a histogram, and a gradation curve creation step of creating a gradation transformation curve based on the histogram that is created.

Here, the histogram is for example a distribution of the gradation properties of the pixels in the target image region and the surrounding image regions. In the gradation curve creation step, the cumulative curve of the cumulative histogram values is taken as the gradation transformation curve.

With the visual processing program of this invention, the histogram is created using not only the gradation properties of each image region but also the gradation properties of a wide area that includes surrounding image regions. Thus, it is possible to increase the number of partitions of the image signal and reduce the size of the image regions, and this makes it possible to inhibit pseudo-borders from occurring due to gradation processing. Further, it allows the boundary between image regions to be kept from standing out unnaturally.

The visual processing program according to attachment 16 is the visual processing program according to attachment 14 in which the gradation transformation property is a selection signal for selecting a single gradation transformation table from among a plurality of gradation transformation tables for transforming the gradation of the image signal. Also, the gradation processing step has a gradation processing execution step and a correction step. The gradation processing execution step is a step of using the gradation transformation table selected by the selection signal to transform the gradation of the target image region. The correction step is a step of correcting the gradation of the gradation processed image signal, in which based on the gradation processing table that has been selected for the image region including a target pixel to be corrected and an adjacent image region that is adjacent to the image region including the target pixel, the gradation of the target pixel is corrected.

Here, the gradation transformation table is for example a lookup table (LUT) storing the pixel values of gradation processed image signals with respect to the pixel values of image signals. The adjacent image regions can be the same image regions as the surrounding image regions when deriving the gradation transformation properties, or they can be different image regions. For example, as the adjacent image regions it is possible to select the three image regions, of the image regions adjacent to the image region that includes the target pixel, that have the shortest distance to the target pixel.

The selection signal for example has a value that has been assigned to a single gradation transformation table to be selected from among the values assigned to each of a plurality of gradation transformation tables. The gradation processing step is a step of referencing the LUT from the value of the selection signal and the pixel value of the image signal and outputting a pixel value of the gradation processed image signal. The correction step is a step of for example using the same gradation transformation table for each target image region to correct the gradation of the gradation processed image signal. Correction of a target pixel is for example performed such that the effect that each gradation transformation table selected for the adjacent image regions has corresponds to the position of the target pixel.

With the visual processing program of this invention, gradation processing is performed in reference to a LUT. Thus, the speed of gradation processing can be increased. Also, gradation processing is performed by selecting a single gradation transformation table from among a plurality of gradation transformation tables, and thus it is possible to perform gradation processing that is appropriate. Moreover, the gradation of the image signal can be corrected for each pixel. Thus, the boundary between image regions can be further prevented from standing out unnaturally, and this increases the visual effect.

The visual processing program according to attachment 17 is the visual processing program according to attachment 14 in which the gradation transformation property is a selection signal for selecting a single gradation transformation table from among a plurality of gradation transformation tables for transforming the gradation of the image signal. The gradation processing step includes a correction step and a gradation processing execution step. The correction step is a step of correcting the selection signal to derive a corrected selection signal for selecting a gradation processing table for each pixel of the image signal. The gradation processing execution step is a step of using the gradation transformation table selected by the corrected selection signal to transform the gradation of the image signal.

Here, the gradation transformation table is for example a lookup table (LUT) storing the pixel values of gradation processed image signals with respect to the pixel values of image signals.

The selection signal for example has a value that has been assigned to a single gradation transformation table to be selected from among the values assigned to each of a plurality of gradation transformation tables. The gradation processing step is a step of referencing the two-dimensional LUT from the value of the selection signal and the pixel value of the image signal and outputs the pixel value of the gradation processed image signal. The correction step is a step of for example correcting the selection signal that has been derived for each target image region based on the pixel position and the selection signals that have been derived for the image regions adjacent to the target image region, thereby deriving a selection signal for each pixel.

With the visual processing program of this invention, gradation processing is performed by referencing a LUT. Thus, the speed of gradation processing can be increased. Also, gradation processing is performed by selecting a single gradation transformation table from a plurality of gradation transformation tables, and thus it is possible to perform gradation processing that is appropriate. Moreover, a selection signal is derived for each pixel. Thus, the boundary between image regions can be further prevented from standing out unnaturally, and this increases the visual effect.

The visual processing device according to attachment 18 is the visual processing device according to attachment 1 in which the gradation processing means has parameter output means that outputs a curve parameter of a gradation transformation curve for transforming the gradation of the image signal based on the gradation transformation property. The gradation processing means transforms the gradation of the image signal using the gradation transformation property and the gradation transformation curve specified by the curve parameter.

Here, the gradation transformation curve includes a straight line in a least a portion thereof. The curve parameter is a parameter for discerning the gradation transformation curve from other gradation transformation curves, and for example is a coordinate on the gradation transformation curve or the slope or curvature of the gradation transformation curve. The parameter output means is a lookup table that stores curve parameters with respect to the gradation transformation properties or computing means that obtains the curve parameter through a computation such as curve approximation using the curve parameter for a predetermined gradation transformation property.

With the visual processing device of this invention, the gradation of the image signal is transformed in correspondence with the gradation transformation properties. Thus, it is possible to perform gradation processing that is more appropriate. Also, it is not necessary to store in advance the values of all the gradation transformation curves that are used in gradation processing, and the gradation processing curve is specified from the curve parameter that has been output and based on this, gradation processing is performed. Thus, the amount of storage for storing the gradation transformation curves can be reduced.

The visual processing device according to attachment 19 is the visual processing device according to attachment 18 in which the parameter output means is a lookup table that stores the relationship between the gradation transformation properties and the curve parameters.

The lookup table stores the relationship between the gradation processing properties and the curve parameters. The gradation processing means uses the gradation transformation curves that are specified to transform the gradation of the image signal.

With the image processing device of this invention, the gradation of the image signal is transformed in correspondence with the gradation transformation properties. Thus, it is possible to perform gradation processing that is more appropriate. Also, it is not necessary to store in advance the values of all the gradation transformation curves that are used in gradation processing, and it is only necessary to store the curve parameters. Thus, the amount of storage for storing the gradation transformation curves can be reduced.

The visual processing device according to attachment 20 is the visual processing device according to attachment 18 or 19 in which the curve parameter includes a value of a gradation processed image signal with respect to a predetermined value of the image signal.

The gradation processing means uses the relationship between the predetermined value of the image signal and the value of the image signal to be subjected to visual processing to perform non-linear or linear internal division of the value of the gradation processed image signal that is included in the curve parameter, deriving the value of the gradation processed image signal.

With the visual processing device of this invention, it is possible to specify a gradation transformation curve from the value of the gradation processed image signal with respect to the predetermined value of the image signal, and using this to perform gradation processing.

The visual processing device according to attachment 21 is the visual processing device according to any of attachments 18 to 20 in which the curve parameter includes the slope of the gradation transformation curve in a predetermined section of the image signal.

With this gradation processing means, the gradation transformation curve is specified based on the slope of the gradation transformation curve in a predetermined section of the image signal. Further, using the specified gradation transformation curve, the value of the gradation processed image signal with respect to the value of the image signal is derived.

With the visual processing device of this invention, it is possible to specify the gradation transformation curve based on the slope of the gradation transformation curve in a predetermined section of the image signal, and then use this to perform gradation processing.

The visual processing device according to attachment 22 is the visual processing device according to any of attachments 18 to 21 in which the curve parameter includes at least one coordinate point through which the gradation transformation curve passes.

The curve parameter specifies at least one coordinate point through which the gradation transformation curve passes. That is, at least one point of the value of the image signal after gradation processing of the value of the image signal is specified. With the gradation processing means, the relationship between the specified value of the image signal and the value of the image signal that is to be subjected to visual processing is used to nonlinearly or linearly interpolate the specified value of the image signal after gradation processing and thereby derive a gradation processed image signal.

With the visual processing device of this invention, it is possible to specify the gradation transformation curve based on at least one coordinate point through which the gradation transformation curve passes and with this to perform gradation processing.

The visual processing device according to attachment 23 comprises spatial processing means and visual processing means. The spatial processing means performs spatial processing of each of the plurality of image regions in an image signal that has been received as input to derive spatially processed signals. This spatial processing takes the weighted mean of the gradation properties of the target image region and the surrounding image regions using a weighting based on the difference in gradation properties of a target image region to be subjected to spatial processing and surrounding image regions surrounding the target image region. The visual processing means performs visual processing of the target image region based on the gradation properties of the target image region and the spatially processed signal.

Here, image region means a region including a plurality of pixels, or a pixel itself, in the image. The gradation property is a value that is based on the pixel value, such as the luminance or brightness of each pixel. For example, the gradation property of an image region can be the mean value (simple mean or weighted mean), the maximum value, or the minimum value of the pixel values of the pixels included in that image region.

The spatial processing means uses the gradation properties of surrounding image regions to spatially process the target image region. In this spatial processing, a weighted mean is taken of the gradation properties of the target image region and the surrounding image regions. The weight in this weighted mean is set based on the difference in gradation properties between the target image region and the surrounding image regions.

With the visual processing device of this invention, in the spatially processed signal it is possible to inhibit the impact from image regions that have significantly different gradation properties. For example, it is possible to derive a spatially processed signal that is appropriate even in an image where the surrounding image region includes the border of an object, for example, making its gradation property significantly different from that of the target image region. As a result, visual processing using this spatially processed signal can in particular suppress the occurrence of pseudo-borders or the like. It is thus possible to accomplish visual processing having an improved visual processing effect.

The visual processing device according to attachment 24 is the visual processing device according to attachment 23 in which the weighting is smaller the greater the absolute value of the gradation property difference.

Here, it is possible for the weight to be given as a value that monotonically decreases in correspondence with the difference in gradation properties, or it can be set to a predetermined value by comparing the difference in gradation properties with a predetermined threshold value.

With the visual processing device of this invention, in the spatially processed signal it is possible to inhibit the impact from image regions that have significantly different gradation properties. For example, it is possible to derive a spatially processed signal that is appropriate even in an image where the surrounding image region includes the border of an object, for example, making its gradation property significantly different from that of the target image region. As a result, visual processing using this spatially processed signal can in particular suppress the occurrence of pseudo-borders or the like. It is thus possible to accomplish visual processing having an improved visual processing effect.

The visual processing device according to attachment 25 is the visual processing device according to attachments 23 or 24 in which the weighting is smaller the greater the distance between the target image region and the surrounding image region.

Here, it is possible for the weight to be given as a value that monotonically decreases in correspondence with the size of the distance between the target image region and the surrounding image region, or it can be set to a predetermined value by comparing the size of the distance with a predetermined threshold value.

With the visual processing device of this invention, in the spatially processed signal it is possible to inhibit the impact from surrounding image regions that are away from the target image region. Thus, even in the case of an image where the surrounding image region includes the border of an object, for example, making its gradation property significantly different from that of the target image region, if the surrounding image region is away from the target image region, then the impact from the surrounding image region is inhibited and this allows a more appropriate spatially processed signal to be derived.

The visual processing device according to attachment 26 is the visual processing device according to any of attachments 23 to 25 in which the image region comprises a plurality of pixels. Also, the gradation properties of the target image region and the surrounding image regions are set as a characteristic amount of pixel values making up each of those image regions.

With the visual processing device of this invention, each image region is spatially processed using the gradation properties of not only the pixels included in that image region but also the pixels included in image regions over a wide area that includes surrounding image regions. Thus, more appropriate spatial processing can be performed. As a result, it is possible to inhibit the occurrence of pseudo-borders or the like in particular, even in visual processing employing the spatially processed signal. Thus, it becomes possible to achieve visual processing that improves visual effect.

The visual processing device according to attachment 27 comprises target image region determination means, surrounding image region determination means, gradation transformation property derivation means, and gradation processing means. The target image region determination means determines a target image region for which to derive a gradation transformation property from an image signal that has been received as input. The surrounding image region determination means determines at least one surrounding image region that is positioned proximal to the target image region and that includes a plurality of pixels. The gradation transformation property derivation means uses surrounding image data of the surrounding image region to derive the gradation transformation property of the target image region. The gradation processing means performs gradation processing of the image signal of the target image region based on the gradation transformation property that has been derived.

The target image region is for example a region comprising the pixels included in the image signal, or an image block that is obtained by partitioning the image signal into predetermined units and a plurality of other pixels. The surrounding image region is for example an image block that is obtained by partitioning the image signal into predetermined units and a plurality of other pixels. The surrounding image data are for example the image data of the surrounding image region or data that have been derived from the image data, and for example are the pixel values of the surrounding image region, the gradation property (luminance or brightness of each pixel), or thumbnails (reduced images or decimated images whose resolution has been reduced). It is sufficient for the surrounding image regions to be positioned proximal to the target image region, and it is not necessary for them to surround the target image region.

With the visual processing device of the present invention, the surrounding image data of the surrounding image regions are used to determine the gradation transformation properties of the target image region. Thus, it is possible to add a spatial processing effect to the gradation processing with respect to each target image region, allowing gradation processing that further enhances the visual effect to be achieved.

The visual processing method according to attachment 28 comprises a target image region determination step, a surrounding image region determination step, a gradation transformation property derivation step, and a gradation processing step. The target image region determination step is a step of determining a target image region for which to derive a gradation transformation property from an image signal that has been received as input. The surrounding image region determination step is a step of determining at least one surrounding image region that is positioned proximal to the target image region and that includes a plurality of pixels. The gradation transformation property derivation step is a step of using surrounding image data of the surrounding image region to derive the gradation transformation property of the target image region. The gradation processing step is a step of performing gradation processing of the image signal of the target image region based on the gradation transformation property that has been derived.

With the visual processing method of the present invention, the surrounding image data of the surrounding image regions are used to determine the gradation transformation properties of the target image region. Thus, it is possible to add a spatial processing effect to the gradation processing with respect to each target image region, allowing gradation processing that further enhances the visual effect to be achieved.

The visual processing program according to attachment 29 is a visual processing program for using a computer to perform a visual processing method of visually processing an image signal that has been input. The visual processing method comprises a target image region determination step, a surrounding image region determination step, a gradation transformation property derivation step, and a gradation processing step. The target image region determination step is a step of determining a target image region for which to derive a gradation transformation property from an image signal that has been received as input. The surrounding image region determination step is a step of determining at least one surrounding image region that is positioned proximal to the target image region and that includes a plurality of pixels. The gradation transformation property derivation step is a step of using surrounding image data of the surrounding image region to derive the gradation transformation property of the target image region. The gradation processing step is a step of performing gradation processing of the image signal of the target image region based on the gradation transformation property that has been derived.

With the visual processing program of the present invention, the surrounding image data of the surrounding image regions are used to determine the gradation transformation properties of the target image region. Thus, it is possible to add a spatial processing effect to the gradation processing with respect to each target image region, allowing gradation processing that further enhances the visual effect to be achieved.

The semiconductor device according to attachment 30 comprises a target image region determination portion, a surrounding image region determination portion, a gradation transformation property derivation portion, and a gradation processing portion. The target image region determination portion determines a target image region for which to derive a gradation transformation property from an image signal that has been received as input. The surrounding image region determination portion determines at least one surrounding image region that is positioned proximal to the target image region and that includes a plurality of pixels. The gradation transformation property derivation portion uses surrounding image data of the surrounding image region to derive the gradation transformation property of the target image region. The gradation processing portion performs gradation processing of the image signal of the target image region based on the gradation transformation property that has been derived.

With the semiconductor device of the present invention, the surrounding image data of the surrounding image regions are used to determine the gradation transformation properties of the target image region. Thus, it is possible to add a spatial processing effect to the gradation processing with respect to each target image region, allowing gradation processing that further enhances the visual effect to be achieved.

The visual processing device of the present invention can be adopted even for applications such as a visual processing device that performs gradation processing of an image signal for which it is necessary to achieve gradation processing that further enhances the visual effect.

The invention claimed is:

1. A visual processing device comprising:
an image partitioning unit operable to partition an input image into a plurality of image regions;
a region gradation transformation property derivation unit operable to:
  derive a target-image-region gradation transformation property for a target image region of the plurality of image regions, according to a characteristic value of a wide image area surrounding the target image region; and
  derive at least one adjacent-image-region gradation transformation property for at least one adjacent image region that is adjacent to the target image region, according to a characteristic value of a wide image area surrounding the at least one adjacent image region; and
gradation processing unit operable to perform gradation processing to produce a transformed value of a target pixel of the target image region, based on (i) a value of the target pixel, (ii) the derived target-image-region gradation transformation property, (iii) the derived at least one adjacent-image-region gradation transformation property, and (iv) a position of the target pixel,
wherein the gradation processing unit performs the gradation processing, such that when the value of the target pixel is a predetermined value, the transformed value of the target pixel monotonically decreases with respect to an average value of pixels included in the wide image area surrounding the target image region.

2. The visual processing device according to claim 1,
wherein the wide image area surrounding the target image region is an image block that has been obtained by partitioning the input image into predetermined units, and
wherein the wide image area surrounding the at least one adjacent image region is an image block that has been obtained by partitioning the input image into predetermined units.

3. The visual processing device according to claim 1,
wherein the region gradation transformation property derivation unit further uses target image data of the target image region to derive the target-image-region gradation transformation property for the target image region.

4. The visual processing device according to claim 3,
wherein the region gradation transformation property derivation unit includes a characteristic parameter derivation unit operable to use the target image data and the characteristic value of the wide image area surrounding the target image region to derive a characteristic parameter, the characteristic parameter indicating a characteristic of the target image region, and
wherein the region gradation transformation property derivation unit includes a gradation transformation property determination unit operable to determine the target-image-region gradation transformation property based on the derived characteristic parameter of the target image region.

5. The visual processing device according to claim 4,
wherein the derived characteristic parameter is a histogram.

6. The visual processing device according to claim 4,
wherein the gradation transformation property determination unit uses the derived characteristic parameter to select the target-image-region gradation transformation property, which has been tabulated in advance.

7. The visual processing device according to claim 6,
wherein the selected target-image-region gradation transformation property is selected from a plurality of tabulated target-image-region gradation transformation properties, each of the plurality of tabulated target-image-region gradation transformation properties being tabulated in advance, and
wherein each of the plurality of tabulated target-image-region gradation transformation properties can be changed.

8. The visual processing device according to claim 7,
wherein the changing of a target-image-region gradation transformation property of the plurality of tabulated target-image-region gradation transformation properties is achieved by correcting at least a portion of the target-image-region gradation transformation property to be changed.

9. The visual processing device according to claim 4,
wherein the gradation transformation property determination unit uses the derived characteristic parameter to create the target-image-region gradation transformation property through a computation that has been determined in advance.

10. The visual processing device according to claim 9,
wherein the computation determined in advance can be changed.

11. The visual processing device according to claim 10,
wherein the changing of the computation is achieved by correcting at least a portion of the computation.

12. The visual processing device according to claim 4,
wherein the target-image-region gradation transformation property is obtained by interpolation or extrapolation of a plurality of gradation transformation properties.

13. A visual processing method comprising:
partitioning an input image into a plurality of image regions;
deriving a target-image-region gradation transformation property for a target image region of the plurality of image regions, according to a characteristic value of a wide image area surrounding the target image region;
deriving at least one adjacent-image-region gradation transformation property for at least one adjacent image region that is adjacent to the target image region, according to a characteristic value of a wide image area surrounding the at least one adjacent image region; and
performing gradation processing, using a processor of a visual processing device, to produce a transformed value of a target pixel of the target image region, based on (i) a value of the target pixel, (ii) the derived target-image-region gradation transformation property, (iii) the derived at least one adjacent-image-region gradation transformation property, and (iv) a position of the target pixel,
wherein the performing of the gradation processing performs the gradation processing, such that when the value of the target pixel is a predetermined value, the transformed value of the target pixel monotonically decreases with respect to an average value of pixels included in the wide image area surrounding the target image region.

14. The visual processing method according to claim 13, wherein the wide image area surrounding the target image region is an image block that has been obtained by partitioning the input image into predetermined units, and
wherein the wide image area surrounding the at least one adjacent image region is an image block that has been obtained by partitioning the input image into predetermined units.

15. The visual processing method according to claim 13, wherein the deriving of the target-image-region gradation transformation property further includes using target image data of the target image region to derive the target-image-region gradation transformation property for the target image region.

16. The visual processing method according to claim 15, wherein the deriving of the target-image-region gradation transformation property further includes using the target image data and the characteristic value of the wide image area surrounding the target image region to derive a characteristic parameter, the characteristic parameter indicating a characteristic of the target image region, and
wherein the deriving of the target-image-region gradation transformation property further includes determining the target-image-region gradation transformation property based on the derived characteristic parameter of the target image region.

17. A non-transitory computer-readable recording medium having a visual processing program recorded thereon, the visual processing program causing a computer to execute a visual processing method comprising:
partitioning an input image into a plurality of image regions;
deriving a target-image-region gradation transformation property for a target image region of the plurality of image regions, according to a characteristic value of a wide image area surrounding the target image region;
deriving at least one adjacent-image-region gradation transformation property for at least one adjacent image region that is adjacent to the target image region, according to a characteristic value of a wide image area surrounding the at least one adjacent image region; and
performing gradation processing to produce a transformed value of a target pixel of the image signal, based on (i) a value of the target pixel, (ii) the derived target-image-region gradation transformation property, (iii) the derived at least one adjacent-image-region gradation transformation property, and (iv) a position of the target pixel,
wherein the performing of the gradation processing performs the gradation processing, such that when the value of the target pixel is a predetermined value, the transformed value of the target pixel monotonically decreases with respect to an average value of pixels included in the wide image area surrounding the target image region.

18. The non-transitory computer-readable recording medium according to claim 17,
wherein the wide image area surrounding the target image region is an image block that has been obtained by partitioning the input image into predetermined units, and
wherein the wide image area surrounding the at least one adjacent image region is an image block that has been obtained by partitioning the input image into predetermined units.

19. The non-transitory computer-readable recording medium according to claim 17,
wherein the deriving of the target-image-region gradation transformation property further includes using target image data of the target image region to derive the target-image-region gradation transformation property for the target image region.

20. The non-transitory computer-readable recording medium according to claim 19,
wherein the deriving of the target-image-region gradation transformation property further includes using the target image data and the characteristic value of the wide image area surrounding the target image region to derive a characteristic parameter, the characteristic parameter indicating a characteristic of the target image region, and
wherein the deriving of the target-image-region gradation transformation property further includes determining the target-image-region gradation transformation property based on the derived characteristic parameter of the target image region.

21. A semiconductor device comprising:
an image partitioning portion that partitions an input image into a plurality of image regions;
a region gradation transformation property derivation portion that:
derives a target-image-region gradation transformation property for a target image region of the plurality of image regions, according to a characteristic value of a wide image area surrounding the target image region; and
derives at least one adjacent-image-region gradation transformation property for at least one adjacent image region that is adjacent to the target image region, according to a characteristic value of a wide image area surrounding the at least one adjacent image region; and
a gradation processing portion that performs gradation processing to produce a transformed value of a target pixel of the target image region, based on (i) a value of the target pixel, (ii) the derived target-image-region gradation transformation property, (iii) the derived at least one adjacent-image-region gradation transformation property, and (iv) a position of the target pixel,
wherein the gradation processing portion performs the gradation processing, such that when the value of the target pixel is a predetermined value, the transformed value of the target pixel monotonically decreases with respect to an average value of pixels included in the wide image area surrounding the target image region.

22. The semiconductor device according to claim 21, wherein the wide image area surrounding the target et image region is an image block that has been obtained by partitioning the input image into predetermined units, and
wherein the wide image area surrounding the at least one adjacent image region is an image block that has been obtained by partitioning the input image into predetermined units.

23. The semiconductor device according to claim 21, wherein the region gradation transformation property derivation portion further uses target image data of the target image region to derive the target-image-region gradation transformation property for the target image region.

24. The semiconductor device according to claim 23,
wherein the region gradation transformation property derivation portion includes a characteristic parameter derivation portion that uses the target image data and the characteristic value of the wide image area surrounding the target image region to derive a characteristic parameter, the characteristic parameter indicating a characteristic of the target image region, and
wherein the region gradation transformation property derivation portion includes a gradation transformation property determination portion that determines the target-image-region gradation transformation property based on the derived characteristic parameter of the target image region.

* * * * *